(12) United States Patent
Meadows et al.

(10) Patent No.: US 8,172,702 B2
(45) Date of Patent: May 8, 2012

(54) PERSONAL GOLFING ASSISTANT AND METHOD AND SYSTEM FOR GRAPHICALLY DISPLAYING GOLF RELATED INFORMATION AND FOR COLLECTION, PROCESSING AND DISTRIBUTION OF GOLF RELATED DATA

(75) Inventors: James W. Meadows, Madison, MS (US); Richard L. Root, Ridgeland, MS (US); Dallas L. Nash, II, Madison, MS (US); Richard C. Edmonson, Ridgeland, MS (US)

(73) Assignee: Skyhawke Technologies, LLC., Ridgeland, MI (US)

( * ) Notice: Subject to any disclaimer, the term of this patent is extended or adjusted under 35 U.S.C. 154(b) by 234 days.

(21) Appl. No.: 12/573,752

(22) Filed: Oct. 5, 2009

(65) Prior Publication Data

US 2010/0179005 A1    Jul. 15, 2010

Related U.S. Application Data

(63) Continuation-in-part of application No. 11/542,546, filed on Oct. 3, 2006, which is a continuation of application No. 10/668,919, filed on Sep. 23, 2003, now Pat. No. 7,118,498, which is a continuation-in-part of application No. 09/882,652, filed on Jun. 15, 2001, now abandoned.

(60) Provisional application No. 60/212,036, filed on Jun. 16, 2000, provisional application No. 60/223,152, filed on Aug. 7, 2000, provisional application No. 60/422,415, filed on Oct. 30, 2002.

(51) Int. Cl.
*A63F 13/00* (2006.01)

(52) U.S. Cl. ............................... 473/407; 701/213

(58) Field of Classification Search ............... 473/407; 701/208, 213
See application file for complete search history.

(56) References Cited

U.S. PATENT DOCUMENTS 3,868,692 A    2/1975    Woodard et al.
(Continued)

FOREIGN PATENT DOCUMENTS

EP    0 528 530    2/1993
(Continued)

OTHER PUBLICATIONS

GPS Applications for Golf Course Measuring and Mapping; Maj. Steven Fleming, $2^{nd}$ Lt. Christopher Oxendine, Cadet Jason Maassel, Dept. of Geography and Environmental Engineering, United States Military Academy , at http://www.georeasearch.com/confer/fleming.htm, 1997.

(Continued)

*Primary Examiner* — James S McClellan
(74) *Attorney, Agent, or Firm* — Oblon, Spivak, McClelland, Maier & Neustadt, L.L.P.

(57) ABSTRACT

A personal golfing assistant system is comprised of software running on a PDA attached directly or remotely to a GPS receiver that enables the user to survey and/or electronically capture geophysical golf data. A handheld device connected to or integrated with a GPS receiver can instead be used. Software allows a golfer to use a handheld PDA/GPS unit during the course of play to mark a ball location automatically and/or determine the distance to golf course targets and/or objects, and to analyze golf related data and generate statistics. The system can send a set of parameters tailored for a specific course to a real time tunable GPS to adjust for optimal performance and can adjust measurements to compensate for environmental condition changes. The system provides an improved graphical method for measuring and displaying distances between a golfer and a golf course object, for displaying multiple measured distances along a line of sight between a golfer and a golf object or target, and for orienting a target or object on a display to coincide with a user's line of sight. There is also provided a method for collecting and uploading golf course geographic information services (GIS) data to an internet accessible server, processing the uploaded data, distributing data upon an authorized user request, and downloading the requested data to an electronic device.

15 Claims, 57 Drawing Sheets

U.S. PATENT DOCUMENTS

| | | |
|---|---|---|
| 3,945,646 A | 3/1976 | Hammond |
| 4,142,236 A | 2/1979 | Martz et al. |
| 4,220,992 A | 9/1980 | Blood et al. |
| 4,367,526 A | 1/1983 | McGeary et al. |
| 4,400,727 A | 8/1983 | Aron |
| 4,419,655 A | 12/1983 | May |
| 4,428,057 A | 1/1984 | Setliff et al. |
| 4,470,119 A | 9/1984 | Hasebe et al. |
| 4,480,310 A | 10/1984 | Alvarez |
| 4,484,192 A | 11/1984 | Seitz et al. |
| 4,543,572 A | 9/1985 | Tanaka et al. |
| 4,571,684 A | 2/1986 | Takanabe et al. |
| 4,656,476 A | 4/1987 | Tavtigian |
| 4,675,676 A | 6/1987 | Takanabe et al. |
| 4,698,781 A | 10/1987 | Cockerell, Jr. |
| 4,703,444 A | 10/1987 | Storms, Jr. et al. |
| 4,723,218 A | 2/1988 | Hasebe et al. |
| 4,737,916 A | 4/1988 | Ogawa et al. |
| 4,744,033 A | 5/1988 | Ogawa et al. |
| 4,815,020 A | 3/1989 | Cormier |
| 4,825,381 A | 4/1989 | Bottorf et al. |
| 4,910,677 A | 3/1990 | Remedio et al. |
| 4,940,236 A | 7/1990 | Allen |
| 5,044,634 A | 9/1991 | Dudley |
| 5,053,768 A | 10/1991 | Dix, Jr. |
| 5,084,822 A | 1/1992 | Hayami |
| 5,086,390 A | 2/1992 | Matthews |
| 5,089,826 A | 2/1992 | Yano et al. |
| 5,097,416 A | 3/1992 | Matthews |
| 5,119,301 A | 6/1992 | Shimizu et al. |
| 5,127,044 A | 6/1992 | Bonito et al. |
| 5,159,556 A | 10/1992 | Schorter |
| 5,189,430 A | 2/1993 | Yano et al. |
| 5,214,679 A | 5/1993 | Metcalf |
| 5,214,757 A | 5/1993 | Mauney et al. |
| 5,245,537 A | 9/1993 | Barber |
| 5,305,201 A | 4/1994 | Matthews |
| 5,324,028 A | 6/1994 | Luna |
| 5,326,095 A | 7/1994 | Dudley |
| 5,364,093 A | 11/1994 | Huston et al. |
| 5,423,549 A | 6/1995 | Englmeier |
| 5,434,789 A | 7/1995 | Fraker et al. |
| 5,438,518 A | 8/1995 | Bianco et al. |
| 5,439,224 A | 8/1995 | Bertoncino |
| 5,469,175 A | 11/1995 | Boman |
| 5,507,485 A | 4/1996 | Fisher |
| 5,524,081 A | 6/1996 | Paul |
| 5,528,248 A | 6/1996 | Steiner et al. |
| 5,528,518 A | 6/1996 | Bradshaw et al. |
| 5,536,010 A | 7/1996 | Lambourne |
| 5,558,333 A | 9/1996 | Kelson et al. |
| 5,582,566 A | 12/1996 | Imasaka et al. |
| 5,626,531 A | 5/1997 | Little |
| 5,627,547 A | 5/1997 | Ramaswamy et al. |
| 5,664,880 A | 9/1997 | Johnson et al. |
| 5,683,303 A | 11/1997 | Lambourne |
| 5,685,786 A | 11/1997 | Dudley |
| 5,689,269 A | 11/1997 | Norris |
| 5,689,431 A | 11/1997 | Rudow et al. |
| 5,691,911 A | 11/1997 | McEwan et al. |
| 5,699,244 A | 12/1997 | Clark, Jr. et al. |
| 5,711,388 A | 1/1998 | Davies et al. |
| 5,740,077 A | 4/1998 | Reeves |
| 5,743,815 A | 4/1998 | Helderman |
| 5,751,244 A | 5/1998 | Huston et al. |
| 5,772,534 A | 6/1998 | Dudley |
| 5,779,566 A | 7/1998 | Wilens |
| 5,781,150 A | 7/1998 | Norris |
| 5,795,237 A | 8/1998 | Miyamoto |
| 5,797,809 A | 8/1998 | Hyuga |
| 5,802,492 A | 9/1998 | DeLorme et al. |
| 5,810,680 A | 9/1998 | Lobb et al. |
| 5,828,336 A | 10/1998 | Yunck et al. |
| 5,835,896 A | 11/1998 | Fisher et al. |
| 5,873,797 A | 2/1999 | Garn |
| 5,878,369 A | 3/1999 | Rudow et al. |
| 5,882,269 A | 3/1999 | Lewis |
| 5,889,493 A | 3/1999 | Endo |
| 5,903,654 A | 5/1999 | Milton et al. |
| 5,904,726 A | 5/1999 | Vock et al. |
| 5,904,727 A | 5/1999 | Prabhakaran |
| 5,944,132 A | 8/1999 | Davies et al. |
| 5,949,679 A | 9/1999 | Born et al. |
| 5,952,921 A | 9/1999 | Donnelly |
| 5,952,959 A | 9/1999 | Norris |
| RE36,346 E | 10/1999 | Germain |
| 5,963,150 A | 10/1999 | Bail |
| 5,976,038 A | 11/1999 | Orenstein et al. |
| 5,999,892 A | 12/1999 | Fan |
| 6,002,982 A | 12/1999 | Fry |
| 6,024,655 A | 2/2000 | Coffee |
| 6,025,512 A | 2/2000 | Crowther et al. |
| 6,029,121 A | 2/2000 | Stashko |
| 6,030,109 A | 2/2000 | Lobsenz |
| 6,032,108 A | 2/2000 | Seiple et al. |
| 6,055,512 A | 4/2000 | Dean et al. |
| 6,060,991 A | 5/2000 | Hsieh |
| 6,062,991 A | 5/2000 | Moriarty et al. |
| 6,067,039 A | 5/2000 | Pyner et al. |
| 6,091,956 A | 7/2000 | Hollenberg |
| 6,104,337 A | 8/2000 | Coutts et al. |
| 6,111,541 A | 8/2000 | Karmel |
| 6,113,504 A | 9/2000 | Kuesters |
| 6,148,262 A | 11/2000 | Fry |
| 6,162,129 A | 12/2000 | Nielsen |
| 6,165,083 A | 12/2000 | Stenger et al. |
| 6,171,199 B1 | 1/2001 | Cohodas et al. |
| 6,186,908 B1 | 2/2001 | Kawasaki et al. |
| 6,222,482 B1 | 4/2001 | Gueziec |
| 6,236,938 B1 | 5/2001 | Atkinson et al. |
| 6,263,279 B1 | 7/2001 | Bianco et al. |
| 6,267,687 B1 | 7/2001 | Alex |
| 6,304,211 B1 | 10/2001 | Boman |
| 6,353,743 B1 | 3/2002 | Karmel |
| 6,366,856 B1 | 4/2002 | Johnson |
| 6,401,254 B1 | 6/2002 | Boller |
| 6,411,211 B1 | 6/2002 | Boley et al. |
| 6,430,498 B1 | 8/2002 | Maruyama et al. |
| 6,456,938 B1 | 9/2002 | Barnard |
| 6,470,242 B1 | 10/2002 | Rudow et al. |
| 6,496,141 B2 | 12/2002 | Pippin |
| 6,520,853 B2 | 2/2003 | Suzuki |
| 6,520,864 B1 | 2/2003 | Wilk |
| 6,524,199 B2 | 2/2003 | Goldman |
| 6,525,690 B2 | 2/2003 | Rudow et al. |
| 6,579,175 B2 | 6/2003 | Suzuki |
| 6,580,999 B2 | 6/2003 | Maruyama et al. |
| 6,582,328 B2 | 6/2003 | Kuta et al. |
| 6,585,609 B2 | 7/2003 | Bays et al. |
| 6,620,057 B1 | 9/2003 | Pirritano et al. |
| 6,634,959 B2 | 10/2003 | Kuesters |
| 6,638,173 B2 | 10/2003 | Robinson |
| 6,640,146 B2 | 10/2003 | Burbidge |
| 6,691,032 B1 | 2/2004 | Irish et al. |
| 6,694,254 B2 | 2/2004 | Koyama |
| 6,748,317 B2 | 6/2004 | Maruyama et al. |
| 6,751,552 B1 | 6/2004 | Minelli |
| 6,775,612 B1 | 8/2004 | Kao et al. |
| 6,795,770 B1 | 9/2004 | Hanshew et al. |
| 6,813,548 B2 | 11/2004 | Matsumoto et al. |
| 6,862,525 B1 | 3/2005 | Beason et al. |
| 6,898,520 B2 | 5/2005 | Kao et al. |
| 6,900,759 B1 | 5/2005 | Katayama |
| 6,908,404 B1 | 6/2005 | Gard |
| 6,974,391 B2 | 12/2005 | Ainsworth et al. |
| 6,975,229 B2 | 12/2005 | Carrender |
| 6,998,965 B1 | 2/2006 | Luciano, Jr. et al. |
| 7,010,550 B2 | 3/2006 | Tarlie |
| 7,030,736 B2 | 4/2006 | Bouchard et al. |
| 7,059,974 B1 | 6/2006 | Golliffe et al. |
| 7,095,312 B2 | 8/2006 | Erario et al. |
| 7,117,088 B1 | 10/2006 | Hanshew et al. |
| 7,118,498 B2 | 10/2006 | Meadows et al. |
| 7,121,962 B2 | 10/2006 | Reeves |
| 7,175,177 B2 | 2/2007 | Meifu et al. |
| 7,180,451 B2 | 2/2007 | Silzer, Jr. |
| 7,207,902 B1 | 4/2007 | Hamlin |

| | | |
|---|---|---|
| 7,239,269 B2 | 7/2007 | Nozawa |
| 7,239,965 B2 | 7/2007 | Wehrlen et al. |
| 7,243,025 B1 | 7/2007 | Hanshew et al. |
| 7,571,052 B2 * | 8/2009 | Liu .............................. 701/213 |
| 7,922,606 B2 * | 4/2011 | Balardeta et al. ............. 473/407 |
| 2001/0035880 A1 | 11/2001 | Musatov et al. |
| 2001/0041535 A1 | 11/2001 | Karmel |
| 2001/0045904 A1 | 11/2001 | Silzer Jr. |
| 2002/0004723 A1 | 1/2002 | Meifu et al. |
| 2002/0016210 A1 | 2/2002 | Helber |
| 2002/0016674 A1 | 2/2002 | Rudow et al. |
| 2002/0019677 A1 | 2/2002 | Lee |
| 2002/0038178 A1 | 3/2002 | Talkenberg et al. |
| 2002/0052750 A1 | 5/2002 | Hirooka |
| 2002/0060642 A1 | 5/2002 | Togasaka |
| 2002/0072815 A1 | 6/2002 | McDonough et al. |
| 2002/0082122 A1 | 6/2002 | Pippin et al. |
| 2002/0087223 A1 | 7/2002 | Moffatt et al. |
| 2002/0099457 A1 | 7/2002 | Fredlund et al. |
| 2002/0143729 A1 | 10/2002 | Fostick |
| 2002/0151994 A1 | 10/2002 | Sisco |
| 2002/0161461 A1 | 10/2002 | Lobb et al. |
| 2002/0165404 A1 | 11/2002 | Helber |
| 2002/0177490 A1 | 11/2002 | Yong et al. |
| 2002/0188359 A1 | 12/2002 | Morse |
| 2003/0103001 A1 | 6/2003 | Huston et al. |
| 2003/0149496 A1 | 8/2003 | Johnson |
| 2003/0163210 A1 | 8/2003 | Adams |
| 2003/0191547 A1 | 10/2003 | Morse |
| 2003/0236601 A1 | 12/2003 | McLeod et al. |
| 2004/0014536 A1 | 1/2004 | Kuesters |
| 2004/0058749 A1 | 3/2004 | Pirritano et al. |
| 2004/0146185 A1 | 7/2004 | Blair et al. |
| 2004/0196181 A1 | 10/2004 | Huston et al. |
| 2004/0204257 A1 | 10/2004 | Boscha et al. |
| 2004/0204782 A1 | 10/2004 | Kim |
| 2005/0026709 A1 | 2/2005 | Palmer et al. |
| 2005/0032582 A1 | 2/2005 | Mahajan et al. |
| 2005/0037747 A1 | 2/2005 | Geary et al. |
| 2005/0037872 A1 | 2/2005 | Fredlund et al. |
| 2005/0085316 A1 | 4/2005 | Barr |
| 2005/0096761 A1 | 5/2005 | Hanover, Jr. et al. |
| 2005/0101411 A1 | 5/2005 | Stiller et al. |
| 2005/0101415 A1 | 5/2005 | Sweeney |
| 2005/0164808 A1 | 7/2005 | Sasaki |
| 2005/0227791 A1 | 10/2005 | McCreary et al. |
| 2005/0228547 A1 | 10/2005 | McDonnell et al. |
| 2005/0240294 A1 | 10/2005 | Jones et al. |
| 2005/0259002 A1 | 11/2005 | Erario et al. |
| 2005/0266935 A1 | 12/2005 | Mabry et al. |
| 2006/0030433 A1 | 2/2006 | Horsley |
| 2006/0105857 A1 | 5/2006 | Stark |
| 2006/0122002 A1 | 6/2006 | Konow |
| 2006/0183566 A1 | 8/2006 | Levitan |
| 2006/0189415 A1 | 8/2006 | Zanzucchi et al. |
| 2006/0212221 A1 | 9/2006 | Liu |
| 2006/0220809 A1 | 10/2006 | Stigall et al. |
| 2006/0255918 A1 | 11/2006 | Bernstein et al. |
| 2006/0270450 A1 | 11/2006 | Garratt et al. |
| 2007/0016438 A1 | 1/2007 | Bain |
| 2007/0021226 A1 | 1/2007 | Tyroler |
| 2007/0060408 A1 | 3/2007 | Schultz et al. |
| 2007/0072692 A1 | 3/2007 | Oakley |
| 2007/0078018 A1 | 4/2007 | Kellogg et al. |
| 2007/0087866 A1 | 4/2007 | Meadows et al. |
| 2007/0099715 A1 | 5/2007 | Jones et al. |
| 2007/0129178 A1 | 6/2007 | Reeves |
| 2007/0129179 A1 | 6/2007 | Soto |
| 2007/0135237 A1 | 6/2007 | Reeves |
| 2007/0167247 A1 | 7/2007 | Lindsay |
| 2007/0191126 A1 | 8/2007 | Mandracken |
| 2007/0197314 A1 | 8/2007 | York et al. |
| 2007/0233339 A1 | 10/2007 | Wehrlen et al. |
| 2007/0259740 A1 | 11/2007 | Savarese et al. |
| 2008/0201107 A1 | 8/2008 | Doherty et al. |

FOREIGN PATENT DOCUMENTS

| | | |
|---|---|---|
| EP | 1034818 | 9/2000 |
| EP | 1226846 | 7/2002 |
| FR | 2 801 158 | 5/2001 |
| GB | 2233197 | 1/1991 |
| GB | 2243302 | 10/1991 |
| GB | 2249202 | 4/1992 |
| GB | 2251489 | 7/1992 |
| GB | 2271063 | 4/1994 |
| GB | 2 298 539 A | 9/1996 |
| GB | 2391412 | 2/2004 |
| GB | 2394376 | 4/2004 |
| GB | 2401501 | 11/2004 |
| GB | 2412878 | 10/2005 |
| JP | 59212707 | 12/1984 |
| JP | 61067169 | 4/1986 |
| JP | 2209173 | 8/1990 |
| JP | 3030787 | 2/1991 |
| JP | 3092022 | 4/1991 |
| JP | 3134715 | 6/1991 |
| JP | 4005976 | 1/1992 |
| JP | 4020360 | 1/1992 |
| JP | 4335178 | 11/1992 |
| JP | 5019035 | 1/1993 |
| JP | 5046079 | 2/1993 |
| JP | 5049724 | 3/1993 |
| JP | 08057105 | 3/1996 |
| JP | 9276458 | 10/1997 |
| JP | 10113415 | 5/1998 |
| JP | 10137383 | 5/1998 |
| JP | 10216294 | 8/1998 |
| JP | 2000102635 | 4/2000 |
| JP | 2001027541 | 10/2000 |
| JP | 2001027542 | 10/2000 |
| JP | 2001228231 | 8/2001 |
| JP | 2001319154 | 11/2001 |
| JP | 2003180902 | 7/2003 |
| JP | 200339929 | 12/2003 |
| JP | 2004054469 | 2/2004 |
| JP | 2004113535 | 4/2004 |
| JP | 2004120454 | 4/2004 |
| JP | 2004159876 | 6/2004 |
| JP | 2005034529 | 2/2005 |
| JP | 2005052501 | 3/2005 |
| JP | 2005058728 | 3/2005 |
| JP | 2006058290 | 3/2006 |
| JP | 2006084438 | 3/2006 |
| JP | 2006162852 | 6/2006 |
| WO | WO 88/00487 | 1/1988 |
| WO | WO 95/20168 | 7/1995 |
| WO | WO 9621161 | 7/1996 |
| WO | WO 96/40387 | 12/1996 |
| WO | WO 01/97926 A1 | 12/2001 |
| WO | WO 2005/043442 | 5/2005 |
| WO | WO 2007/004568 | 1/2007 |
| WO | WO 2007/038711 | 4/2007 |

OTHER PUBLICATIONS

Press Release entitled "Trimble and ProShot Golf set New Course for GPS" announced at 1996 PGA Merchandise Show.

Sales Literature/Specifications by Garmin International for "Phase Trac 12.TM.", MultiTrak 8.TM. and "TracPak.TM", Copyright 1995.

Sales Literature/Specifications by Ashtech Inc. for the "GG24.TM. Receiver", Copyright Jun. 1996.

Sales Literature/Specifications by Ashtech Inc. for the "G12.TM. GPS Borad", Copyright May 1996.

Sales/Literature/Specifications by Ashtech Inc. for the "G8.sup..TM. GPS Board", Copyright Sep. 1997.

Sales Literature/Specifications by Trimble Navigation Limited for the "Lassen.TM-SK8 GPS OEM Board for Fast Integration", Copyright Mar. 1996.

Sales Literature/Specifications by Canadian Marconi Company, Components Division, GPS OEM Group for the "12-channel Superstar GPS Receiver OEM Module", Superstar Jul. 1998.

Reed, Morgan D., "An Operational Airborne LIDAR Survey System Using Kinematic DGPS"; Presented at Institute of Navigation's ION GPS 98 in Nashville, TN.

http://www.green.com/golf.htm, "The Global Positioning System (GPS) and Golf" 1997—Greenfield Associates.

Sales Literature/Specifications by Bushnell for the Yardage Pro 400, 800 and Component laser range finders. 1998 Bushnell Corporation.

Sales Literature/For the "Inforemer 2000" Course Management System by Inforetech Golf Technology, 2000, Inc.

Sales Literature for the "Spyder 9000 System" by Wuenite Corporation 1998 by Quenite Corporation.

Sales Literature/Specifications by Communications Systems International, Inc. "SBX-2.RTM. The Intelligent Radiobeacon Receiver Engine", Copyright 1997.

Supplementary Partial European Search Report for EP App. No. 01944559.2 dated Nov. 8, 2005.

International Search Report for PCT/US03/34551 dated Novmeber 26, 2004.

Aero Service (Houston, TX); "How to Complete a 78-Day Project in 8 Days"; Sep. 1998, 2Pgs. 1987.

Grossman, John, "The Wiring of the Green", Inc. Technology, pp. 55-58 (1996, No. 4).

Sales Literature/Specifications by Communications Systems International, Inc. for the "GBX PRO. TM. Combined GPS/Beacon Receiver", Copyright 1997.

Sales Literature/Specification by Differential Corrections Inc., Copyright 1997, "OEM 4000, High Performance, credit card sized, FM receiver for Differential GPS embedded applications".

Internet Web Site of Karrie Communications "Intelligolf. TM.", http:www.intelligolf.com a software and service provider, copyright 1998.

Aero Service (Houston, TX); "How to Complete a 78 Day Project in 8 Days"; Sep. 1998, 2Pgs. 1987.

Hurn, Jeff, "Differential GPS Explained", Copyright 1993 by Trimble Navigation Limited.

European Office Action issued Jul. 28, 2010, in Patent Application No. 03 781 547.9.

European Office Action issued Aug. 11, 2011, in Patent Application No. 03 781 547.9.

\* cited by examiner

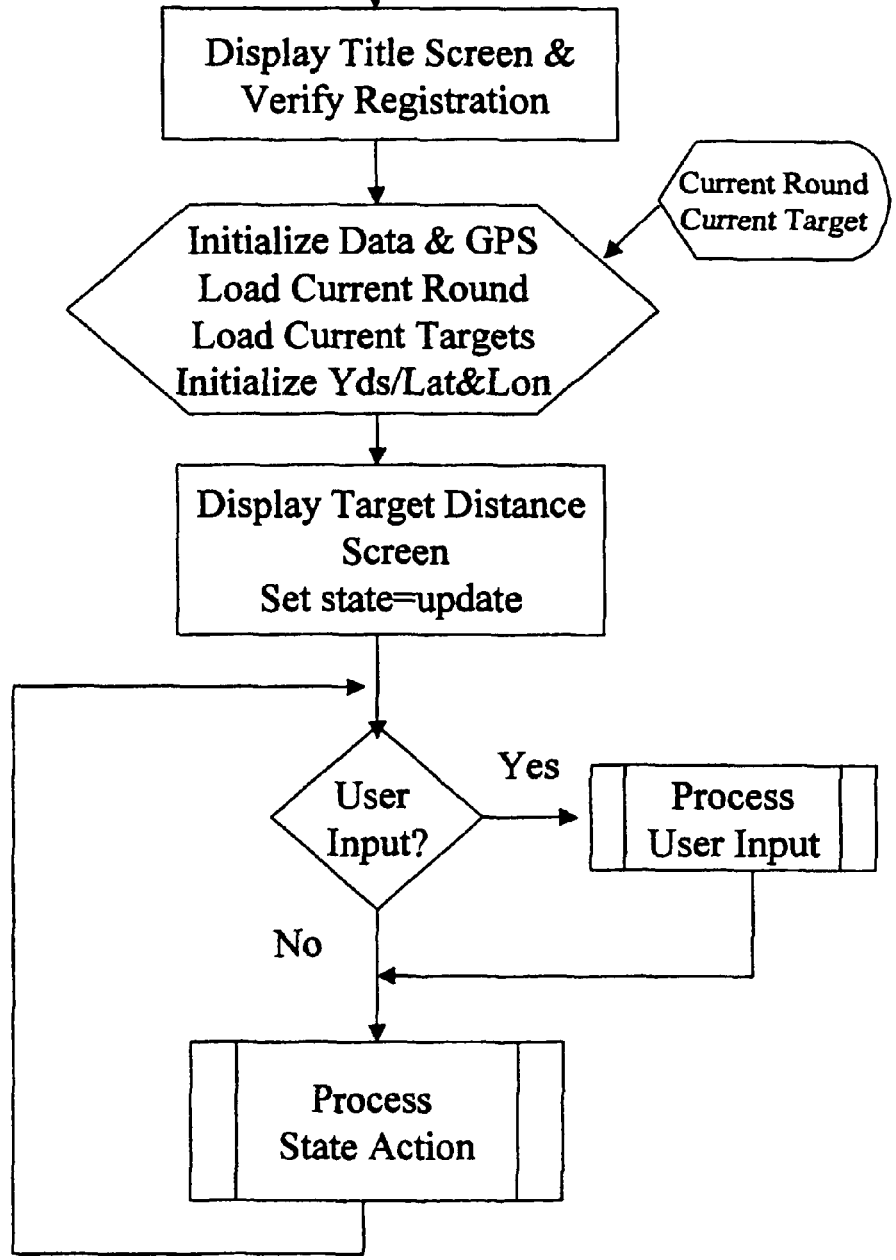

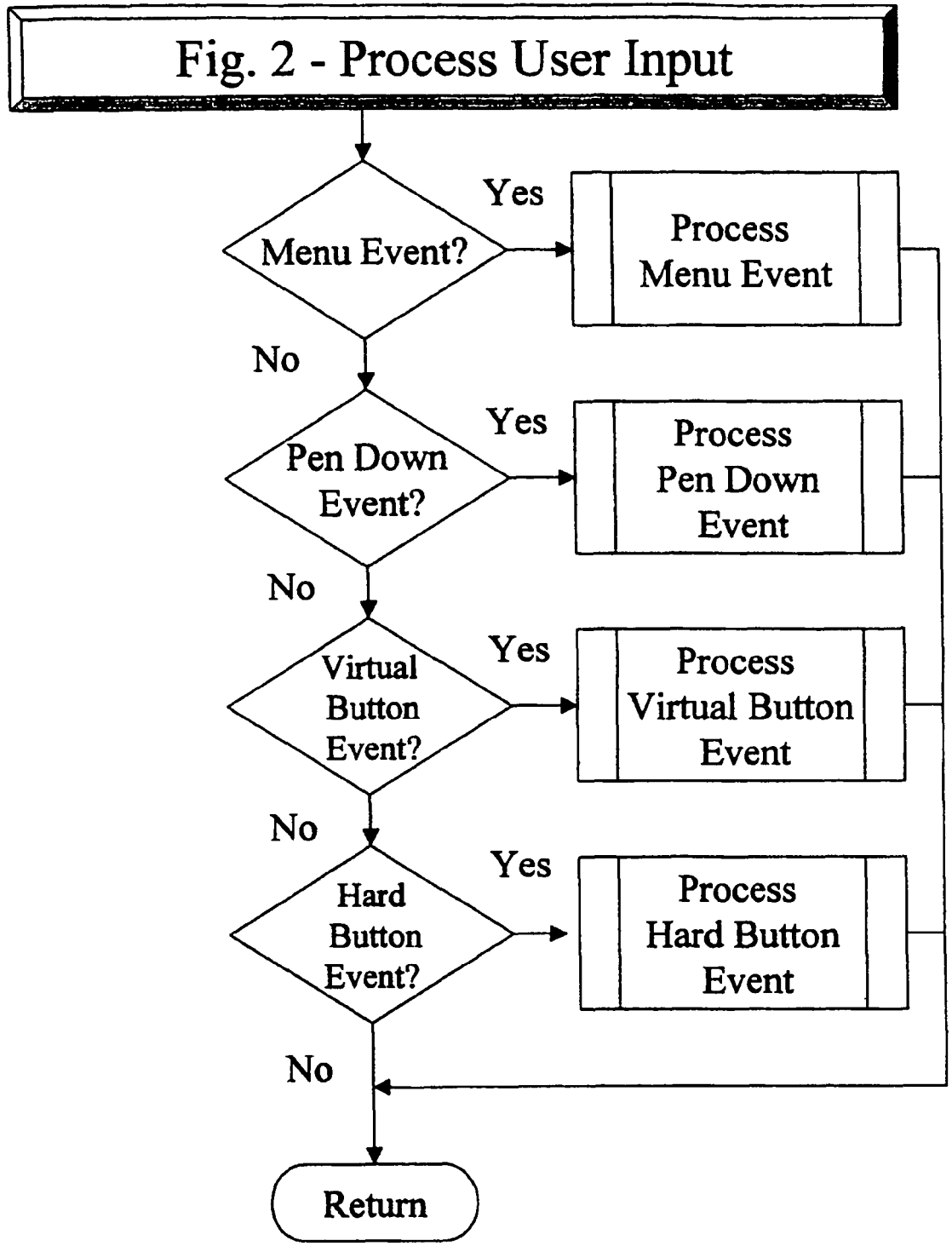

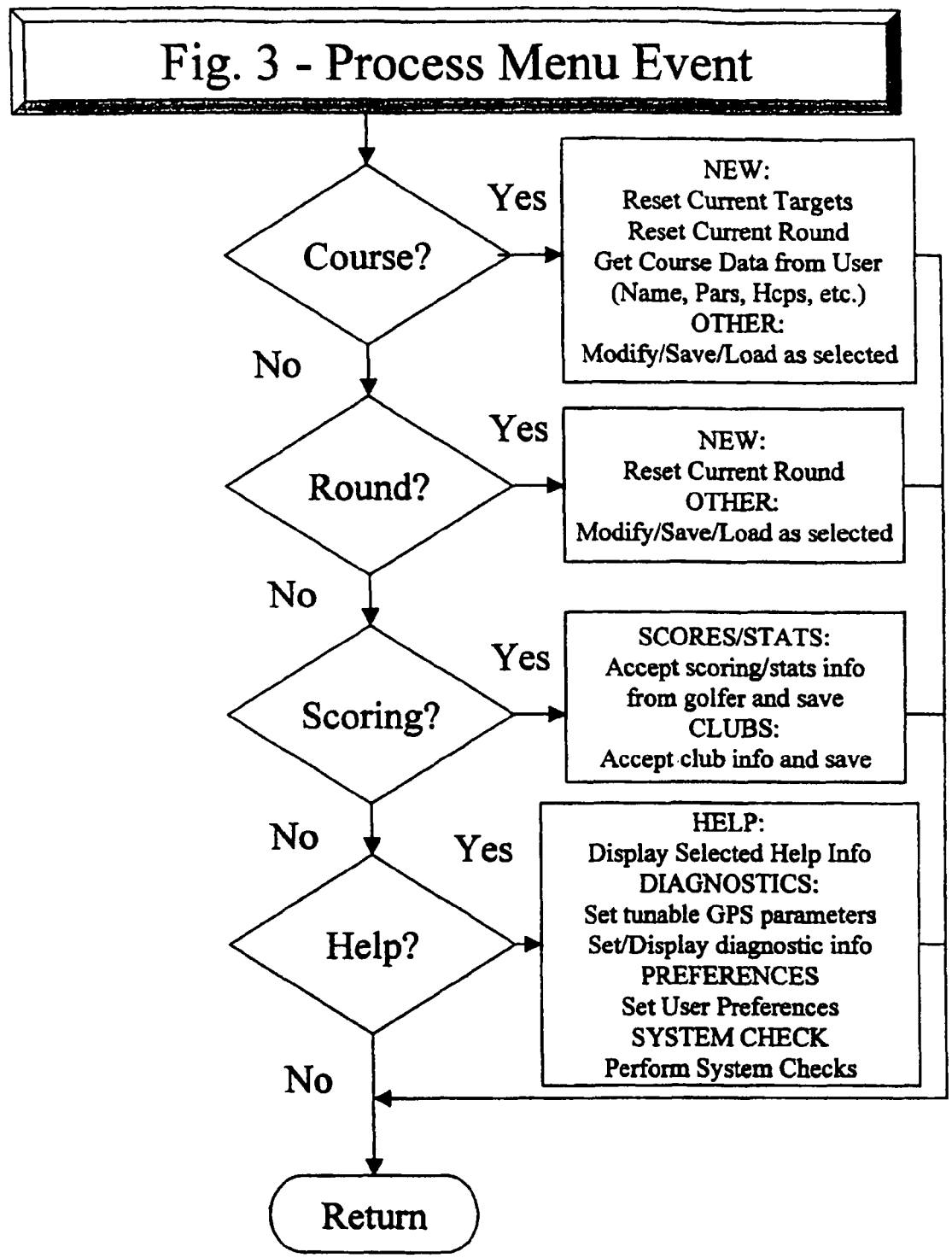

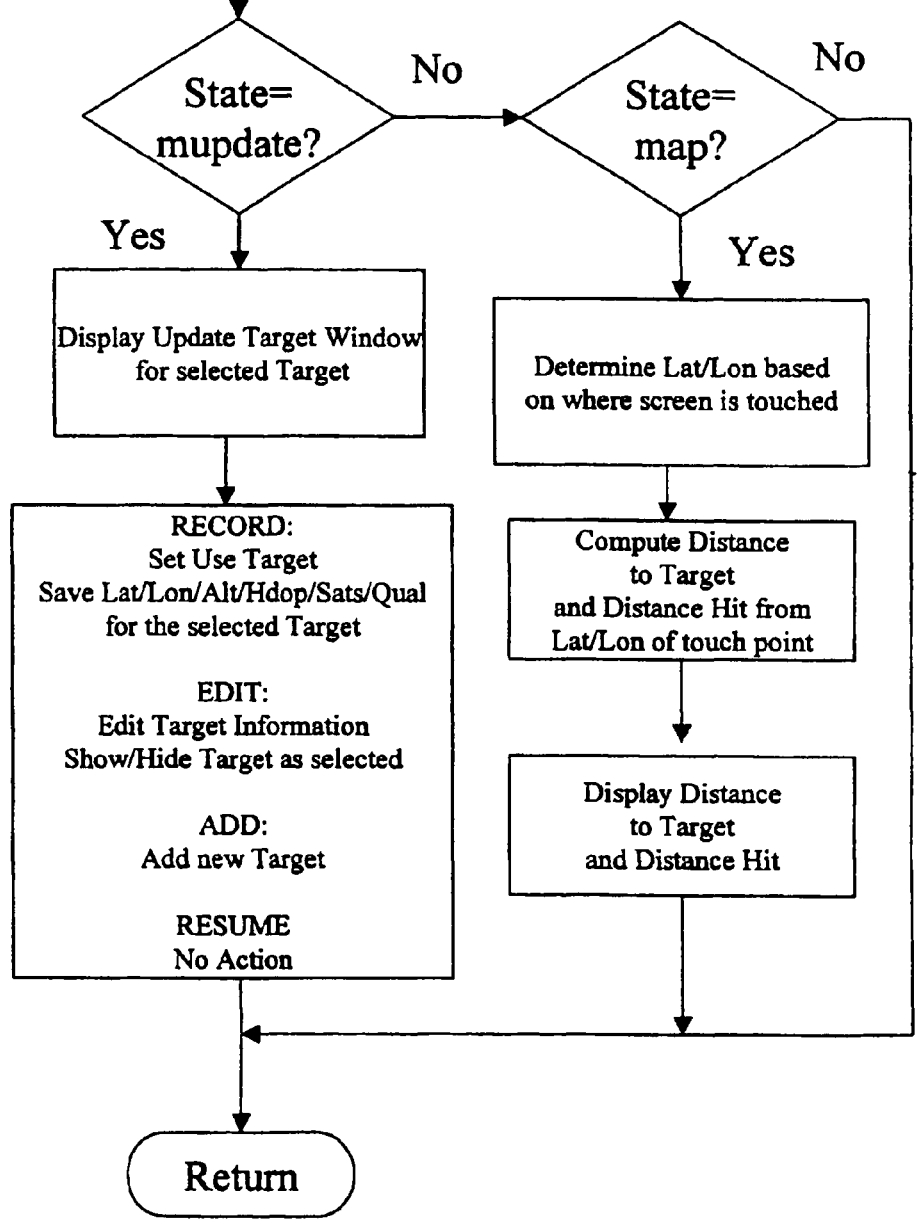

Fig. 5 - Process Virtual Button Event

MARK BALL:
Compute distance from last ball location & save distance
Set last ball location = current Lat/Lon (See COMPUTE Distance)

TARGET:
Display Modify Target Screen
Set state=mupdate

NEXT/PRIOR HOLE:
Increment/Decrement hole number
Display Targets for hole

VIEW:
Popup View Options
Set state based on view selected (update, map, etc.)

CLUB:
Prompt for club used and save

SCORING:
Prompt for hole scores and hole statistics
(Strokes, Putts, Green in Reg, Up & Down, Sand Save, etc.)
Display summary stat screens if selected

UNITS:
Switch to selected units (yards, meters, etc.)

TARGET TYPE:
Switch to list selected target types
(Tee shot targets, lay up targets, green targets, smartmarks, all)

Return

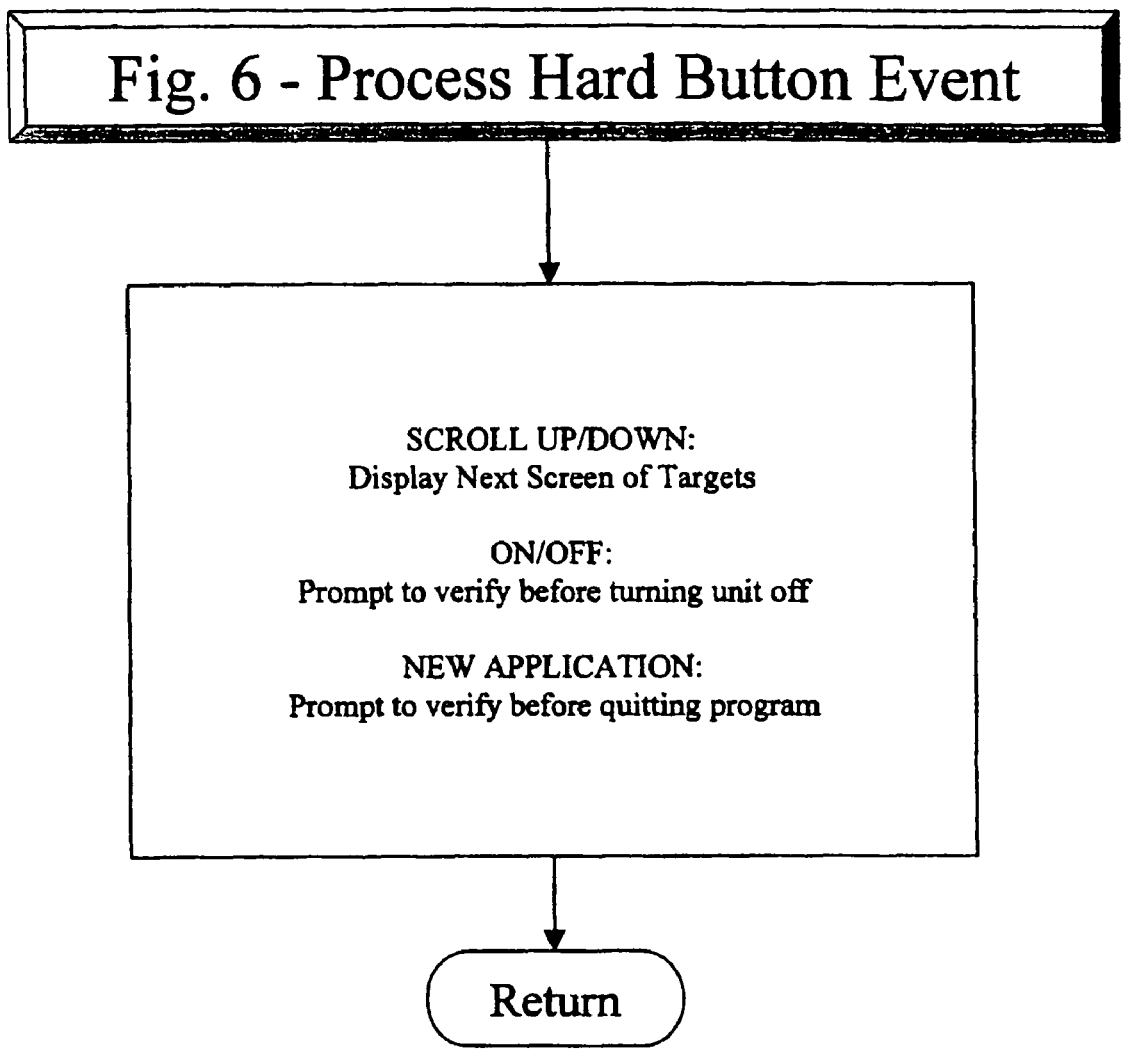

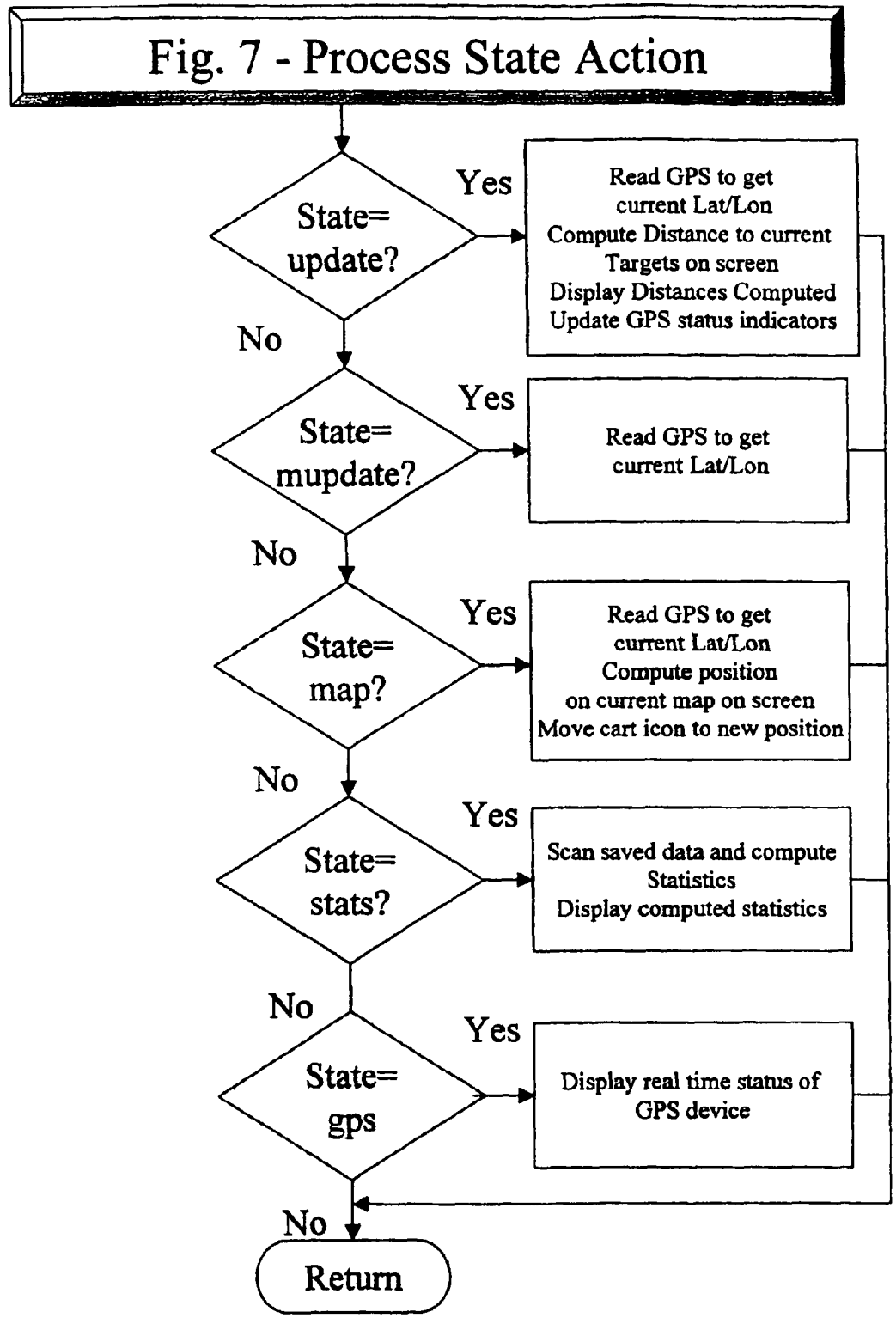

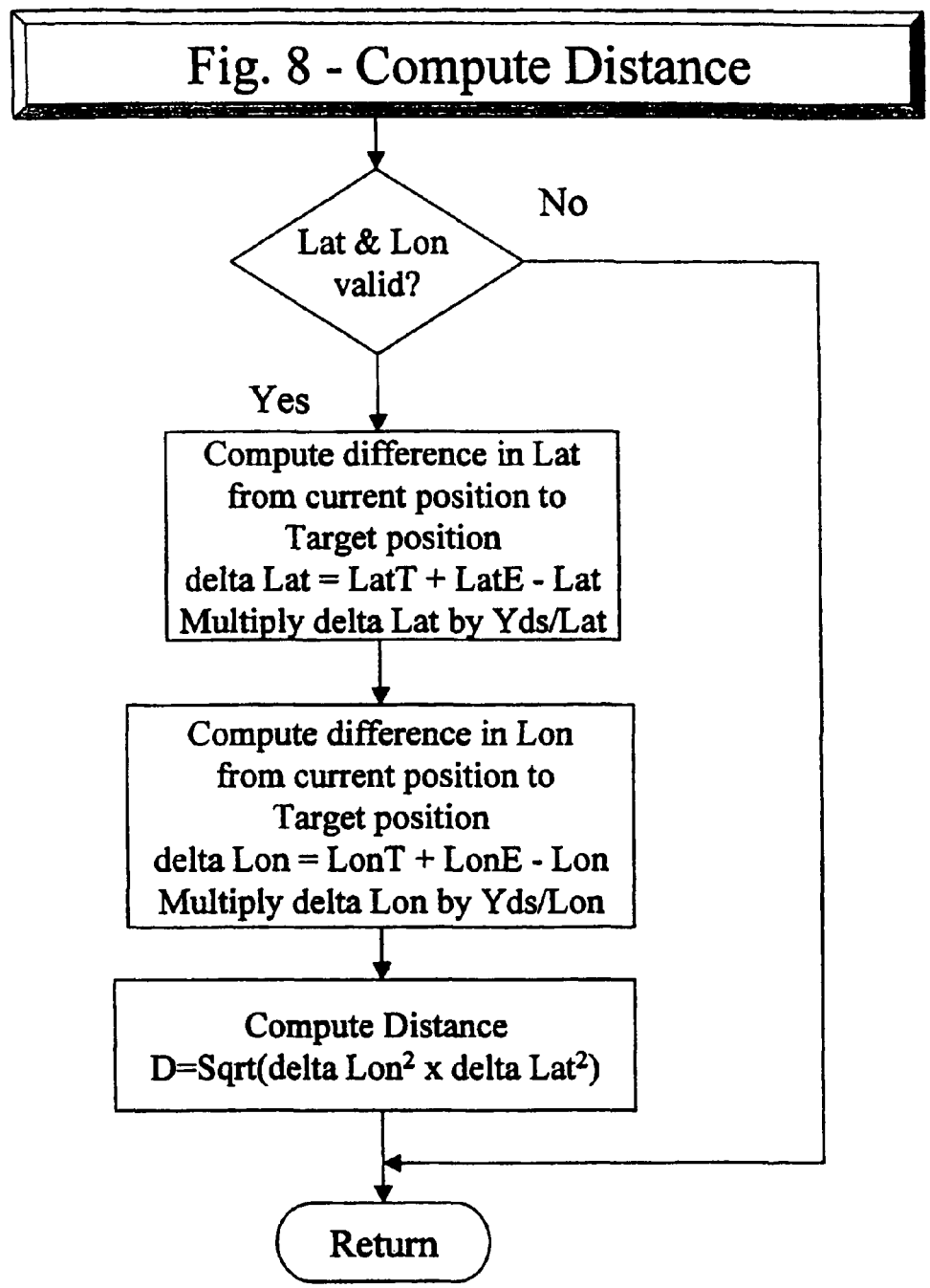

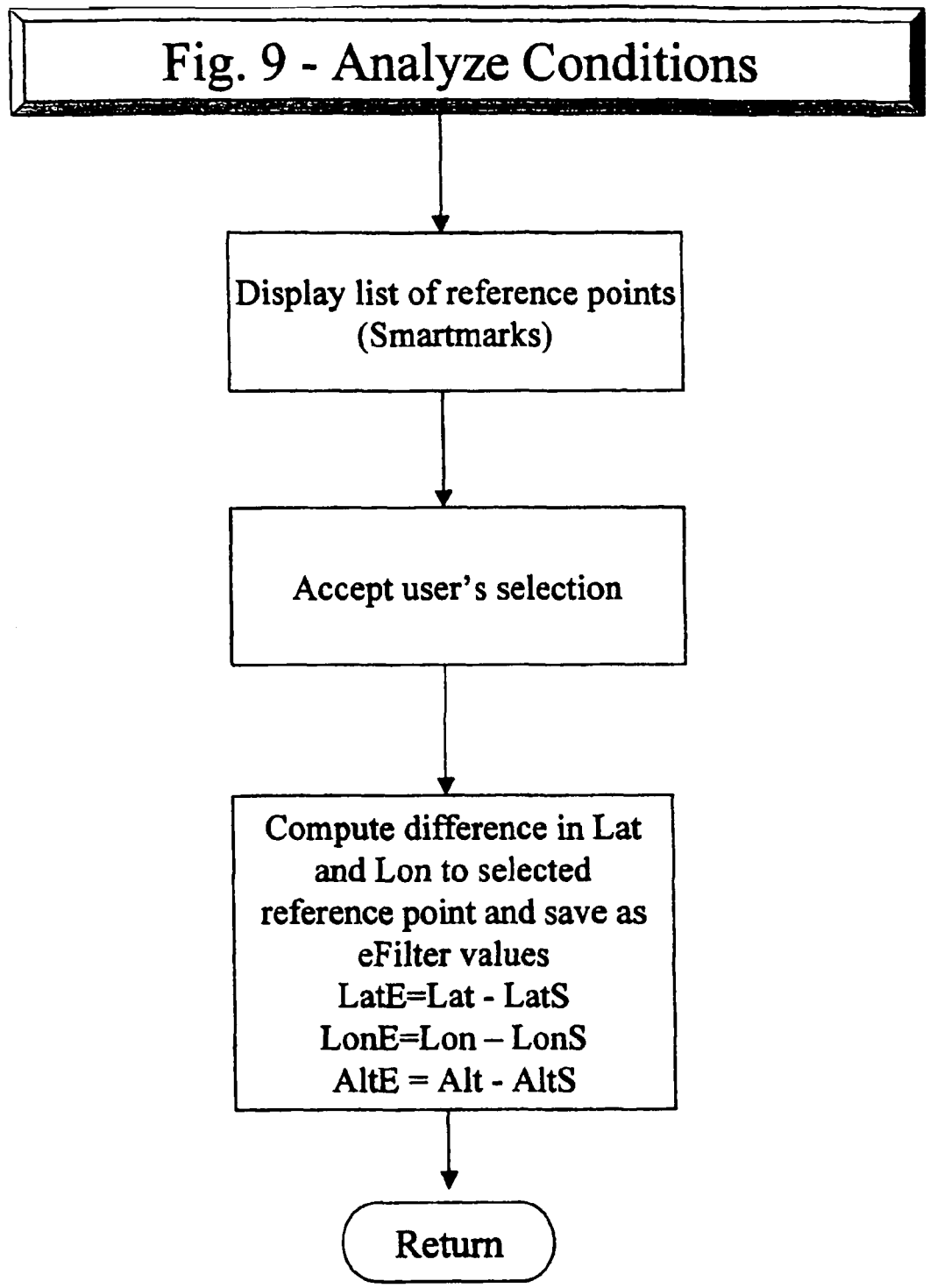

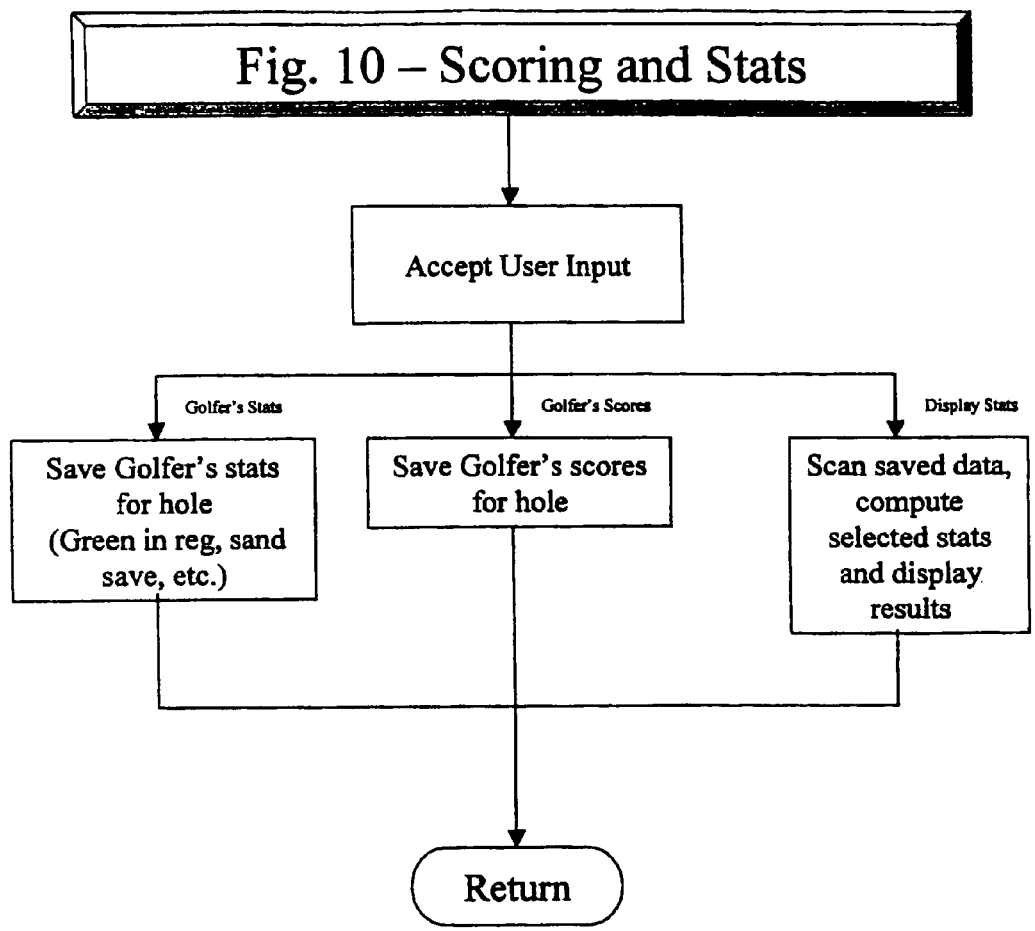

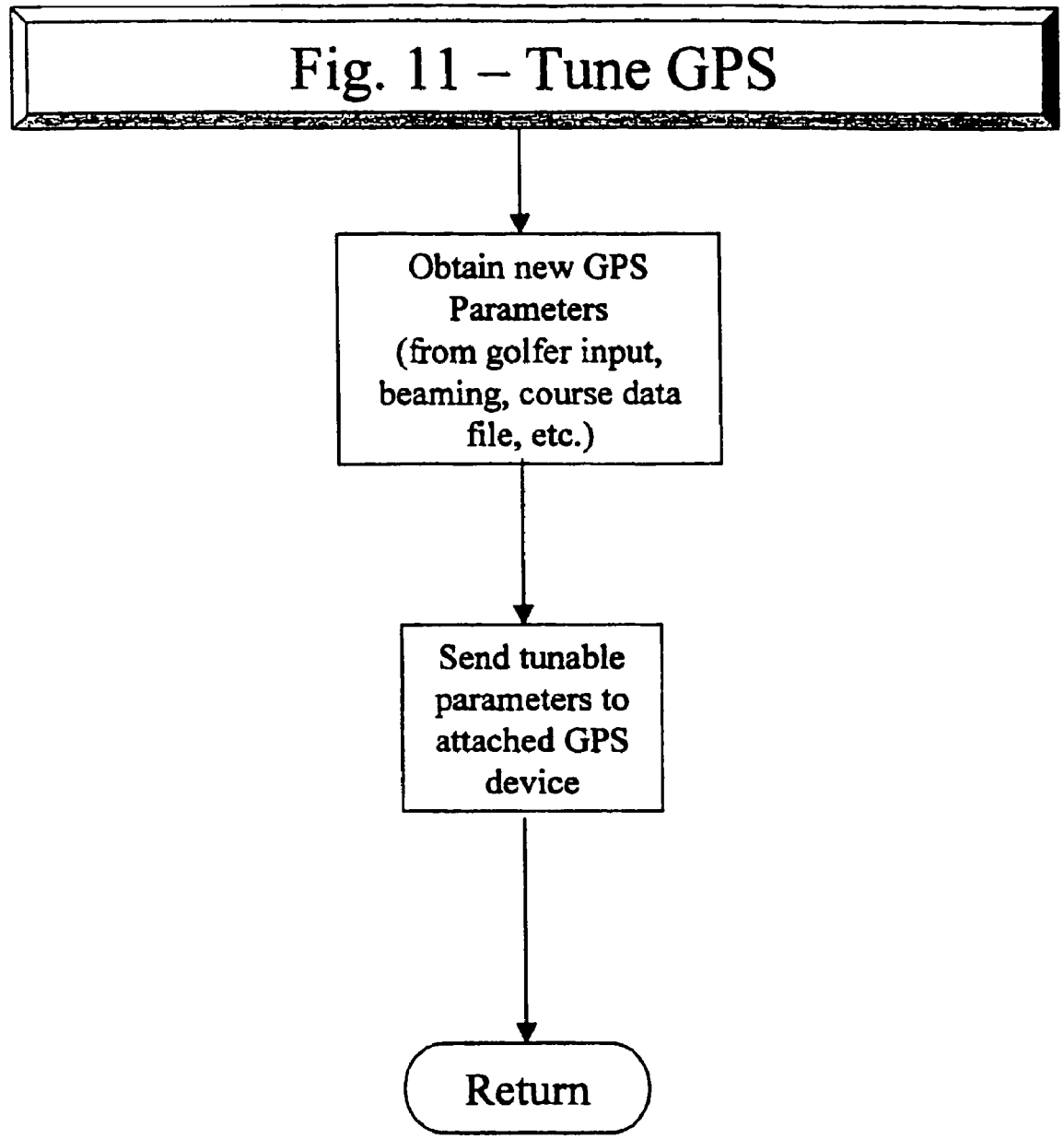

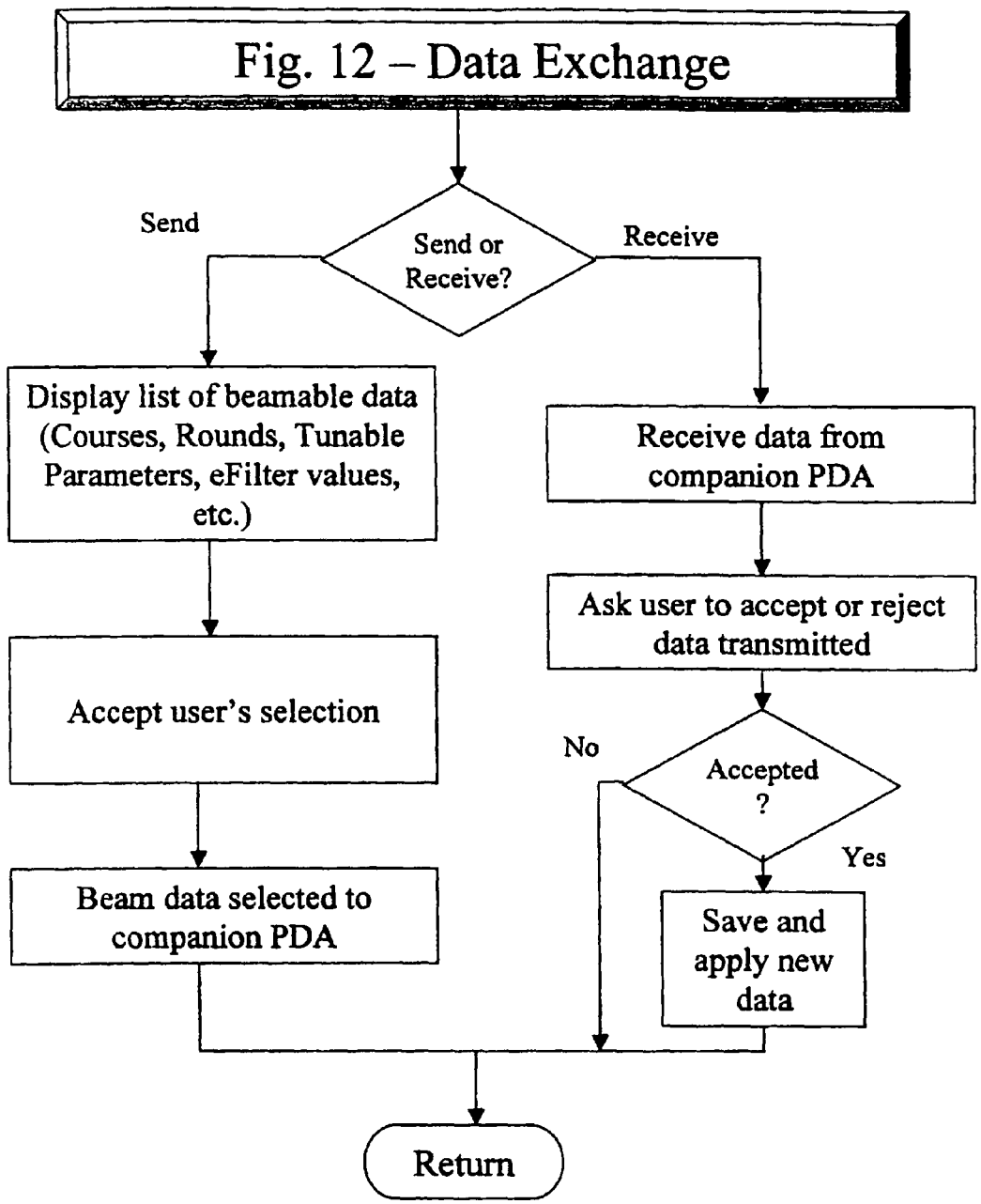

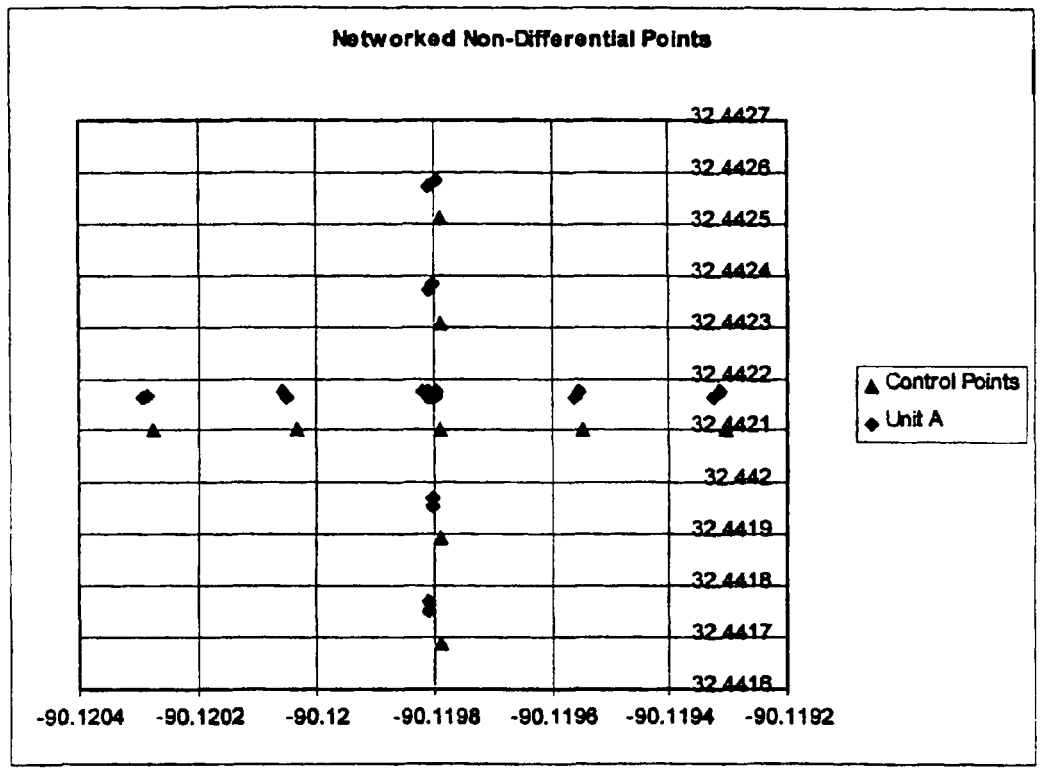
Fig. 13 – MGDT: Networked Points without DGPS

Fig. 14 – MGDT: Networked Points using DGPS
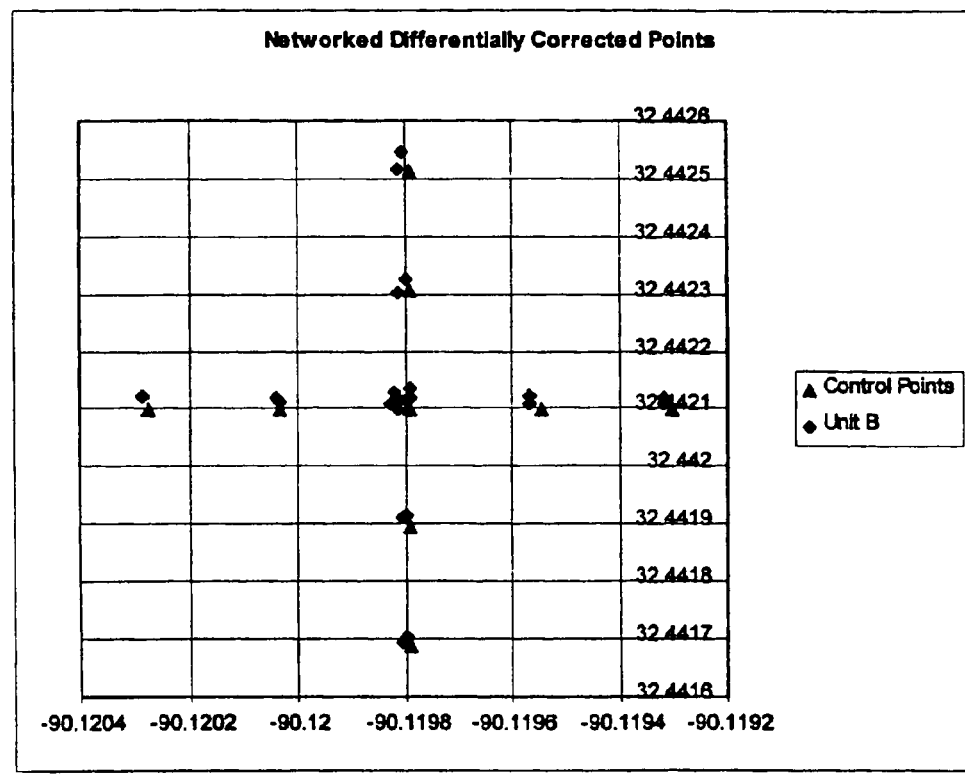

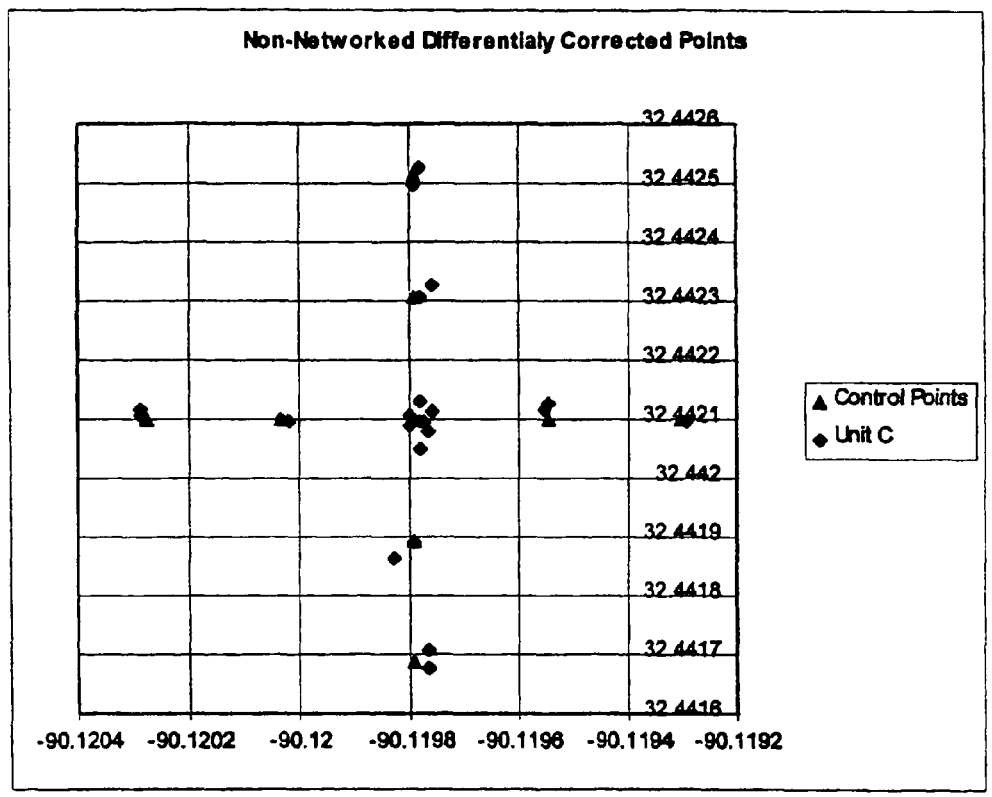
Fig. 15 – MGDT: Non-networked Points

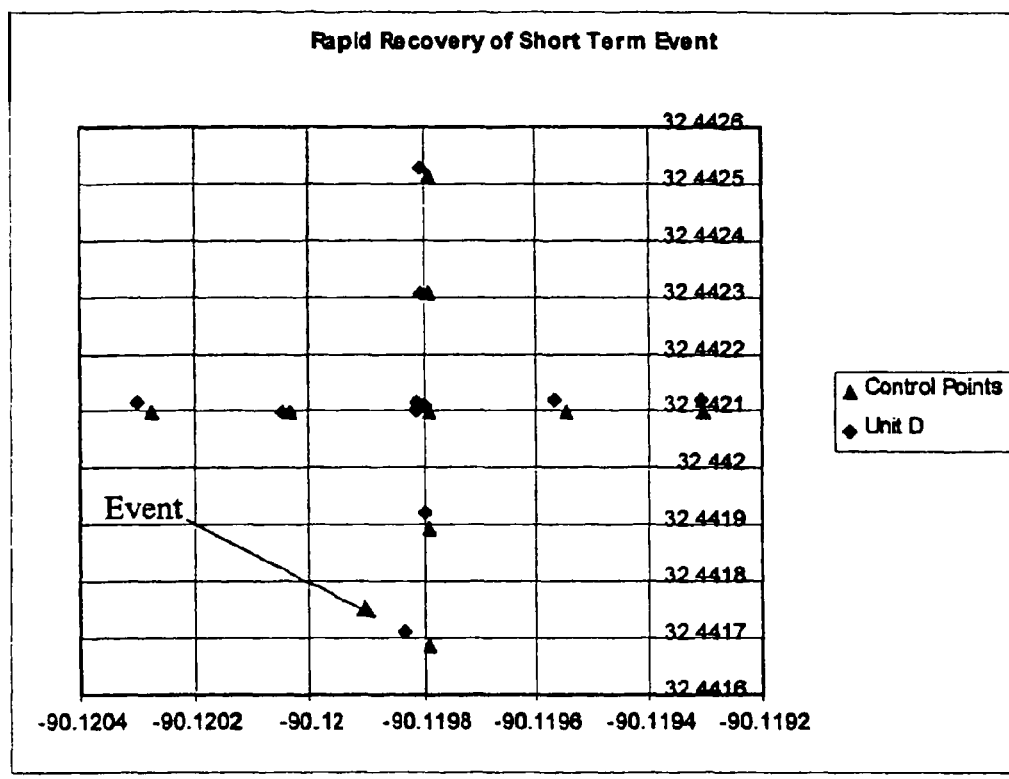
Fig. 16 – MGDT: Properly Tuned Event Recovery

*MGDT: Improperly Tuned Event Recovery*

Fig. 18 – PDA User Interface: Main Screen

Fig. 19 – PDA User Interface: Adding Targets Screen

Fig. 20 – PDA User Interface: Adding Target Descriptions Screen

Fig. 21 – PDA User Interface: Recording Target Location Screen

Fig. 22 – PDA User Interface: Marking Current Ball Location Screen

Fig. 23 – PDA User Interface: Recording Club Used Screen

Fig. 24 – PDA User Interface: Green Targets Screen

Hole 1
Par 4

PERSONAL GOLFING ASSISTANT AND METHOD AND SYSTEM FOR GRAPHICALLY DISPLAYING GOLF RELATED INFORMATION AND FOR COLLECTION, PROCESSING AND DISTRIBUTION OF GOLF RELATED DATA

CROSS REFERENCE TO RELATED APPLICATIONS

This application is a continuation-in-part of and is based upon and claims the benefit of priority under 35 U.S.C. §120 for U.S. Ser. No. 11/542,546, filed Oct. 3, 2006, which is a continuation of U.S. Ser. No. 10/668,919, now U.S. Pat. No. 7,118,498, issued Oct. 10, 2006, which is a continuation-in-part application of U.S. Ser. No. 09/882,652, filed Jun. 15, 2001, now abandoned, which claims the benefit of provisional patent application Nos. 60/212,036, filed Jun. 16, 2000, 60/223,152, filed Aug. 7, 2000 and further claims the benefit of provisional patent application No. 60/422,415, filed Oct. 30, 2002 the entire contents of each of which are incorporated herein by reference.

BACKGROUND OF THE INVENTION

1. Field of the Invention

This invention relates generally to navigation, survey and analysis systems. More particularly, the present invention relates to a system that allows a golfer to easily survey and/or electronically input target and avoidance locations of a golf course, record those locations, then use that object data to determine the relative distance and relative elevation to those objects using a handheld personal digital assistant (PDA) and global positioning system (GPS) device. The present invention also relates to a system and method of graphically displaying distance, elapsed time, statistics and other golf related information on an electronic or computerized device such as a handheld personal digital assistant (PDA) and a global positioning system (GPS) device, and to a method for collection, processing and distribution of golf geographic information services (GIS) data via a computerized system.

2. Background of the Invention

Since the inception of the global positioning system (GPS) in the 1980's many useful military and civilian applications have been developed to utilize its positioning capabilities. Since GPS is primarily a military system, the civilian signals have been previously degraded in a mode called Selective Availability (SA). Typically, positions could be determined to a radius of 100 meters. For many applications that was sufficient and acceptable. For other applications, greater accuracy was required and numerous methods were developed to diminish the effect of SA and increase the accuracy level of the civilian signal. Many of these methods required post processing of the signal data and thus could not be used in real time applications. Other methods required the use of Differential GPS (DGPS) equipment to increase the accuracy of the signal in real time. These systems typically produced an accuracy of 1 to 5 meters but required additional receivers, communications links and antennas. They were portable systems but not easily handheld.

In May of 2000 the Department of Defense authorized the general cessation of SA on the civilian signal. This has diminished intentional errors to the signal and has increased the accuracy of commercial GPS receivers to generally 1 to 10 meters. This range of accuracy greatly enhanced existing applications and will create many opportunities for new applications.

During the period when SA was turned on, the error introduced by the government was the major error in the GPS civilian system which required various techniques such as DGPS to sufficiently correct distances for use on a golf course. With SA turned off, DGPS is no longer necessary for sufficiently accurate distance calculations over short periods of time where environmental conditions remain essentially unchanged for a GPS system tuned for the motion dynamics of a golfer. However, over longer periods of time, the changes in the ionosphere and troposphere now make up the major error in the GPS civilian system when determining locations and distances on a golf course. By applying the processes of the present invention, these changes can be filtered out and the GPS tunable parameters can be set by the golfer for a specific course to produce accuracies necessary for the golf course environment.

The present invention provides a personal, independent handheld device for the mobile golfer. Some prior systems use a base station installed on the course with radios to transmit correction data. This invention does not require any centralized equipment or radios to be installed at the golf course. Some systems require transmitters to be installed on the pin on the green. This invention does not require any transmitters to be installed at the course. Some systems require survey zones to be pre-defined and course images generated by professionals and then provided to the golfer. Although this invention can use surveys developed by others, the owner of the device can perform his own personal surveys using a simple target-based user interface with specialized objects and descriptors tailored for golf. Some systems require error corrections to be obtained and applied on a per satellite basis. This invention can adjust for differences in environmental conditions from the time the original survey was performed and the current playing conditions for a set of targets grouped as a networked data set without having to apply corrections to individual satellites. If DGPS is used to apply corrections to individual satellites, the processes described by this invention can be applied to further improve system accuracy. Many systems require specific cart mounted equipment to determine the ball's approximate position and compute distance to targets. This invention allows the mobile golfer to walk up to the ball and hold the device immediately above the ball location to determine the ball's position and the distance to various targets. Cart-based systems are typically dedicated to a specific course and shared by many golfers. This invention can be used on a variety of courses and can be adjusted for the personal mobile golfer dynamics of each course using tunable GPS parameters.

A common drawback of existing golfing related devices that operate in conjunction with a GPS is that the data and information presented to the golfer or user on the device display screen is typically presented in a limited and/or fixed format that has limited use for the viewer. For example, the data and information displayed on the screen may be static and not subject to any real time user screen modifications. The user may not be able to manipulate the display screen in real time to obtain further data or different data that that originally presented. Also, some golfing related devices with a GPS systems may be completely text based, some may not provide display of environmental conditions, some may not include displays of statistical golfer information. Further, some golfing related devices with a GPS may not have the ability to survey and collect golf course survey data, upload collected survey, process uploaded survey data, and download golf course related maps, data or information. There is thus a need for a way to graphically display distances to targets, elapsed time, club statistics, wind direction and other golf related information, and a method for collecting, processing and distributing golf course geographic information services (GIS) data and information, including golf course survey data and information.

SUMMARY OF THE INVENTION

The present invention is directed to an apparatus for measuring and displaying distances between a golfer and an object on a golf course. The apparatus includes a GPS device connected or integrated to a handheld computing device. The GPS device produces location information corresponding to the location of the GPS device. Software modifies the produced location information to obtain corrected location information. Software also determines the distance between the GPS device and the object. The resulting value is displayed to the golfer on the handheld computing device. Another aspect of the present invention is directed to a method of obtaining and processing location values for a desired point on a golf course. A handheld GPS device is used to obtain location information concerning a reference point. The information from the GPS device is compared with true location information and one or more correction values are generated. A handheld GPS device is used to obtain location information corresponding to the desired point. The correction values are applied to the location information corresponding to the desired point to generate corrected location information for the desired point.

The present invention is also directed to an improved graphical method for measuring and displaying distances between a golfer or user and an object on a golf course, displaying the elapsed time a golf player has been playing a hole on the course and cumulative total of the time elapsed, and displaying statistics of distance ranges for each golf club via a software application running on an electronic or computerized device connected to a global positioning system device. The present invention further provides an improved graphical method for displaying multiple measured distances along a line of sight between a golfer and an object or target on the golf course, and for rotating or orienting a target or object on a display to coincide with a user's perspective or line of sight.

The present invention is further directed to a method for the collection, processing, distribution and reception of golf course geographic information services (GIS) data comprising the steps of collecting and uploading the golf course GIS data to a server computer accessible via the Internet, processing by cataloging and storing the uploaded golf course data and information in preparation for expected user requests for the stored golf course GIS data, distributing the golf course GIS data upon an authorized user request, and downloading the requested GIS data to a electronic or computerized device operating in conjunction with GIS data.

An object of the present invention is to provide a personal golfing assistant that allows a golfer to personally survey his own courses without relying on any local equipment other than a handheld device.

An object of the present invention is to provide a compact, simplified and user friendly device and process to capture real world geo location data that is of interest to a user, analyze that data and present it to a golfer in a useful and beneficial manner.

An object of the present invention is to provide a personal golfing assistant that accurately measures distances between a user and an object on a golf course.

Another object of the present invention is to provide a personal golfing assistant that uses a GPS device to determine and/or record the location of various points on a golf course.

Another object of the present invention is to provide a GPS-based system for reliably measuring distances on a golf course in a variety of environmental conditions.

Another object of the present invention is to provide a method of reducing the error associated with using a GPS-based distance measuring device on a golf course.

Another object of the present invention is to provide a handheld GPS-based distance measuring device for use on a golf course.

A further object of the present invention is to provide a distance measuring device for use on a golf course using a GPS device and a PDA.

A further object of the present invention is to provide a distance measuring device for use on a golf course using a handheld electronic device with an integrated GPS receiver.

A further object of the present invention to provide a graphical method for measuring and displaying distances between a golfer and an object on a golf course using an adjustable cross-hair screen display.

A further object of the present invention to provide a graphical method for displaying an object or target on a golf course where the object or target is rotated on the screen display from the point of view of the user.

A further object of the present invention to provide a method for measuring and displaying, on an electronic or computerized device operating in conjunction with GPS, distances between a golfer and an object on a golf course, displaying the elapsed time a player has been playing a hole on the course and cumulative total of the time elapsed, and displaying statistics of distance ranges for each club.

An additional object of the present invention to provide a method for measuring and displaying, on a PDA, cellular telephone, digital telephone or pager cooperatively connected to a GPS, distances between a golfer and an object on a golf course, displaying the elapsed time a player has been playing a hole on the course and cumulative total of the time elapsed, and displaying statistics of distance ranges for each club.

An additional object of the present invention to provide a method by which pace of play is graphically displayed to the user.

An additional object of the present invention to provide a method for displaying the elapsed time a golf player has been playing a hole on the golf course and the cumulative total of the time elapsed in a textual or graphic manner.

Still a further object of the present invention to provide a method for graphically displaying wind direction and/or magnitude relative to an approach path between the golfer and an object or target on a golf course.

Still a further object of the present invention to provide a method by which wind direction is graphically displayed relative to the user and a target or object.

Still a further object of the present invention to provide a method by which distance information is displayed relative to graphical targets or objects on a golf course.

It is also an object of the present invention to provide a method for displaying multiple measured distances along a line of sight between a golfer and an object or target on the golf course.

It is also an object of the present invention to provide a method for rotating or orienting a target or object on a display to coincide with a user's perspective or line of sight.

It is also an object of the present invention to provide a method by which golf course graphics can be rotated and displayed relative to the golfer in order to give the golfer or user line of sight distances from the user's perspective.

It is another object of the present invention to provide a method by which distances from the user to the front and back of a rotated image are computed and graphically displayed to give the user line of sight distances to selected points from their perspective.

It is another object of the present invention to provide a method by which distance to a selected target or object is displayed graphically as large numbers for ease use.

It is a further object of the present invention to provide a method of doing business for distributing and retrieving geographic information services (GIS) data relevant to a golf course.

Additional objects, advantages and novel features of the invention will be set forth in part in the description which follows, and in part will become apparent to those of ordinary skill in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict one or more implementations in accord with the present invention, by way of example only, not by way of limitations. In the figures, like reference numerals refer to the same or similar elements. The description may be better understood when read in connection with the accompanying drawings, of which:

FIG. 1 shows a flowchart of an embodiment of a main program of one embodiment of the present invention;

FIG. 2 shows a flowchart of a process user input module of one embodiment of the present invention;

FIG. 3 shows a flowchart of a process menu event module of one embodiment of the present invention;

FIG. 4 shows a flowchart of a process pen down event module of one embodiment of the present invention;

FIG. 5 shows a flowchart of a process virtual button event module of one embodiment of the present invention;

FIG. 6 shows a flowchart of a process hard button event module of one embodiment of the present invention;

FIG. 7 shows a flowchart of a process state action module of one embodiment of the present invention;

FIG. 8 shows a flowchart of a compute distance module of one embodiment of the present invention;

FIG. 9 shows a flowchart of an analyze conditions module of one embodiment of the present invention;

FIG. 10 shows a flowchart of a scoring and statistics module of one embodiment of the present invention;

FIG. 11 shows a flowchart of a tune GPS module for one embodiment of the present invention;

FIG. 12 shows a flowchart of a data exchange module for one embodiment of the present invention;

FIG. 13 shows a graph of control points and networked points created without using DGPS;

FIG. 14 shows a graph of control points and networked points created using DGPS;

FIG. 15 shows a graph of control points and non-networked points created using DGPS;

FIG. 16 shows a graph of control points and networked points created using DGPS illustrating properly tuned event recovery;

DETAILED DESCRIPTION OF THE INVENTION

Figure 17:
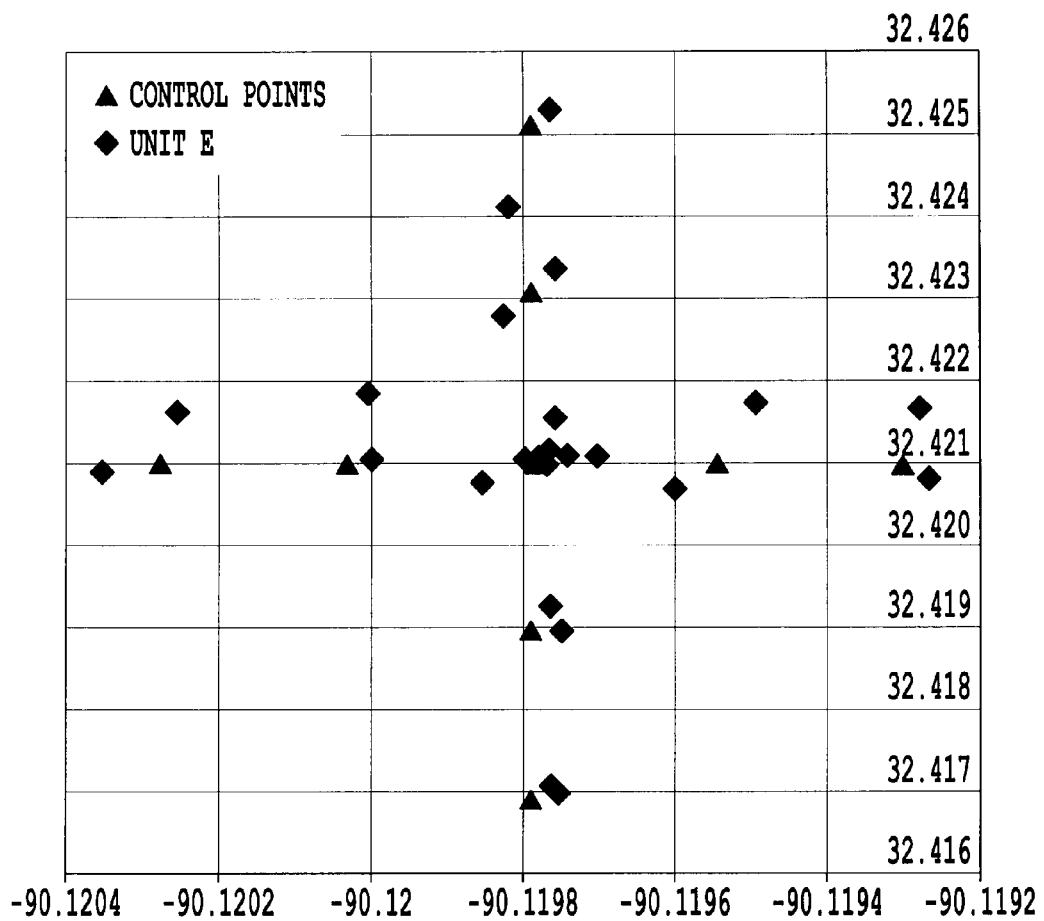
FIG. 17 shows a graph of control points and networked points created using DGPS illustrating improperly tuned event recovery.

The personal golfing assistant of the present invention is a golfer-specific integrated system of software running on a PDA that is attached directly via attachment or module or remotely via cable, wireless link or integrated to a GPS receiver with tunable parameters for individual mobile golfer dynamics that enables the user to engage in a process of easily surveying and/or electronically capturing geophysical data pertinent to the game of golf such as the location of the center of the green, zones on the green, bunkers, water, trees, hazards, etc. Where appropriate, target outlines may be captured to enable the golfer to later view the distance to the front/back or any other point of interest along the outline based on their current ball position and viewpoint.

The present invention allows the golfer to use the same handheld PDA/GPS unit in the course of play to mark the ball location and/or determine the distance to various target and avoidance objects after adjusting for differences in environmental conditions from the time an original survey was performed and the current conditions. The present invention takes into account the motion dynamics specific to an individual golfer on a specific course. A golfer may, if so desired, easily survey additional points during the normal course of play in real time and then immediately use that data. Furthermore, a golfer can elect to record the ball locations at each shot and select the club used as well as other pertinent data such as fairway position, ball trajectory (straight, hook, slice, etc.), lie position, sand saves, green in regulation, number of putts, etc. Software analyzes ball location, distance, club and other information in order to generate useful statistics that could improve and/or enhance the golfers game. Target/avoidance objects, distances and/or statistics can selectively be displayed in real time as text on the PDA screen and/or graphically on an electronic course layout map of each hole and/or group of holes contained in memory on the PDA. Distance information may be displayed in yards or meters or other units as required. Other peripheral functions may be displayed as well, such as timer functions, custom course slope functions, scoring functions, golf handicap functions, etc. Club suggestions may be displayed based on previously captured statistical data and current distance to target area.

To facilitate the ability of a golfer to easily adjust for changes in environmental conditions, several special non-target reference points on each hole can also be recorded during a survey process. These reference points combined with the target points enable the PDA to also be used by itself in a simulation mode without a GPS device attached as an electronic version of a yardage book where the use of GPS is restricted either due to play rules or other circumstances. When GPS use is restricted, the golfer can use the PDA by itself as an electronic yardage book by operating in a simulation mode and making use of special non-target reference points or targets. By going to a reference point or target the golfer can simulate that the golfer is at that point in order to view distances to all targets from that point and then make adjustments for actual ball location from that point in much the same way as sprinkler heads and other permanent markers are currently used to estimate distance to center of green during play.

The golfer can also load course object data previously surveyed by the golfer or others and adjust the distance processing to correct for differences between current environmental conditions and the environmental conditions when the course was originally surveyed. This process combined with real time tunable GPS parameters that can be adjusted for the dynamics of an individual mobile golfer on a specific course enables relative distances to be computed with sufficient accuracy for golf without requiring the use of DGPS equipment or any equipment mounted on a golf cart or infrastructure on the golf course. As part of the process of using real time tunable GPS parameters and geo-referenced object data adjusted for changes in environmental conditions, a golfer will be able to also record the distances, locations and type of each golf shot, associate that with the club used and then generate useful visualization, real time suggestions based on prior play, statistics and scoring for each round of golf. The PDA can also be used by itself in a simulation mode without a GPS device attached as an electronic version of a yardage book.

Modes

The personal golfing assistant system of the present invention is comprised of software running on a handheld computing device such as a PDA that is attached either directly or remotely to a GPS receiver. Examples of PDA's that could be used include those manufactured by Palm, Handspring and others. Alternatively, a palmtop computer or other small processing device with a display could be used. In one embodiment of the present invention, the GPS receiver and the computing device are contained in a single, handheld housing. It is an event driven system as illustrated by the flowcharts in FIGS. 1-7. The user has the option to select the mode for loading a previously surveyed course and play a round of golf, or select the setup mode to engage in a process of easily surveying and/or electronically capturing geophysical data points pertinent to the game of golf such as the location of the center of the green, zones on the green, bunkers, water, trees, hazards, etc. While in play mode the golfer can perform selected survey functions to add new data points to the current course survey. A simulation mode allows the golfer to use the PDA without the GPS attached for conditions where GPS use is restricted or for strategy planning purposes while away from the course.

Survey and Data Capture

Survey and data capture functions are implemented by means of several processes. The first process allows the user to survey the target/avoidance objects prior to playing a round of golf. A user interface screen presents the user with a hierarchical list of objects from which the user can choose and mark the geo-referenced location by simply pressing a virtual "Record Target" button on the PDA display touch screen. The GPS data would then be automatically recorded and associated with the object designation. A series of objects (e.g. targets for a single hole) surveyed within a short period of time can be grouped as a networked data set. A networked data set is a group of points that retain their distance relationships even as major environmental changes occur. Absolute position accuracy is not as essential while surveying as long as the relative position of objects within a networked data set is accurate. These data points would then be referenced during subsequent rounds of golf in order to provide the basis for analysis and statistics.

The second process allows the user to survey the location of the target/avoidance objects during the normal course of play as the golfer arrives at each ball location or area of interest. The user enters the data via the menu presented on the PDA display touch screen. When the virtual "Record Target" button is pressed on the display touch screen the GPS location information is automatically recorded and associated with the object designation.

A third process allows the user to dynamically update or add survey information during the normal course of play even after location data has previously been entered. The golfer merely selects the item to add or update and then touches the virtual "Record Target" button to automatically record the position data with the desired point or object. That data is then immediately available for use by the golfer. By making appropriate use of reference points prior to adding targets, the new target locations can be adjusted to match the environmental conditions of the networked data set when the course was previously surveyed in order to preserve the relative distances of all targets in the networked data set to one another.

Position Simulation

When GPS use is restricted, a golfer can use a simulation mode to determine distances to course targets and hazards. By going to one of the special non-target reference points or any of the targets on a hole, the golfer can simulate that the golfer is at that point in order to view distances to all targets from that point. The golfer can then make adjustments for the actual ball location from that point in much the same way as sprinkler heads and other permanent markers are currently used to estimate distance to center of green during play.

In an alternative embodiment of the present invention geo-referenced layout maps of the golf course can be displayed on the PDA screen to enable the golfer to approximate and visually locate on the PDA screen new survey locations of target/avoidance objects and points as well as approximate and visually locate distances to those objects and points from an estimated marked position if no GPS signal was available. The golfer would have all of the statistical and scoring functionality of the software albeit deductive reckoning would approximate the distances.

Distance, Scoring and Statistics During Play

In a further aspect of one embodiment of the present invention, software allows the golfer to immediately and in real time use the same handheld PDA/GPS unit in the course of play to dynamically display in real-time on the PDA screen the distance from the golfer holding the PDA/GPS device to the various target/avoidance objects that the golfer previously surveyed and/or downloaded via PC, landline, or wireless link into the system.

During actual play of a round of golf the golfer may mark the ball location by pressing a virtual "Mark Ball" button on the PDA screen and then, as shown in FIG. 8, automatically determine the distance to various target and avoidance objects, and/or relative elevation to the target/avoidance objects as well as the distance the ball was hit. Furthermore, the golfer can elect to record the ball locations at each shot and select club used as well as other pertinent data such as fairway position, ball trajectory (straight, hook, slice, etc.), sand saves, green in regulation, number of putts, etc. This allows the golfer to save club distance and other characteristics of the shot for immediate review on the PDA or later analysis on the PDA or other computing devices. This analysis could include, but is not limited to, computing the average distance hit for each club based on data from single or multiple rounds of play. Based on average distances for each club and the current distance to a target the system could make club recommendations for a particular shot during play.

In the subroutine shown in FIG. 8, yards per latitude and yards per longitude for the golfer's current location on the earth are generated when a new screen is displayed. This reduces the complexity and time required for the real time computation and update of distances to all targets being displayed. An alternative method is to use the great circle formula to compute the distance between all latitude and longitude points. Elevation differences may also be calculated and displayed.

The Scoring and Statistics Module shown in FIG. 10 analyzes scores, ball location, distance, club and other information in order to generate useful statistics that could improve and/or enhance a golfer's game. The target/avoidance objects and/or statistics can selectively be displayed as text on the PDA screen and/or graphically on geo-referenced and object oriented course layout maps of each hole and/or groups of holes contained in memory on the PDA. The software can also process cumulative course distances to generate daily course slope data for use by the golfer. Other data may be generated and displayed as well such as timer functions, golf handicap functions, etc.

Filter Adjustments for Environmental Conditions

Space Based Augmentation Systems (SBAS) such as WAAS, EGNOS and MSAS may be used successfully a majority of time where such signals and systems are available. However, it is beneficial to have additional location correction methods to further augment such systems or to provide corrections in areas of the world where SBAS or GBAS (Ground Based Augmentation Systems) do not exist.

By having one or more reference points included in a pre-defined survey of known points of a golf course, a golfer can adjust for the current environmental conditions for a period of time in order to correctly determine distances to the pre-defined points of interest without requiring the use of DGPS equipment or any equipment mounted on a golf cart or infrastructure on the golf course. Unlike DGPS and other techniques that apply corrections on a per satellite basis, the eFilter corrections of this invention are applied to a networked data set of points. DGPS and other corrective techniques can be used in conjunction with the techniques of this invention for additional accuracy, but are not required. Use of the eFilter will make DGPS-based computations even more accurate. FIGS. 8 and 9 show the flowcharts for the distance computation and eFilter adjustment processes.

Before starting play, a golfer goes to the first reference point and taps a button on his PDA to instruct the software to correct for current environmental conditions. In the simplest form, this is accomplished by comparing the current computed latitude/longitude (Lat/Lon) to the previously surveyed Lat/Lon (LatS/LonS) for the reference point and computing the difference in Lat and difference in Lon. These differences become the basis of correction values referred to herein as Latitude/Longitude eFilter correction values (LatE/LonE). As the golfer plays the course, if the eFilter is turned on, all target Lat/Lons (LatT/LonT) are adjusted by the eFilter correction values (LatE/LonE) as illustrated below:

When the button is pressed at the first reference point:

$$LatE = Lat - LatS$$

$$LonE = Lon - LonS$$

The adjusted Lat/Lon (LatTA/LonTA) of a subsequent target position is then computed as follows when the eFilter is on:

$$LatTA = LatT + LatE$$

$$LonTA = LonT + LonE$$

Distance from the current position (Lat/Lon) to a target is then computed using LatTA/LonTA rather than LatT/LonT.
Where
LatS=Lat of reference point in pre-defined survey
LonS=Lon of reference point in pre-defined survey
LatE=eFilter Lat correction value
LonE=eFilter Lon correction value
Lat=current GPS Lat reading
Lon=current GFS Lon reading
LatT=Lat of target point in a pre-defined survey
LonT=Lon of target point in a pre-defined survey
LatTA=Adjusted Lat of target point
LonTA=Adjusted Lon of target point An alternative method would be to compute LatE as LatS-Lat and apply the adjustment to Lat rather than LatT (and the same for LonS).

As long as the current environmental conditions remain fairly consistent, distances will now be corrected to 1-3 meter accuracy. If the golfer notices that the computed distances appear incorrect, he can go to the next available pre-surveyed reference point and repeat the above process to correct for the new environmental conditions. Reference points can be pre-surveyed in the tee area of each hole and other specific points along the hole to allow the golfer to establish new eFilter correction values at each hole. These specific reference points can be grouped as non-target points (SmartMarks) and displayed in a list for each hole to enable the golfer to easily find the nearest reference point where he can adjust for new environmental and other conditions that introduce errors in the position solution.

If a golfer does not have a pre-defined precise survey of known points on a course, he can perform his own survey as previously described with the eFilter turned OFF. As part of the survey he must select and survey a recognizable reference point for the course and, if possible, reference points in the tee area and other specific points along each hole. The objects surveyed immediately after marking a reference point become a networked data set (e.g. all recorded points for a hole). As long as the data set survey is accomplished within a period of time where environmental conditions are relatively constant, all points within the data set will have an accurate offset from the reference point. After completing the data set, the golfer can return to the reference point and verify that the distance to the reference point is within acceptable limits (e.g. 1-3 yards) while standing on the reference point to ensure the validity of the networked data set. If the distance to the reference point is greater than the acceptable limit when standing back at the reference point, the data set must be resurveyed.

When the golfer is ready to start play either later that day or on some other day, the golfer goes to the first reference point and taps a button on his PDA to instruct the software to correct for current environmental conditions. The software will compare the current GPS Lat/Lon to the surveyed Lat/Lon for the reference point and compute the difference in Lat and difference in Lon. These differences become the basis of the current Latitude/Longitude eFilter correction values (LatE/LonE). As the golfer plays the course, if the eFilter is turned on, all target Lat/Lons are adjusted by the eFilter correction values. This process effectively applies the difference in environmental conditions from the time the points were originally surveyed and the current conditions. These adjustments are primarily valid for the data set associated with the reference point for that networked data set. However, if the original survey of the entire course is performed within a short enough time, the first reference point can also be considered a reference point for the entire course and the entire course treated as a networked data set. In this case the golfer needs only set the eFilter at the beginning of play instead of at each hole. At any time during play, if current conditions change to produce errors outside of acceptable limits, the golfer can then go to the next reference point for a hole and create new eFilter correction values for the current conditions which then remain valid as long as current conditions remain relatively consistent.

A golfer can also add a new target to an existing course survey if he has recently gone to a reference point and created new eFilter correction values for the current environmental conditions as follows:

$$LatE = Lat - LatS$$

$$LonE = Lon - LonS$$

If the eFilter is on when he marks new targets, the target Lat/Lon will be adjusted to match the original survey environmental conditions for the networked data set. As the golfer adds new targets to the networked data set, if the eFilter is on, the Lat/Lon for the target(s) are adjusted and saved as follows:

$$LatTM = Lat - LatE$$

$$LonTM = Lon - LonE$$

Where
LatS=Lat of reference point in prior survey
LonS=Lon of reference point in prior survey
LatE=eFilter Lat correction value
LonE=eFilter Lon correction value
Lat=current GPS Lat reading
Lon=current GPS Lon reading LatTM=Modified Lat of target point saved in networked data set LonTM=Modified Lon of target point saved in networked data set The Lat/Lon saved for the target(s) are effectively modified to match the environmental conditions of the original networked data set so that it can be treated as part of that networked data set.

A golfer can add new reference points to an existing course survey if he has at least one valid reference point that was saved under similar environmental conditions as the survey points. For example, if a reference point was surveyed for the 1st and 3rd holes but not for the 2nd hole, the golfer could go to one of the reference points and create new eFilter correction values for the current environmental conditions. The golfer would then go to the 2nd hole and mark the desired reference point for that hole with eFilter on. This will modify the Lat/Lon of the new reference point when it is recorded to match the environmental conditions of the original networked data set.

Prior to adding a new reference point the golfer goes to a nearby reference point and creates a new eFilter to compute the following:

$$Lat E = Lat - Lat S$$

$$Lon E = Lon - Lon S$$

When the golfer goes to the location for a new reference point and marks it, if the eFilter is on, the Lat/Lon for the reference point is adjusted and saved as follows:

$$Lat RM = Lat - Lat E$$

$$Lon RM = Lon - Lon E$$

Where

LatS=Lat of known reference point in prior survey
LonS=Lon of known reference point in prior survey
LatE=eFilter Lat correction value
LonE=eFilter Lon correction value
Lat=current GPS Lat reading
Lon=current GPS Lon reading
LatRM=Modified Lat of new reference point saved in networked data set
LonRM=Modified Lon of new reference point saved in networked data set The Lat/Lon saved for the new reference point is effectively modified to match the environmental conditions of the original networked data set so that it can be treated as part of that networked data set.

This same technique can be used to later remark a reference point for a hole that perhaps was originally marked with poor position quality (e.g. the number of satellites in use dropped momentarily when the point was marked).

eFilter2 Adjustments for Projected Environmental Conditions

In one embodiment of the present invention, software can also access a table of correction values for projected environmental conditions for a specific period of time in order to more accurately determine distances to pre-defined points of interest on a golf course. Before playing a course, the golfer loads corrections for the projected environmental conditions for the day the golfer plans to play. These corrections are in the form of Lat/Lon adjustments based on the date and time of day. With SA turned off, the major error factor will be changes in the ionosphere. Since effects of the sun on the ionosphere can be generally predicted at any given time for a specific location, a table of Lat/Lon adjustment values can be generated for that specific location for a specific day and for specific time periods during that day.

The software at any given time would look up the Lat/Lon adjustment values in the table (referred to herein as eFilter2 adjustment values) for the current date and time to adjust for the predicted environmental conditions and apply them as follows:

$$Lat TA2 = Lat T + Lat E2$$

$$Lon TA2 = Lon T + Lon E2$$

Distance from the current position (Lat/Lon) to a target is then computed using LatTA2/LonTA2 rather than LatT/LonT.

Where

LatE2=eFilter2 Lat correction value from table for a specific date and time period
LonE2=eFilter2 Lon correction value from table for a specific date and time period
Lat=current GPS Lat reading
Lon=current GPS Lon reading
LatT=Lat of target point in a pre-defined survey
LonT=Lon of target point in a pre-defined survey
LatTA2=Adjusted Lat of target point
LonTA2=Adjusted Lon of target point As long as the current environmental conditions match the predicted conditions, distances will now be corrected to a higher degree of accuracy.

By using eFilter2, the original survey performed by the golfer will be recorded to a higher degree of accuracy. For example, when performing the original survey of a course, the golfer would turn on eFilter2 but not the basic eFilter (based on reference points) described earlier. With eFilter2 turned on, the recorded Lat/Lon for target(s) would be computed and saved as follows:

$$Lat TM2 = Lat - Lat E2$$

$$Lon TM2 = Lon - Lon E2$$

Where

LatTM2=Modified Lat of target point saved in networked data set
LonTM2=Modified Lon of target point saved in networked data set As long as the current environmental conditions match the predicted conditions, distances will now be corrected to a higher degree of accuracy reducing the effects of changing environmental conditions after a reference point is marked.

The distances computed during play can also be made less susceptible to changing conditions in between reference points. Before playing a course, the golfer can load corrections for the projected environmental conditions for the day he plans to play. These corrections are in the form of Lat/Lon adjustments based on the date and time of day. Also, by having one or more reference points included in a pre-defined survey of known points of a golf course, the golfer can correct for the current environmental conditions for a period of time in order to correctly determine distances to the pre-defined points of interest. Before starting play, the golfer could turn on eFilter2 to constantly adjust for predicted changes in the environment. The golfer then goes to the first reference point and taps a button on his PDA to instruct the software to compute the basic eFilter for current environmental conditions. As the golfer plays the course, if both the basic eFilter and eFilter2 are turned on, all target Lat/Lons are adjusted by the correction values as illustrated below:

When button is pressed at the 1st reference point:

$$\text{Lat}E=\text{Lat}-\text{Lat}S-\text{Lat}E2$$

$$\text{Lon}E=\text{Lon}-\text{Lon}S-\text{Lon}E2$$

The adjusted Lat/Lon of a target position is then computed as follows when both eFilters are on:

$$\text{Lat}TA=\text{Lat}T+\text{Lat}E+\text{Lat}E2$$

$$\text{Lon}TA=\text{Lon}T+\text{Lon}E+\text{Lon}E2$$

Distance from the current position (Lat/Lon) to a target is then computed using LatTA/LonTA rather than LatT/Lon.T, where
- LatS=Lat of reference point in pre-defined survey
- LonS=Lon of reference point in pre-defined survey
- LatE=eFilter Lat correction value
- LonE=eFilter Lon correction value
- Lat=current GPS Lat reading
- Lon=current GPS Lon reading
- LatE2=eFilter2 Lat correction value from table for a specific date and time period
- LonE2=eFilter2 Lon correction value from table for a specific date and time period
- LatT=Lat of target point in a pre-defined survey
- LonT=Lon of target point in a pre-defined survey
- LatTA=Adjusted Lat of target point
- LonTA=Adjusted Lon of target point Elevation Adjustments If altitude is recorded for each target in addition to its Lat/Lon position, the 3D distance from the golfer's current position to any target can be computed to include eFilter adjusted differences in elevation.

When the golfer goes to a reference point and taps a button on his PDA to instruct the software to correct for current environmental conditions, the current altitude (Alt) is also compared to the surveyed altitude (AltS) for the point and the difference in altitude computed. This difference is included with the correction values for Lat/Lon as eFilter correction values (LatE/LonE/AltE). As the golfer plays the course, if the eFilter is turned on, all target Lat/Lon/alt (LatT/LonT/AltT) are adjusted by the eFilter correction values (LatE/LonE/AltE) as illustrated below:

When button is pressed at the first reference point, compute LatE and LonE as previously described, as well as, the following:

$$\text{Alt}E=\text{Alt}-\text{Alt}S$$

The adjusted Lat/Lon (LatTA/LonTA) of a subsequent target position is then computed as previously described, as well as, the adjusted Alt (AltTA) of the target as follows:

$$\text{Alt}TA=\text{Alt}T+\text{Alt}E$$

The difference in elevation between the golfer and the target point is then computed as follows:

$$\text{ElevDist}=\text{Alt}TA-\text{Alt}$$

For computing three dimensional (3D) distances for golf, the effects upon the golf trajectory due to differences in elevation should also be considered. The effective 3D distance to an uphill target is greater than the straight line 3D distance between the two points due to motion dynamics of the golf ball in flight and "more club" (typically a lower club number) is needed that a straight line 3D distance would indicate. Likewise the effective distance to a down hill target is less than the straight-line 3D distance between the two points and "less club" is needed. The effective distance from the golfer's current position (Lat/Lon/Alt) to a target can be computed using LatTA/LonTA/AltTA rather than LatT/LonT/AltT as follows:

$$\text{LatLonDist}=\text{Sqrt}((((\text{Lat}TA-\text{Lat})*\text{Yds/Lat})**2)+ (((\text{Lon}TA-\text{Lon})*\text{Yds/Lon})**2))$$

$$\text{EffDist3}D=\text{Sqrt}((\text{LatLonDist}**2)+(((\text{Alt}TA-\text{Alt})*\text{Yds/Mtr}*\text{EF})**2))$$

Or the two equations can be combined as follows:

$$\text{EffDist3}D=\text{Sqrt}((((\text{Lat}TA-\text{Lat})*\text{Yds/Lat})**2)+ (((\text{Lon}TA-\text{Lon})*\text{Yds/Lon})**2)+(((\text{Alt}TA-\text{Alt})*\text{Yds/Mtr}*\text{EF})**2))$$

Where
- AltS=Altitude of reference point in pre-defined survey
- AltE=eFilter altitude correction value
- Alt=current GPS altitude reading
- AltT=altitude of target point in a pre-defined survey
- AltTA=adjusted altitude of target point
- Yds/Lat=Yards per latitude for that region of the earth
- Yds/Lon=Yards per longitude for that region of the earth
- Yds/Mtr=Yards per Meter (assuming the GPS reports altitude in meters)
- EF=Elevation Factor (>1 for uphill targets, <1 for downhill targets)
- LatLonDist=2D distance computed using Lat/Lon data
- EffDist3D=Effective 3D distance computed using Lat/Lon and Altitude data The value for EF can be determined from a simple trajectory model that produces values greater than 1 for uphill targets and less than 1 for down hill targets. A value of EF=1 produces the straight line 3D distance. More involved models can take into account the air density based on the current altitude. Other sensors can be added to the PDA/GPS combination such as humidity and temperature to include in the trajectory model that produces the value for EF. If available, wind speed and direction could also be factored in.

When a golfer adds new targets to a networked data set with the eFilter on, the altitude for the target(s) are adjusted and saved as follows: AltTM=Alt−AltE Where
- AltE=eFilter altitude correction value
- Alt=current GPS altitude reading
- AltTM=Modified altitude of target point saved in networked data set Similarly, when adding a new reference point with the eFilter on, the altitude for the reference point is adjusted and saved as follows:

$$\text{Alt}RM=\text{Alt}-\text{Alt}E$$

Where
- AltE=eFilter altitude correction value
- Alt=current GPS altitude reading
- AltRM=Modified altitude of new reference point saved in networked data set Target Outlines Targets have been primarily described as single point targets, but in fact can also be target outlines consisting of a series of Lat/Lon/Alt points. The target outline could be the outline of the green, a bunker, a water hazard, etc. The distance from the golfer to any point on the target outline can be computed in the same manner as already described when computing the distance from the golfer to a single target point. The eFilter adjustments can be applied to all points along the outline to correct for differences in environmental conditions in the same manner as previously described for a single target point. Distances to significant points along the outline (e.g.

front/back as viewed from the golfer's current position) that have been adjusted for differences in environmental conditions can be displayed on a graphics screen displaying the outline, or to any point along or within the outline that the golfer indicates (e.g. by touching a point along the outline).

Figure 35:
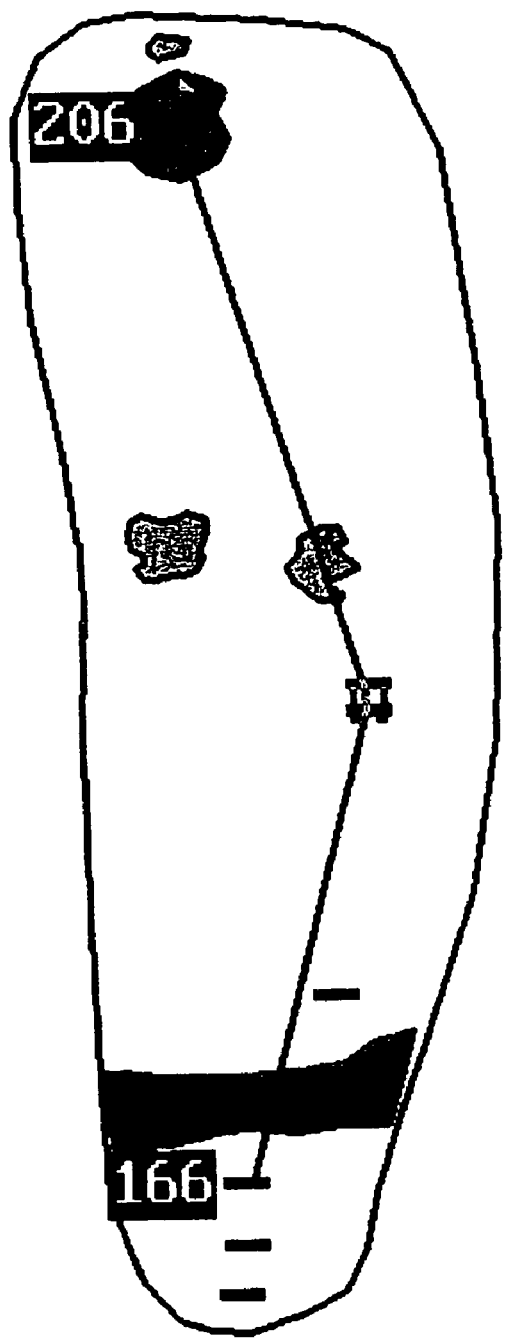
FIG. 35 shows a hole view display of a plurality of targets, a golfer's current position, and certain calculated distances in accordance with an embodiment of the present invention.

Target outlines one or more holes can also be displayed one or more display screens along with the current position of the golfer as he drives or walks along the course and stops next to his golf ball. Distances to targets from his ball position and how far the ball was hit can also be calculated, displayed and viewed by the golfer. FIG. 35 illustrates an example of a screen display showing a hole view of all targets, the golfer's current position, calculated distance to the green, i.e., 206 yards, and calculated distance the golf ball was hit by the golfer, i.e., 166 yards.

Mobile Golfer Dynamics Toolset

In order to provide optimal performance on a golf course, the motion dynamics of a mobile golfer must be considered. Since the PDA is a hand held device, the attached GPS can experience moderate speeds while the golfer is in a golf cart, low speeds while the golfer is walking, and many pauses while the golfer is waiting to hit the ball. This is notably different motion dynamics from a GPS used for other applications such as in a vehicle traveling down the highway. While most of the time there will be a clear view of the sky during normal play, some tees boxes may have close-by foliage, balls are hit out of the fairway and some cart paths go under covered areas. GPS signals can bounce off nearby objects resulting in position errors due to effects of multipath. It is important to tune the operation of the GPS device to reduce the impact of these short-term events and at the same time quickly recover from such events.

A Mobile Golfer Dynamics Toolset (MGDT) that can allow the capture and analysis of GPS output data under varying conditions in one embodiment of the present invention tailors the GPS device to the motion dynamics of a mobile golfer. The MGDT implemented to support the development of one embodiment of the personal golfing assistant of the present invention is capable of capturing essential GPS data during both regular play and during the survey process with and without the eFilter adjustments previously described. This toolset is also able to compare captured data to precisely surveyed known points of reference and produce statistical summaries as well as visual graphical plots of the results. The motion dynamics of the handheld GPS, as well as the effects of using different tunable parameters, can be viewed.

The Mobile Golfer Dynamics Toolset (MGDT) of one embodiment of the present invention is comprised of several components:

1) A software module that runs on a PDA that sets the GPS tunable parameters and captures GPS output data under varying conditions that replicate the motion dynamics of a mobile golfer. GPS data can also be captured during both regular play and during a survey process with and without the eFilter adjustments previously described. This is accomplished by tapping a "Start" button on the user interface. This initializes communications with the GPS device, assigns a reference tag to the data and continuously captures all GPS data including, but not limited to, latitude, longitude, altitude, number of satellites, and HDOP (Horizontal Dilution of Precision). The data is stored in memory on the PDA for later analysis using the analysis module described below. The data capture is stopped by tapping an "End" button on the user interface. Using this process, data may be captured for analysis in the environment the GPS device will be used.

2) A software module that loads the captured data, translates and formats the data for use in the analysis software described below. This is accomplished by reading the reference tag associated with the data and the captured GPS data saved on the PDA. In one embodiment, latitude and longitude data is translated from the GPS output into decimal degree format in order to facilitate plotting of the data. The algorithm for this translation is: $(+/-)$ $ddd+(mm \cdot mmm/60)$, where d is Degrees of latitude and longitude and m is decimal minutes of latitude and longitude. The leading $(+/-)$ refers to latitude north $(+)$ or south $(-)$ and longitude east $(+)$ or west $(-)$. The data is then formatted by separating the data sets with commas (comma separated values—CSV) and opening and writing a new file for use by the analysis software.

3) A software analysis module that runs on a PC and compares the captured data to precisely surveyed known points of reference and produces statistical summaries, as well as visual graphical plots of the results. This is accomplished by loading the file produced by the translation software referred to above into a spreadsheet or other analysis software. The data is loaded into the spreadsheet or other analysis software and compared to known surveyed data points, i.e., Control Points. Statistical analysis of the data sets is comprised of the standard deviation calculated for the data as well as the average, minimum and maximum deltas or difference from the Control Points. Additionally, plots are generated with reference to the Control Points for visual analysis of the data to determine the relative and absolute patterns of the data sheets. (See the figures referenced below.) This is an iterative process and is done for each set of parameters used. As the data sets are compared, the motion dynamics of the handheld GPS can be viewed, as well as the effects of using different tunable parameters. Based on the results of this process the optimal settings for the tunable parameters of the GPS unit can be determined for each particular course, locality or even individual golfer. The motion dynamics analysis that this module provides is described below.

For the eFilter to work properly, the GPS must perform in such a manner that points surveyed within a short time interval have similar offset errors from the actual location. FIG. 13 was produced by the MGDT of one embodiment of the present invention for a series of test points along an XY grid showing the handheld GPS positions recorded over time without any DGPS corrections. This analysis shows that even though the GPS positions are "off", they differ from the correct position by similar amounts and thus retain their relative distances to each other as a networked data set of points. FIG. 14 shows similar results for the same handheld GPS using WAAS to obtain and apply DGPS corrections. This shows that DGPS increases the accuracy as expected, and that this GPS was also programmed properly to produce a networked data set of points. FIG. 15 shows the results of a GPS that although is in general more accurate than the one shown in FIG. 13, it produces points that are not networked and thus cannot benefit from the use of the eFilter.

FIG. 16 shows the results of a GPS that experienced a short-term event that momentarily effected the position accuracy of one point, but used properly tuned parameters to quickly recover from the event. FIG. 17 shows the results of a GPS without appropriate tunable parameters that experienced a similar short-term event, but the effect on the position accuracy was propagated over a period of time and over several points in a manner that would significantly affect the golfer's ability to use of the GPS on a golf course.

Tunable GPS Parameters

As illustrated in the previous section, a GPS that does not use tunable GPS parameters configured for the mobile golfer can produce disappointing results. It may work fine for other applications of GPS, but not for the golf course environment. Any GPS unit that is programmable and configurable with the required parameters may be used. These include, but are not limited to, Magellan GPS for Palm V and Handspring Visor series, GeoDiscovery Geode, BAE Systems AllStar, Garmin, Trimble and Rockwell GPS units with RS-232 interface. Several parameters have been identified that need to be tuned to produce optimal results for a specific course. These configurable parameters include position averaging, satellite elevation masking, satellite signal strength masking, carrier phase smoothing and pseudorange filtering. Each of these parameters is known configurable parameters in GPS applications. Carrier phase smoothing pertains to filtering of the actual GPS carrier signal for use as a reference in the GPS calculations internal to the GPS unit. Pseudorange filtering pertains to the smoothing of the individual calculated ranges to the GPS satellites prior to their use in producing a GPS navigation solution as output from the GPS unit. The software module that controls the GPS configuration parameters is referred to herein as a "Smart Filter" or an "sFilter". The sFilter's function is to dynamically allow the individual mobile golfer to set or monitor the parameters used to average out the effects of multipath and other GPS signal errors. The ability of one embodiment of the present invention to be able to group a set of parameters that have been fine tuned to optimize the accuracy of the GPS for a specific course or individual golfer enables the system to perform optimally given the general environmental conditions of a specific course. For example, a GPS on a course in the desert may operate best with low satellite elevation masking and a large carrier phase smoothing filter. However if these same settings were used on a course in a valley or one with large buildings nearby, the golfer could experience less than optimal results, whereas in this case, an sFilter setting with a higher satellite elevation mask and a smaller carrier phase smoothing filter would work better. The present invention allows the golfer to set the configurable parameters on his own or to download an optimized set of configurable parameters for a particular course from an outside source. In addition, an optimized set of configurable parameters could be automatically determined by the PDA using a MGDT, such as that described above.

These tunable parameters can be revised over time for a specific course as more golfers use the system and learn the best values for that course. These values can be published so that the golfer can set the tunable GPS parameters before starting play on a course. The tunable GPS parameters could also be electronically provided to the golfer through various techniques described in the next section to further automate this process.

Data Exchange

Basic course position data and GPS tunable parameters may be beamed or transmitted to other nearby golfers. Also, the results of any of the actions previously described can be beamed via a PDA infrared port or transmitted wirelessly to other nearby golfers to enable them to use the results of those actions without having to perform those actions themselves. In particular, this allows one person in a group, or a caddie, to be the designated person that periodically goes to specific reference points and creates new eFilters for the current environmental conditions. The new eFilters can then be transmitted in real time while playing the course to the other members in the group to enable them to more accurately determine distances to a pre-defined survey of known target points on a course. Unlike DGPS type corrections that apply just to your current position, these adjustments are applied to all target Lat/Lon values within a networked data set thereby retaining their distance relationships between targets within the networked data set. It also allows a person to go in advance of the group to mark new targets that may not exist in the pre-defined course survey and beam or transmit the new targets to the other members in the group so they can have immediate access to computed distances to the new targets adjusted for current environmental conditions in real time while they are playing the course. The beaming flowchart process is shown in FIG. 12.

In order to further enhance the accuracy of this system, the Lat/Lon adjustments for a specific area (including modeling as well as current environmental analysis) can be periodically transmitted to the handheld GPS device via satellite, wireless interne, infrared beaming or other communications for the current date and time. Again, unlike DGPS type corrections that apply just to your current position, these adjustments are applied to all target Lat/Lon values within a networked data set thereby retaining their distance relationships between targets within the networked data set.

In order to further enhance the usability of this system this invention would allow the user to upload the target/avoidance objects and points data that the user has surveyed to a central processing computer via a PC and/or landline and/or wireless link. The central processing computer would apply certain quality control checks to the data and then make it available for download back to the users PDA via the above channels. The tunable GPS parameters specific to this course can also be inserted into the course database to enable other golfers who use this course data to automatically update their GPS with the tunable parameters for this specific course. Once the central processor processed the data, it would be available for other golfers to download by suitable agreement. One embodiment of the present invention uses a website that would provide a means for accomplishing this exchange of data.

User Interface

Figure 18:
FIG. 18 shows a main screen of a PDA user interface of one embodiment of the present invention.

Since the system of the present invention is a target-based system rather than an image-based system, it provides a simplified user interface to quickly determine distances to key targets as shown in FIG. 18. FIG. 18 illustrates one embodiment of a main screen which contains and displays an accuracy potential percentage (AP %) to provide the golfer with an indicator of the relative accuracy of the distances displayed. In one aspect, the accuracy potential percentage could be a percentage from 0-100% based on the number of satellites used in the solution using a table lookup. This value can be further enhanced by factoring in the Horizontal Dilution of Precision (HDOP) or PDOP values which are an indication of accuracy based on the current satellite geometry. Again a table lookup could be used since lower values of HDOP or PDOP translate to higher values of accuracy. Other factors could also be included when computing the AP % such as the elevations and signal strengths of the satellites used in computing the position solution.

Figure 19:
FIG. 19 shows an adding targets screen of a PDA user interface of one embodiment of the present invention.
Figure 20:
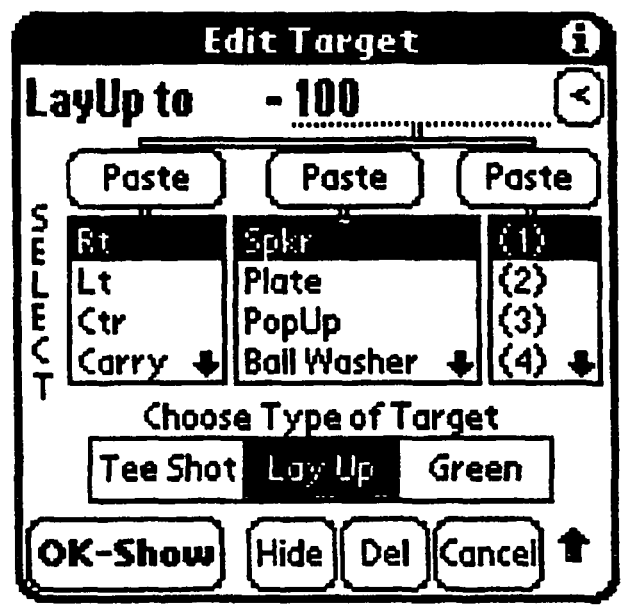
FIG. 20 shows an adding target descriptions screen of a PDA user interface of one embodiment of the present invention.
Figure 21:
FIG. 21 shows a recording target location screen of a PDA user interface of one embodiment of the present invention.
Figure 22:
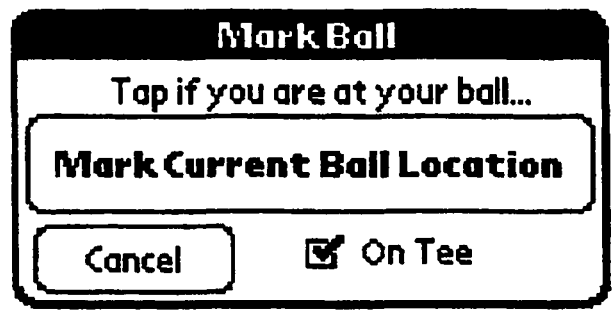
FIG. 22 shows a marking current ball location screen of a PDA user interface of one embodiment of the present invention.
Figure 23:
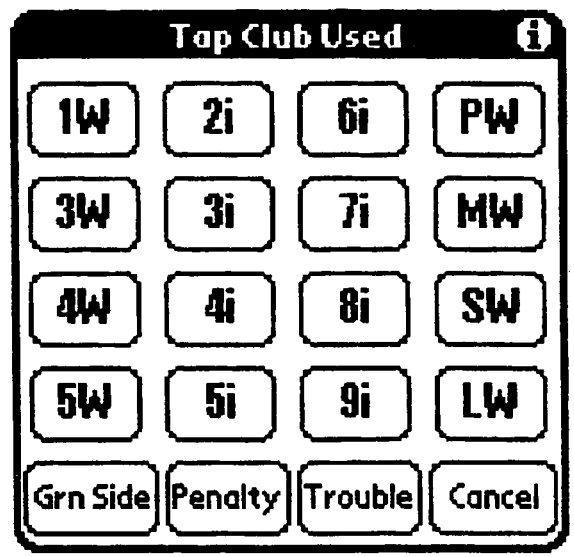
FIG. 23 shows a recording club used screen of a PDA user interface of one embodiment of the present invention.
Figure 24:
FIG. 24 shows a green targets screen of a PDA user interface of one embodiment of the present invention.

Targets can easily be added beforehand or during play by selecting from a list of common golf targets as shown in FIG. 19 and further describing the targets with additional text or by selecting from lists of common golf descriptors as shown in FIG. 20. Recording a target's location is accomplished by standing at the target, tapping on a target that has been added to the list on the screen and then tapping the record target button as shown in FIG. 21. A mark ball button is provided at the end of the target list to allow the golfer to stand over the ball and tap the button to record the current location of the ball as shown in FIG. 22 and select the club used from a list of clubs tailored to what is currently in the golfer's bag as shown in FIG. 23. Targets are categorized to limit the list to targets of interest (e.g. Green targets) as shown in FIG. 24. This simplified user interface makes it practical for golfers to be able to easily setup and survey their own courses without depending upon any additional equipment or expertise.

SUMMARY OF ONE EMBODIMENT

In another aspect of the present invention provides a compact, simplified and user friendly device and process to capture real world geo-location data that is of interest to a user, analyze that data and present it to a golfer in a useful and beneficial manner. One example of the present invention is an electronic or computerized device operating in conjunction with a global positioning system (GPS) device that enables users to carryout a variety of functions relating to navigation, surveying, GPS analysis, and GPS data error correction for golfing locations. Such a device or apparatus can be a handheld personal digital assistant (PDA) used with or connected to a GPS device to enable a golfer to, among other functions, measure and display distances between a golfer and an object on a golf course, obtain and process location values for a desired point on a golf course, determine environmental condition error correction factors, survey and/or electronically input and record target and avoidance locations of a golf course, and determine the relative elevation to selected targets or objects. The PDA will typically have golfer-specific integrated systems and applications software, and will be electronically connected, via an appropriate communication link, to a GPS receiver with tunable parameters.

Further, the PDA may comprise a computing environment where files, data and information can be entered or recorded directly by the golfer or downloaded to and uploaded from the PDA. For example, existing or pre-surveyed data relating to various golf courses may be downloaded from a central locations, e.g., an interne web-site, to the PDA for use by a golfer prior to playing a golf course. Also, the PDA can comprise a means for the golfer to interface with the PDA, including a screen display where information and data can be presented to the golfer and inputs user actuated keys, buttons, and other user actuated input devices or components. Also, the screen display can be a touch-input screen where a user may enter data by touching the screen or using a mechanical or electromechanical device to directly interact with the touch-input screen.

Display of Golf Related Data

There is further provided an improved graphical method for measuring and graphically or visually displaying distances between a golfer or user and a target or object on a golf course, displaying the elapsed time a golf player has been playing a hole on the course and the cumulative total time elapsed, displaying wind direction information on a golf course, and displaying statistics of distance ranges for each golf club via a software application running on an electronic or computerized device connected to a global positioning system device. There is also provided a novel and improved graphical method for displaying multiple measured distances along a line of sight between a golfer and an object or target on the golf course, and for rotating or orienting a target or object on a display to coincide with a user's perspective or line of sight.

In an embodiment of the invention, golf course graphics are preferably displayed on a liquid crystal display (LCD) or other user output screen on a GPS enabled PDA, integrated GPS unit, GPS enabled cell phone or other electronic or computerized device able to download GIS data and operative with a GPS unit. Those of skill in the art will readily recognize that other real-time location techniques may be used, including cell phone signal triangulation. As technologies develop, GPS and other real-time location systems will become more and more accurate. The golf course graphics preferably comprise a green outline or topographical representation of the green (shown in FIGS. 25-28). Those of skill in the art will readily recognize that other golf course related graphics could also be displayed, including a full representation of the hole and associated features such as bunkers, water hazards, fairway targets, etc. Further, geo-referenced high-resolution satellite or aerial imagery may also be used as the display graphic. If the graphic to be displayed is larger than the display screen on the associated electronic or computerized device, the graphic may be appropriately scaled and/or scrollable to present the graphical information in a more user friendly manner.

On devices that use a touch screen display, the representative target area or object may be tapped by the user in order to select a position on the screen to derive the distance from the user to a selected target or object. Also, a crosshair cursor is preferably positioned on the screen at the point chosen and tapped. Alternatively, on devices without a touch screen, device keys, buttons or other input means may be used to move and position a crosshair cursor on the graphics displayed on the screen in order to select a target or object and determine the distance from the user to the selected target or object. The distance to the selected target or object is preferably derived and displayed on the device screen display, based on GPS and GIS information processed on the device.

Figure 25:
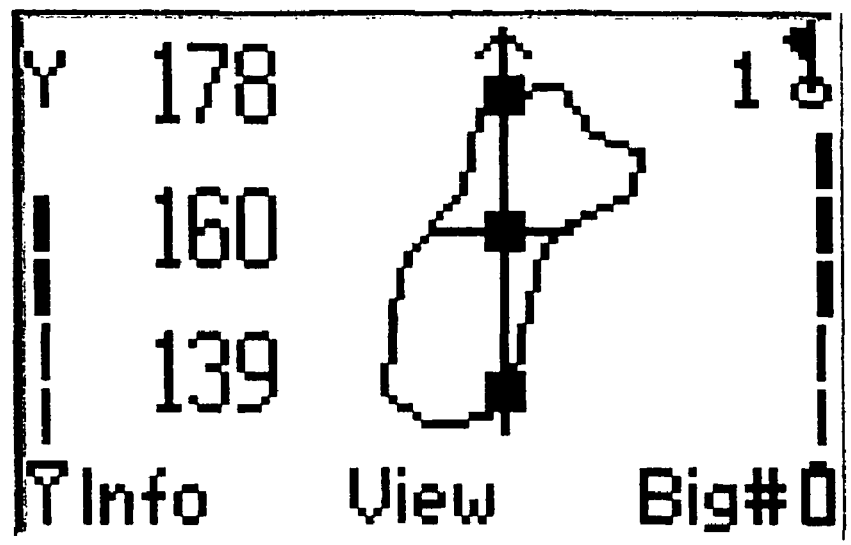
FIG. 25 shows a screen display, relative to the user's perspective, of measured distances between a golfer and a green on a golf course along with a crosshair set indicating distance to a center, front and back of the green in accordance with an embodiment of the present invention.
Figure 26A:
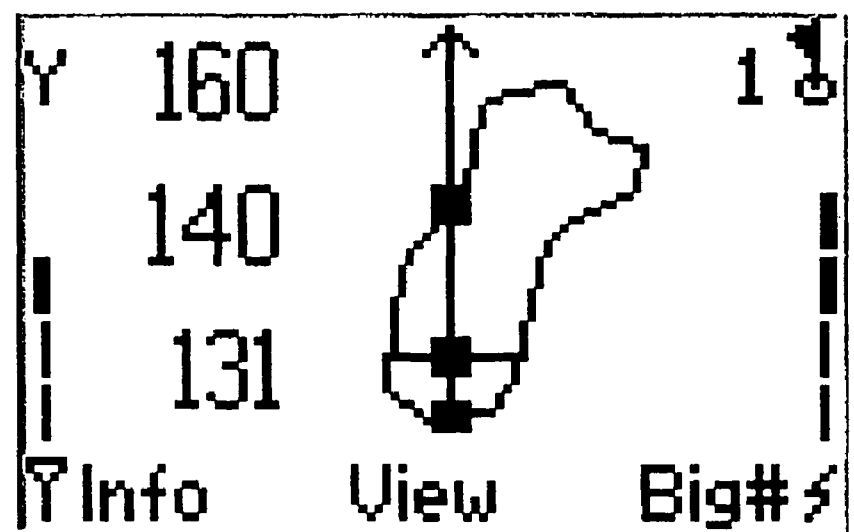
FIG. 26A shows the screen display of FIG. 25 where the user has moved the crosshair set to a position corresponding to a flag location on the green.
Figure 27A:
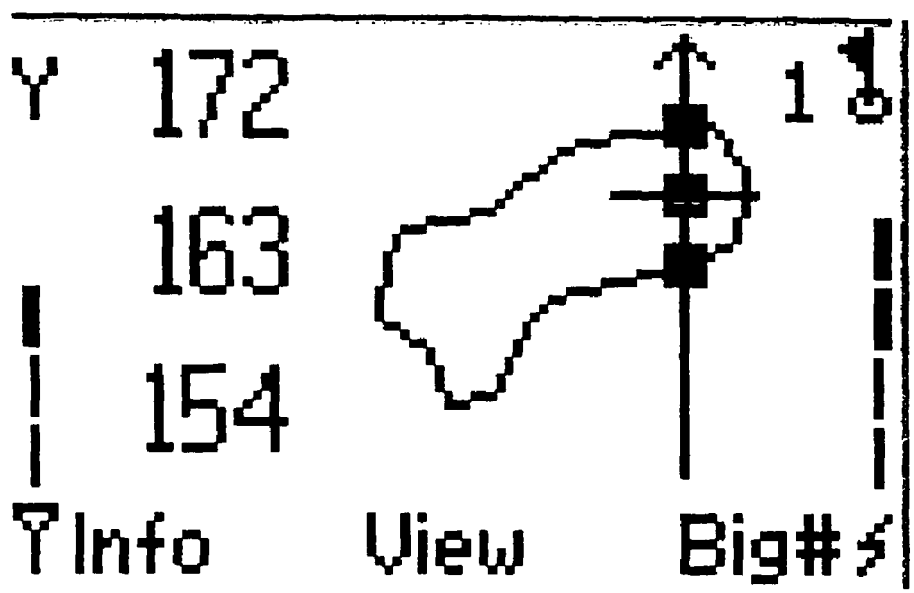
FIG. 27A shows a rotated image of the screen display of FIGS. 25 and 26A to show an actual and correct line of sight view for a user who has hit a ball to the left of the green.

As shown in FIGS. 25, 26A and 27A, in one case where an outline for a green is displayed on the screen, the crosshair cursor may be selectively positioned, moved or extended to intersect the front and back boundaries of the green as viewed from the golfer's current approach to the green. The terms user and golfer can be used interchangeably with one another. The green outline is preferably derived from a topographical representation of a green or geo-referenced satellite image of the green area, though other data and information may be used to create the green outline. Based on GPS, GIS or other location data and information, the distance from the user to the selected intersections of the cursor across on the green outline and central crosshair location is determined and displayed. In this manner, useful distance information to selected front, back and center crosshair locations on the green is calculated and displayed to the user. Those of skill in the art will readily recognize that distances for other multiply selectable targets or objects can also be determined and multiply displayed to a user in a similar fashion. Further, those of skill in the art will also appreciate that although FIGS. 25, 26A, 27A, 31A and 31B illustrate embodiments that preferably display three multiple distances on the screen, more or less distances could be displayed if desired by a user or golfer.

FIG. 25 illustrates one embodiment of a screen display, from the user's perspective, of measured distances between a golfer (user) and a green on a golf course along with a crosshair set indicating distance to a center, front and back of the green. There is shown a green outline, as viewed from the golfers approach to the green, with the crosshair originally located at the center of the green. The top and bottom numbers displayed correspond to the distance from the handheld PDA/GPS device to the top and bottom intersection points of the back and front of the green as determined by the position of the crosshair. Further, the center number is preferably the distance from the golfer to the center of the green.

FIG. 26A illustrates the screen display of FIG. 25 where the user has positioned or moved the crosshair set to a second position corresponding to a target or object for which information is desired by the user. For example, FIG. 26A could represent a screen display of a green outline where the user has moved the crosshair to the flag position on the green as estimated by the user or as indicated on a zone sheet for the that day. In addition to the distance to the current flag location, the golfer sees displayed distance information of how far he must hit the ball to get onto the green and the distance at which he would go over the green from the point where he is standing, i.e., distances to the front and back of the green.

Figure 39:
FIG. 39 shows a screen display, relative to the user's perspective, of measured distances between a golfer and a green on a golf course along with a crosshair set indicating distance to a center, front and back of the green as well contour features of the green in accordance with an embodiment of the present invention.

FIG. 39 illustrates an embodiment of a green display similar to that shown in FIG. 25 in which various features of the green are also represented. In FIG. 39, for example, a dark line of a contour indicates an upper ridge of a slope and shading shows the slope area from the upper right portion of the green to the center portion of the green. The bottom shaded areas on the left portions of the green represent a false front where the green slopes down to the edge of a green. A dark line generally represents the high point of the edge of a slope, false front or top of a hogs back (e.g. the top of a ridge sloping downward from both directions). The shading may be set so that various colors or shades represent different severities of slope, as in the case in FIG. 39 where the shading of a false front is distinguished from the less severe shading of a slope area on the green. In this case a yellow color, for example, may represent the false to act as a warning to the player, while a slope in the green may simply be represented as a lighter shade of green than the flat portions of the green.

The interface shown in FIG. 39 may also provide additional details regarding the green features as well. For example, the interface may be configured to display distances from the user's position to the edge of a false front or to the edge of a slope of the green. Moreover, as noted above, the cursor on the display may be manually moved by the user so that the crosshairs directly intersect a point of interest on the green based on the displayed green features. As noted above, the dark line may represent the high point of a slope. Thus the severity of the slope may be indicated by shading or coloring the slopes differently based on severity. Additionally, the green features may be annotated with icons representing the direction of slopes on the green. For example, the false fronts shown in FIG. 39 may include arrows indicating that the slope falls off towards the front of the green, and the slope in the middle of the green may also include arrows indicating that the slope is directed from the back to the front of the green. The arrows or other indicators used to indicate the direction of the slope may also be customized to indicate the severity of the slope. For example, the indicators may be long arrows representing a severe slope, or short arrows representing a less severe slope. There also may be more indicators placed closely together representing a severe slope, while indicators places further apart may indicate a less severe slope. The colors of the indicators may also be made different to indicate the severity of the contours of the green. Instead of arrows or colors, different patterns or textures (e.g. fill patterns) may also be displayed to indicate a contour on the green. Moreover, the fill pattern may also indicate a direction and/or severity of the contour. For example, a flat portion of the green may be displayed using a solid texture, while the slopes or contours may be represented using a cross-hatched pattern, thus differentiating the contoured area of the green from the flatter portions of the green. When a fill pattern is used, the density of this pattern, for example, may be used to indicate the severity of the contour, while the direction of the pattern may indicate the direction of the slope. As noted above, a solid line may also be used with the fill pattern to indicate a highest peak of a contour, while the direction and severity of the contour may be indicated by the fill pattern used to indicate the contour itself.

Figure 26B:
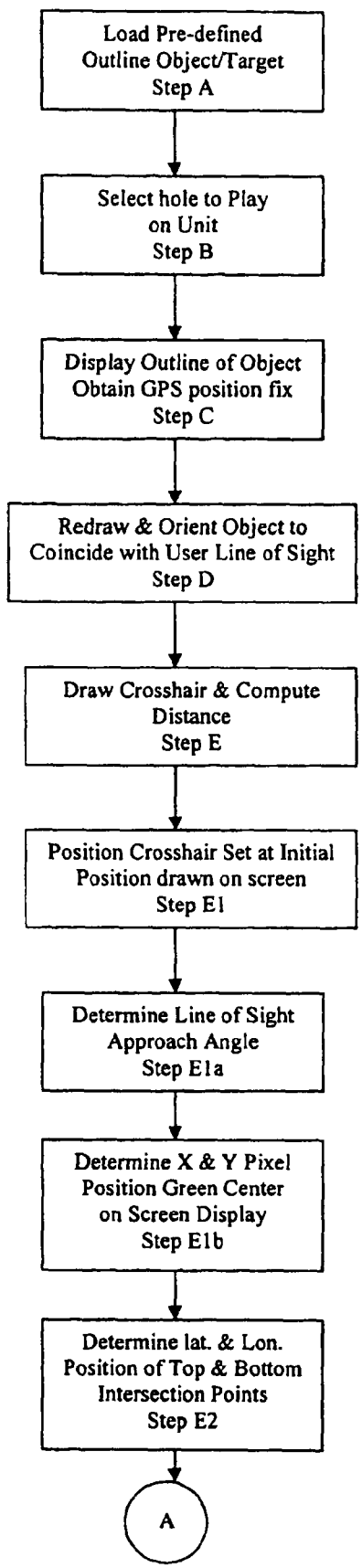
FIGS. 26B-26C show an embodiment of one preferred method to determine the crosshair distances from user's perspective.
Figure 26C:
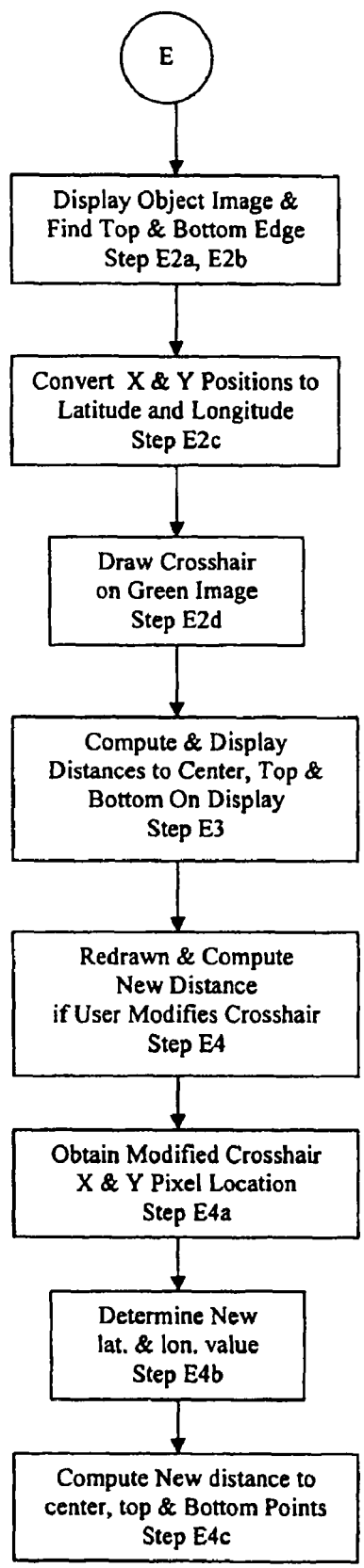

FIG. 26B illustrates an embodiment of a preferred method or process to implement determination of the crosshair distances from the golfer's perspective in a handheld PDA with a GPS device or unit having a graphics display screen where an X pixel position increases from left to right and a Y pixel position increases from top to bottom.

In Step A, the Golfer loads the unit's memory with a pre-defined green outline and/or outline of other objects and the center location of the green. The green outline points can be (a) a set of latitude and longitude pairs for each point on the outline that are to be connected by lines; (b) a graphics image that has been geo-referenced, e.g. the latitude and longitude of at least 2 pixels are given; or (c) a series of x,y pixel locations to be connected by lines with the latitude and longitude of the center of the object provided along with the object's orientation from due north and a scale factor used. In a preferred method, the green outline points are a series of x,y pixels as described in (c) above. Alternatively green outline point forms (a) or (b) could be used, and would have to be converted to form (c) before performing the following steps.

In Step B, the golfer takes the unit to a golf course, turns it on and selects a hole to begin play. In Step C, the outline of the object could be displayed before a GPS position fix is obtained by either displaying the image oriented due north or with the front of the green or object at the bottom of the screen. In Step D, when the GPS device obtains a position fix, the green or object is redrawn, oriented such that it is displayed as seen from the golfers line of sight to the green or object.

In Step E, the crosshair set can be drawn on the screen and distances computed and displayed preferably as follows:

In Step E1, the crosshair set is positioned by the user at an initial location on the screen. This could be either the center of the screen or a point that represents the center of green. If the center of the green is used as the initial position of the crosshair, the center of the green's latitude and longitude must be converted to an XY graphics point. The latitude and longitude of the center of the green target will be converted to an XY graphics point on the screen.

In Step E1a, a golfer's line of sight angle of approach is determined, preferably by the following calculations:

$$GX = (GLon - LonCenter) * YdsPerLon * LonScale$$

$$GY = (GLat - LatCenter) * YdsPerLat * LatScale$$

$$GA = a\tan(GY/GX)$$

where:
GA=user's line of sight angle to center of screen
GX=number of pixels from center in x direction of the golfer's position
GY=number of pixels from center in y direction of the golfer's position
GLon=longitude of golfer's position
GLat=latitude of golfer's position
LonCenter=longitude of center of screen
LatCenter=latitude of center of screen
YdsPerLon=yards per longitude at the golf course
YdsPerLat=yards per latitude at the golf course
LonScale=longitude scale factor used to fit green onto the display, and
LatScale=latitude scale factor used to fit green onto the display.

Step E1b is used to determine the X & Y pixel position of the center of green from the center of screen, preferably by the following calculations:

$$X1 = (CLon - LonCenter) * YdsPerLon * LonScale$$

$$Y1 = (CLat - LatCenter) * YdsPerLat * LatScale$$

$$X2 = X1 * \cos(-GA) - Y1 * \sin(GA)$$

$$Y2 = X1 * \sin(-GA) + Y1 * \cos(GA)$$

$$CX = Xcenter + X2$$

$$CY = Ycenter - Y2$$

where values are same as in Step E1a above and:
 CX=x pixel position for the crosshair center
 CY=y pixel position for the crosshair center
 X1,X2=intermediate X values
 Y1,Y2=intermediate Y values
 CLon=longitude of center of green
 CLat=latitude of center of green
 Xcenter=x pixel position of center of screen, and
 Ycenter=y pixel position of center of screen.

In Step E2, the latitude and longitude of the top and bottom intersection points is determined. This requires scanning for the intersection of the crosshair vertical line with the top and bottom edge of the green and converting those XY points to latitude and longitude values as follows:

In Step E2a, the image of the green is displayed on the screen. In step E2b, starting at the current X & Y position of the center of the crosshair, scan the image upward until the top edge of the green is found, e.g. in the case of a green outline on a black and white screen, it is the point at which the pixels change from white to black. Then, starting at the X & Y position of the center of the crosshair, scan the image downward until the bottom edge of the green is found, in the case of a green outline on a black and white screen, it is the point at which the pixels change from white to black.

In Step E2c, the X & Y positions are preferably converted to latitude and longitude via the following calculation:

$$X1 = (X - Xcenter)$$

$$Y1 = (Y - Ycenter)$$

$$X2 = X1 * \cos(-GA) - Y1 * \sin(-GA)$$

$$Y2 = X1 * \sin(-GA) + Y1 * \cos(-GA)$$

$$ILon = (X2/LonScale/YdsPerLon) + LonCenter$$

$$ILat = (Y2/LatScale/YdsPerLat) + LatCenter$$

where symbols that are the same as in E1b above have the same meaning and:
 X1=x pixel location of intersection point
 Y1=y pixel location of intersection point
 ILon=longitude of intersection point or crosshair center, and
 ILat=latitude of intersection point or crosshair center.

In Step E2d, the crosshair set is preferably drawn on top of the green image with extended vertical lines up and down, and an arrowhead at the top to indicate the golfer's line of sight direction, as shown in FIG. 25.

In Step E3, the distances to the center, top and bottom points on the green are computed and displayed on the screen. Using the latitude and longitude values computed above, the following preferred calculations are performed to determine the image intersection points and center of the crosshair:

$$X1 = (ILon - LonCenter) * YdsPerLon$$

$$Y1 = (ILat - LatCenter) * YdsPerLat$$

$$D = \sqrt{X1 * X1 + Y1 * Y1}$$

Where values are same as in E2c above and:
 D=distance in yards from golfer to the point.

In Step E4, if the golfer moves the crosshair on the screen or touches a different point on the green, then the screen is redrawn and a new distance is computed, preferably as follows:

In Step E4a, a new X & Y pixel location of the crosshair is preferably obtained after the crosshair has been moved or after the golfer has touched the screen, as follows:
 CX=x value of new crosshair center
 CY=y value of new crosshair center In Step E4b, new latitude and longitude values of the top and bottom intersection points on the green image are determined as previously described in Step E2 above. In Step E4c, the distances to the center, top and bottom points are computed and displayed on the screen as described in Step E3 above.

If the golfer moves to a new location, then step E1a is performed before repeating Step E4 in order to adjust for the new angle of approach by the user to the green. Further, each point of the green outline should also preferably be rotated based on the new angle of approach to display the green outline as viewed from the golfer's new position as shown in FIG. 2. Otherwise, if the golfer skips Step E1b, then the crosshair will be left at the same point on the green where the golfer had previously positioned it rather than resetting it back to the center of green for the rotated green image.

An alternate embodiment of the present invention relating to the crosshair involves rotating the crosshair rather than the object or target to indicate the golfers approach angle to the object. The object would always be drawn in a standard orientation but the crosshair would be redrawn on the object in the direction that a golfers ball would ideally travel if hit straight toward the object. The same rotation formulae, as previously described in Steps E, would be used and applied to the crosshair rather than the object. For example, if the Golfer hit to the left of the green, the crosshair would appear to be drawn on the screen from left to right at an angle based on the Golfer's angle of approach to the green. The intersection points would be calculated and determined in a manner similar to that described previously by following the line out from the crosshair center to the points where it intersects the edges of the object. The latitude and longitude of these points would be determined and used to compute the distances displayed.

FIG. 27A illustrates a rotated image of the screen display of FIGS. 25 and 26A to show an actual and correct line of sight view, or perspective, for a user who has hit a ball to the left of the green. The green image is preferably rotated so that the golfer sees the image of the green oriented to his new actual line of sight view, or perspective, to the green due to the erroneous hit to the left of the green. The center of the crosshair is at the same point on the green as in the prior figure, but the top and bottom distance numbers now automatically reflect the target range the golfer must keep the ball within to be on the green, in this case 154 and 172 yards. Those of skill in the art will readily recognize that any displayed image, target or object may be similarly rotated or oriented such that the displayed image, object or target coincides with a user's perspective or line of sight.

Because of the GPS, or other real-time location information being processed on the unit, the unit always "knows" the vector to the selected target or object. The unit can then rotate the graphics on the screen to preferably display the target from the user's perspective, thus the distances are always relative to the user's line of sight and are automatically updated as the user's position physically changes in relation to the target or object area.

Figure 27B:
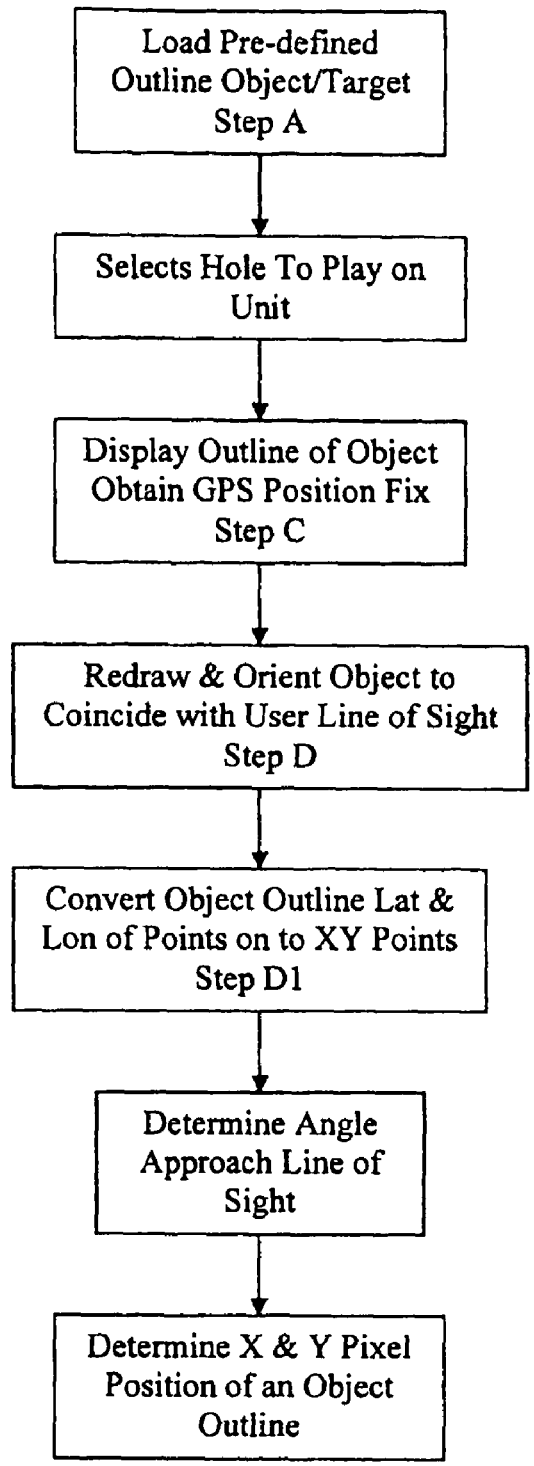
FIG. 27B shows an embodiment of a preferred method to rotate an object's outline to reflect the golfer's perspective.

FIG. 27B illustrates an embodiment of a preferred method or process to rotate an object's outline to reflect the golfer's perspective in a unit with a graphics screen where the X pixel position increases from left to right and the Y pixel position increases from top to bottom.

In Step A relating to FIG. 27A, the Golfer loads the unit's memory with a pre-defined green outline and/or outline of other objects. The green's outline points can be (a) a set of latitude and longitude pairs for each point on the outline that are to be connected by lines; (b) a graphics image that has been geo-referenced, e.g., the latitude and longitude of at least 2 pixels are given; (c) a series of x,y pixel locations to be connected by lines with the latitude and longitude of the center of the object provided along with the object's orientation from due north and the scale factor used. In a preferred method, the green outline points are a series of x,y pixels as described in (c) above. Alternatively green outline points forms (a) or (b) could be used, and would have to be converted to form (c) before proceeding to perform the following steps.

In Step B relating to FIG. 27A, the golfer takes the unit to a golf course, turns it on and selects a hole to begin play. In Step C, the outline of the object could be displayed before a GPS position fix is obtained by either displaying the image oriented due north or with the front of the green or an object at the bottom of the screen. In Step D, when the GPS device obtains a position fix, the green or object should be redrawn, oriented such that it is displayed as seen from the golfers line of sight to the green or object, preferably as follows:

In Step D1, the latitude and longitude of each point of the green outline are converted to XY points on the screen. In Step D1$a$, the golfer's line of sight angle of approach is preferably determined as follows:

$$GX = (GLon - LonCenter) * YdsPerLon * LonScale$$

$$GY = (GLat - LatCenter) * YdsPerLat * LatScale$$

$$GA = a\tan(GY/GX)$$

where:
GA=user's line of sight angle to center of screen
GX=number of pixels from center in x direction of the golfer's position
GY=number of pixels from center in y direction of the golfer's position
GLon=longitude of golfer's position
GLat=latitude of golfer's position
LonCenter=longitude of center of screen
LatCenter=latitude of center of screen
YdsPerLon=yards per longitude at the golf course
YdsPerLat=yards per latitude at the golf course
LonScale=longitude scale factor used to fit green onto the display, and
LatScale=latitude scale factor used to fit green onto the display.

In Step D1$b$, the X & Y pixel position of an outline point is determined or calculated as follows:

$$X1 = (OLon - LonCenter) * YdsPerLon * LonScale$$

$$Y1 = (OLat - LatCenter) * YdsPerLat * LatScale$$

$$X2 = X1 * \cos(GA) - Y1 * \sin(GA)$$

$$Y2 = X1 * \sin(GA) + Y1 * \cos(GA)$$

$$CX = Xcenter + X2$$

$$CY = Ycenter - Y2$$

where values are same as in Step D1$a$ above and:
CX=x pixel position for the outline point
CY=y pixel position for the outline point
X1,X2=intermediate X values
Y1,Y2=intermediate Y values
OLon=longitude of outline point
OLat=latitude of outline point
Xcenter=x pixel position of center of screen, and
Ycenter=y pixel position of center of screen.

If the golfer moves to a new location, Step D1$a$ should be performed to compute the change in the user's angle of approach to the object or target. If the change to a new location is more that a pre-set value, then Step D1$b$ is also performed to redraw the green outline from the golfer's new angle. If a small position change is used, e.g., less than a degree, the target or object will be redrawn often on the display screen by the system. This can be distracting to a user. Using a practical change of degrees, e.g., at least 5 degrees, will reduce the number of redraws and diminish distractions to the golfer. As the golfer gets closer to the green, the redraw function should preferably be inhibited in order to keep screen redraws to a minimum, especially as the unit reaches the singularity point. In a preferred embodiment, a practical value of several yards, e.g. 20 yards, from the center is used to inhibit redraws. However, lesser or greater values could be used.

The change in angle is preferably determined as follows:
First, the golfer's new line of sight angle to center of screen is computed by performing Step D1$a$, where NA=New line of sight angle. Then, determine the change in angle and then compare to a pre-set value as follows:

$$A1 = abs(GA - NA)$$

If(A1)>DA then redraw the green outline
where
GA=Golfer's original line of sight angle
DA=Pre defined delta angle value used to trigger a redraw, and
A1=intermediate angle value.

As noted above, the same processing applied to the green view feature may also be applied to other hazards or landmarks on the course. Such a configuration may be used to map out a specific hole on a course, as depicted in FIGS. 40-41.

Figure 40:
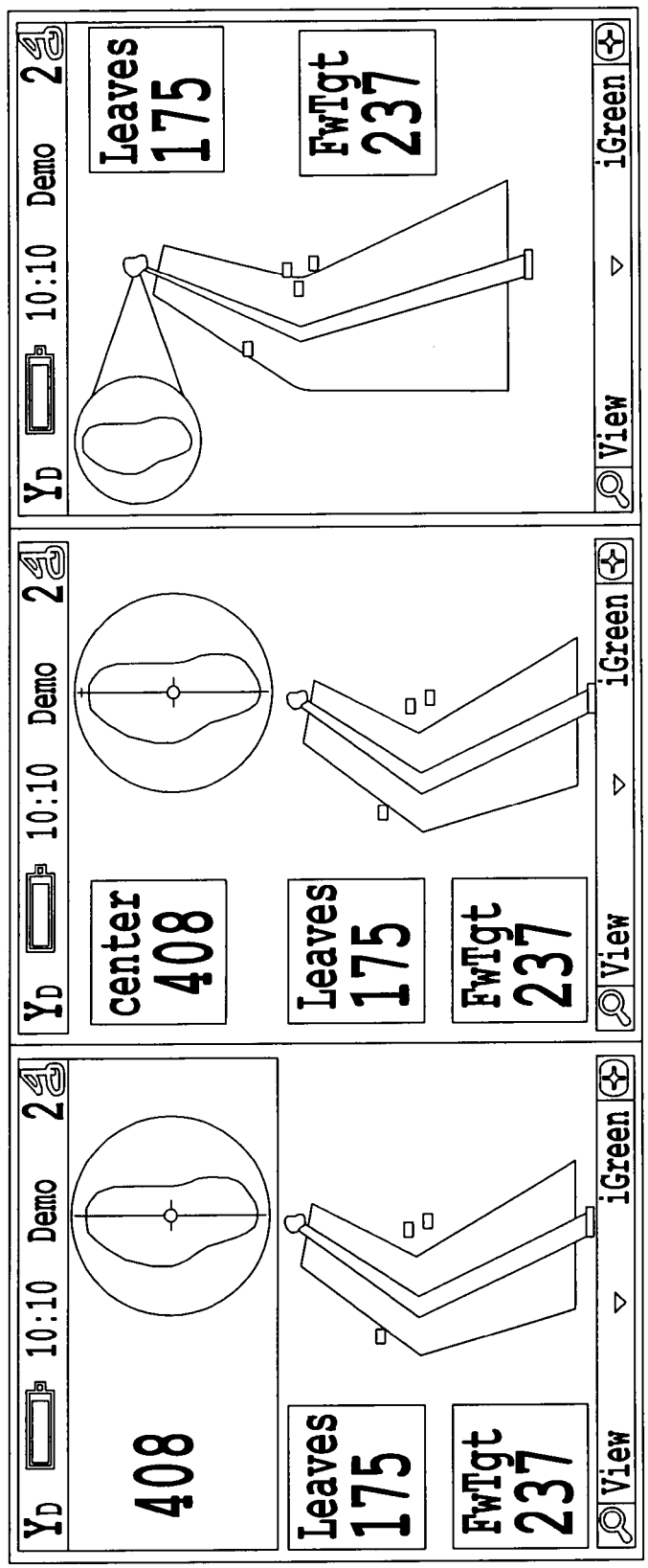
FIG. 40 shows a series of screenshots showing a hole view feature that allows a user to view an entire hole and a shot path on that hole, along with various icons representing hazards or landmarks along the shot path in accordance with an embodiment of the present invention.
Figure 41:
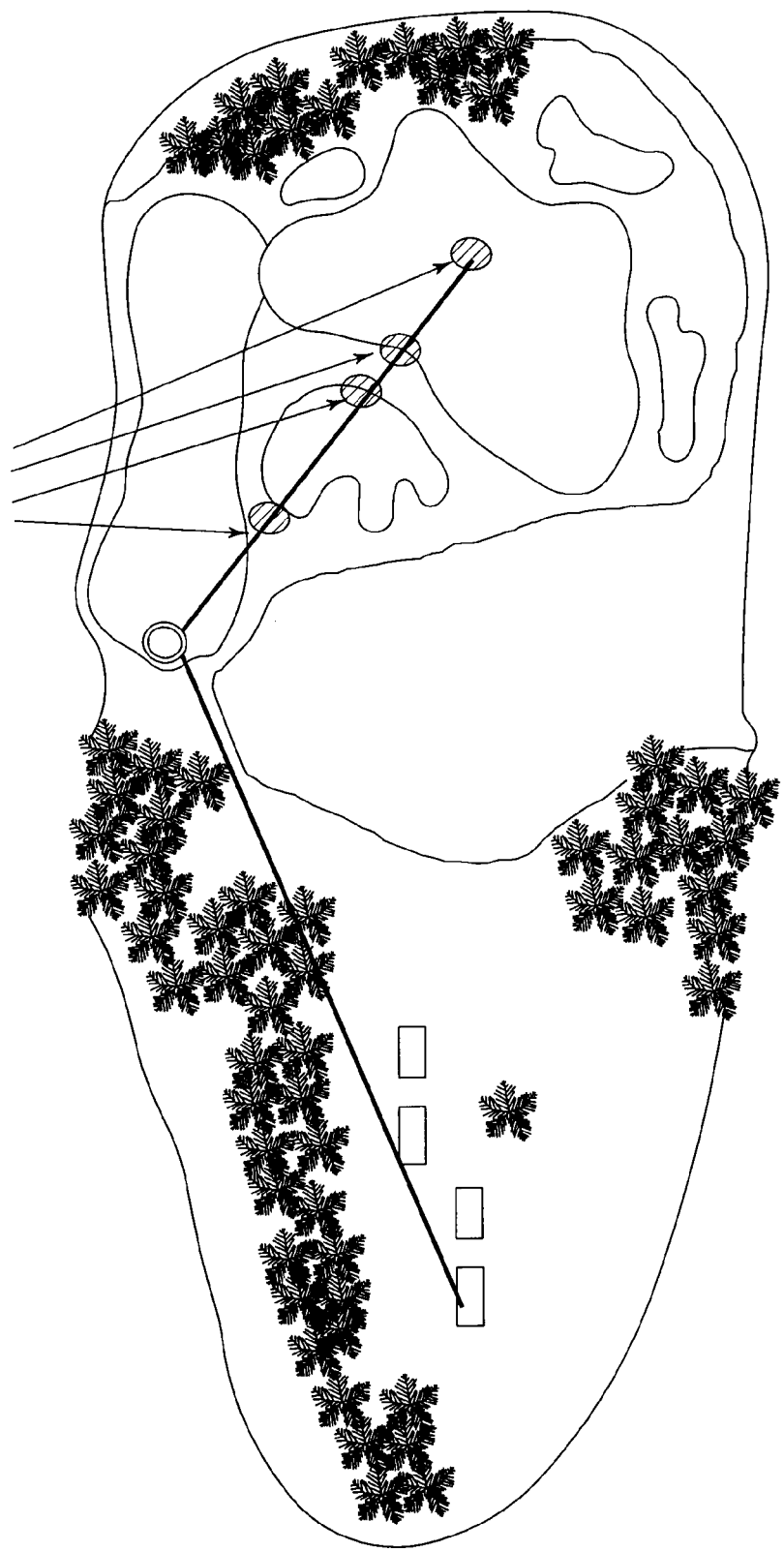
FIG. 41 shows a screenshot of a hole view feature in which a visual representation of the entire hole is displayed to a user, and distances to each of a plurality of landmarks along the shot path are displayed to a user in accordance with one embodiment of the present invention.

FIGS. 40-41 further elaborate on the Target Outlines feature depicted in FIG. 35 and described at p. 23. As disclosed above, targets can be target outlines consisting of a series of Lat/Lon/Alt points. The target outline could be the outline of the green, a bunker, a water hazard, etc. The distance from the golfer to any point on the target outline can be computed in the same manner as already described when computing the distance from the golfer to a single target point, or to various points on a green. Distances to significant points along the outline (e.g. front/back as viewed from the golfer's current position) that have been adjusted for differences in environmental conditions can be displayed on a graphics screen displaying the outline, or to any point along or within the outline that the golfer indicates (e.g. by touching a point along the outline).

Target outlines of one or more holes can also be displayed on one or more display screens along with the current position of the golfer as he drives or walks along the course and stops next to his golf ball. Distances to targets from his ball position and how far the ball was hit can also be calculated, displayed and viewed by the golfer. FIG. 35 illustrates an example of a screen display showing a hole view of all targets, the golfer's current position, calculated distance to the green, i.e., 206 yards, and calculated distance the golf ball was hit by the golfer, i.e., 166 yards.

FIG. 40 depicts a series of screenshots in which a virtual shot path has been overlaid with target icons of a specific hole. This embodiment shows a representation of a virtual shot path on the hole, as well as a green, and a plurality of icons representing bunkers, water hazards, out of bounds areas, etc. The virtual shot path, which may have been previously uploaded to the device or input by a user of the device, indicates a distance, i.e., 237 yards, to a predetermined ideal landing area on the fairway, a remaining distance to the hole from the landing area, i.e., 175 yards, and a total distance from the user to the center of the green, i.e. 408 yards. On the right side of the representation a plurality of icons are provided, which represent fairway bunkers, and on the left side of the representation an icon is provided, which corresponds to a water hazard, for example. Various features of the hole may be similarly represented to a user by providing different colored, shaded and/or patterned icons, as noted above.

In the interface shown in FIG. 40 a user may also adjust the identified landing area, i.e., "FwTgt" by using a cursor or other pointing device to move the identified landing area in any direction. When the user adjusts the landing area, the distance from the user to the landing area and the distance from the new landing area to the green will be updated and displayed to the user.

FIG. 41 depicts a screenshot in which an photographic image of the hole, or a detailed graphical representation of the hole, which has been previously loaded into the device, is presented to a user. This interface displays a virtual shot path in a manner similar to that disclosed above with reference to FIG. 40, but provides more detailed information along the virtual shot path. More particularly, the embodiment depicted in FIG. 40 shows a representation of a virtual shot path, as well as various icons representing features along the virtual shot path along the way to the green. The representation in FIG. 41, on the other hand, displays a graphical representation of the hole including an outline of a fairway, and detailed graphical representation corresponding to features on the hole in order to display distances to the front of the features, distances to clear the features, etc. relative to the virtual shot path.

As discussed above, the various features of a golf hole may be mapped in a manner similar to the process used to generate the green map. The outline of features such as a bunker, water hazard, waste area, out of bounds, etc. is preferably derived from a topographical representation of the feature or georeferenced satellite image of the feature area, though other data and information may be used to create the feature outline. Based on GPS, GIS or other location data and information, the distance from the user to the selected intersections of the shot path(s) across on the outlines and central crosshair location is determined and displayed. In this manner, useful distance information to selected front and back locations of the various outlined hole features are displayed to the user.

In the example shown in FIG. 41 the interface displays a virtual shot path from the tee box area to a landing area represented by a light colored dot, and onward to an estimated location of the center of the green or an area of the green selected by the user (i.e. point of interest on the green). In this example, the target area may represent the current location of the user after the user has already played a shot to that location, or an intended target location for a subsequent shot from the user's current location. From this target area, a virtual path is displayed to the point of interest on the green, and relevant yardages based on the feature outlines are displayed to the user. In the example shown in FIG. 41, the virtual path extends from the tee box to the target location (i.e. current user location, or target location of a subsequent shot), and then from the target location to the point of interest on the green. Between the target location and the point of interest on the green, a plurality of intermediate yardages are presented to a user based on an intersection between the virtual shot path and features of the hole that have been previously outlined. In the specific example shown in FIG. 41, the virtual shot path extends from the target area over a bunker to the point of interest on the green. Thus, a distance from the tee to the target area may be displayed, a distance from the target location to the front of the bunker may be displayed, a distance from the target location to clear the bunker (i.e. to the back of the bunker) may be displayed, a distance from the target area to the front of the green (from the perspective of the virtual shot path) may be displayed, and a distance from the target area to the point of interest on the green may be displayed. As noted above, the outlines of each of the features on the course may be mapped. Thus, when plural features, e.g. water hazard, waste area, out of bounds, etc. exist between the target area and the point of interest on the green, similar yardages may be provided to the front and back of each of these features from the target area.

It should be noted that one or more landing areas may be displayed on a single hole. For example, on a par 5 there may be target landing areas displayed for each of a tee shot landing area and the targeted landing area for a layup shot, and the virtual shot path would connect these target areas with a shot path extending from the tee box through each of the landing areas to the point of interest on the green. In this case, yardages to the features along the duration of the shot path, i.e. connecting the tee area to each of the shot paths through to the point of interest on the green, may be displayed to a user. Additionally, a user may control a location of any of the targeted areas displayed on the device, thus altering the virtual shot path displayed on the device. The display would then be updated to reflect the changes to the virtual shot path by updating yardages, and adding or removing any features newly intersecting or no longer intersecting the virtual shot path. As noted above, the point of interest on the green may correspond to an estimated position of the center of the green, or may also be moved by the user to correspond to any other target point on the green.

Additionally, the perspectives of the hole representations and virtual shot paths described with reference to FIGS. 40 and 41 may be displayed from a birds-eye view directly above the hole, or from an elevated three-dimensional perspective from behind the user.

Figure 28:
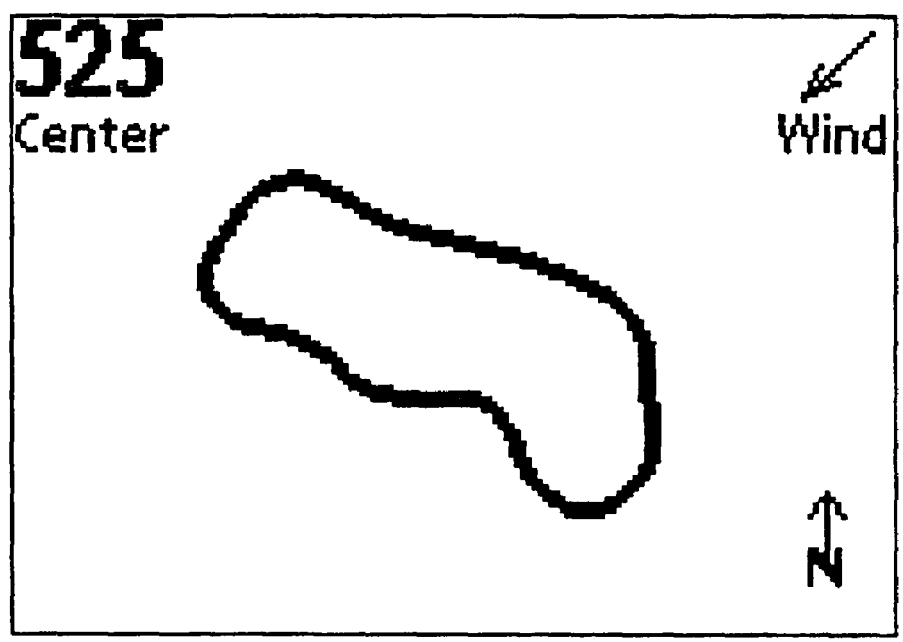
FIG. 28 shows a graphical indicator of wind direction relative to the user and a target or object in accordance with an embodiment of the present invention.

FIG. 28 illustrates a preferred graphical display indicator to provide an indication of wind direction relative to the user and a target or object. The wind direction displayed indicates the relative direction of the wind as viewed from a golfer's approach to the green. As the green image is rotated on the display to show the green image oriented to the golfer's line of sight view of the target or object, the wind indicator will also be rotated to reflect the prevailing wind direction for the day relative to the golfer's current approach to the green. Further, FIG. 29A shows a screen display by which a golfer can perform a method to enter and set the prevailing wind direction and wind speed for display on the unit.

The user may enter the prevailing wind direction and speed into the system prior to play. Once wind information is entered into the system, a wind indicator graphic is preferably displayed on the screen. Based on the GPS or other position location device information, a vector from the user to the target or object is calculated. Once the vector is calculated, the wind direction vector is plotted on the display screen. This wind indicator display will provide the user with a visual indication of the prevailing direction of the wind as it relates to his position relative to the target or object. Further, in an alternative embodiment, a solid-state wind direction sensor may be integrated with the handheld unit PDA/GPS device to provide real-time wind and velocity information that is then calculated as a vector as it relates to the user and target or object.

Figure 29A:
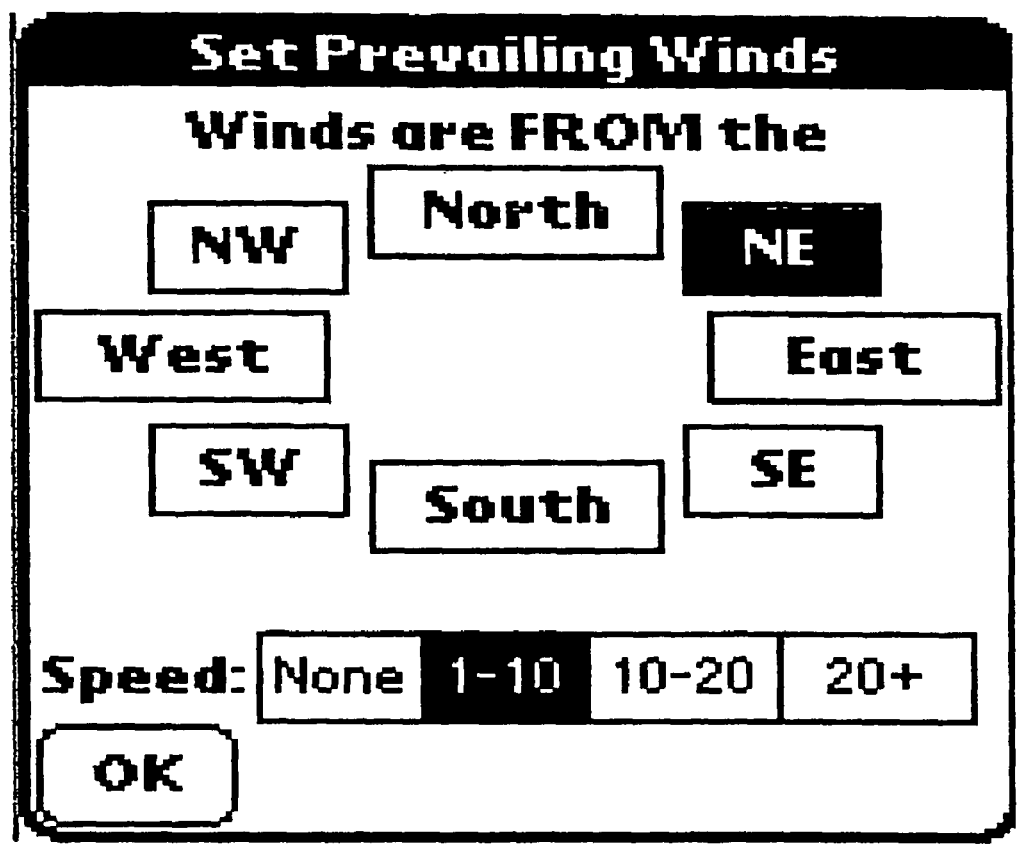
FIG. 29A shows a screen display for use by a user to set the prevailing wind direction and wind speed in accordance with an embodiment of the present invention.
Figure 29B:
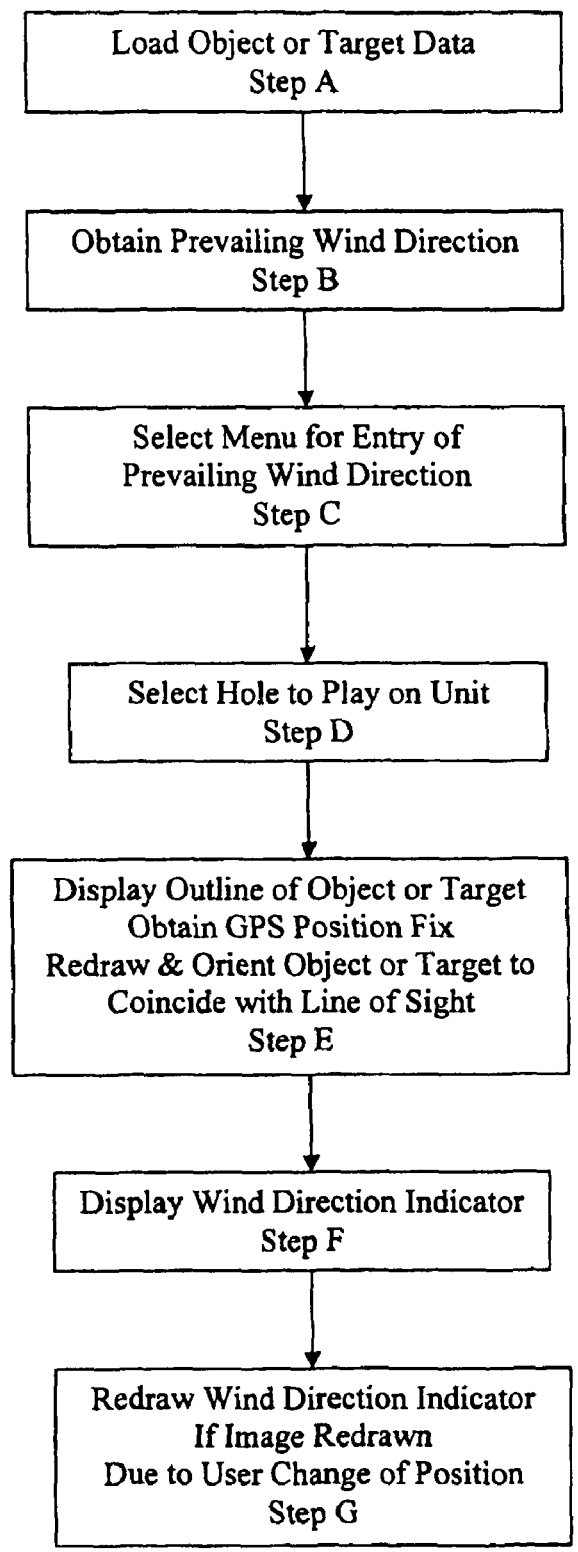
FIG. 29B shows an embodiment of a preferred method to display prevailing wind direction on a screen display as shown in FIGS. 28 and 29A.

FIG. 29B illustrates an embodiment of a preferred method or process to display prevailing wind direction on a screen display as shown in FIGS. 28 and 29A. In Step A relating to FIGS. 28 and 29A, the golfer loads the unit's memory with a pre-defined green outline and/or outline of other objects, and the center of the green. The green's outline points can be (a) a set of latitude and longitude pairs for each point on the outline that are to be connected by lines; (b) a graphics image that has been geo-referenced, e.g., the latitude and longitude of at least 2 pixels are given; (c) a series of x,y pixel locations to be connected by lines with the latitude and longitude of the center of the object provided along with the object's orientation from due north and the scale factor used. In a preferred method, the green outline points are a series of x,y pixels as described in (c) above. Alternatively green outline points forms (a) or (b) could be used, and would have to be converted to form (c) before proceeding to perform the following steps.

In Step B, the golfer obtains the prevailing wind direction and speed for the day. This can be done either before going to the golf course or at the golf course or in any other suitable manner.

In Step C, the golfer takes the unit to a golf course, turns it on and presses a key or button on the device or selects a menu item that enables him to enter the prevailing wind direction and speed for the day, as shown in FIG. 29A. Typically, the golfer enters the direction from which the wind is coming. The golfer then selects a hole to begin play in Step D.

In Step E, the outline of the object is displayed before a GPS position fix is obtained by either displaying the image oriented due north or with the front of the green or object at the bottom of the screen. When the GPS obtains a position fix, the green or object is redrawn oriented such that it is displayed as seen from the golfer's line of sight.

In Step F, after the image is drawn, the wind direction indicator can be drawn indicating or displaying the direction in which the wind is blowing as follows:

First, the golfer's line of sight angle of approach, GA, is determined as described in Step E1a of FIG. 26B. Then, the current prevailing wind direction is obtained. If the prevailing wind direction is obtained by the golfer using the screen depicted in FIG. 29A, the following calculation is used:

$$WA = 45 * DI$$

Where:
WA=current prevailing wind angle
DI=directional indicator chosen by golfer (0.dbd.N, 1=NE, 2=E . . . 7=NW)

Finally, an arrow or symbol rotated from due north is displayed using the following angle calculation:

$$AA = GA - WA$$

Where AA=arrow angle with 0 preferably being straight up, 45 to the right, etc. Other mapping parameters may be used. Further, for practical purposes, AA could be limited to a preferred set of angles in order to use a predefined graphics indicator for each angle, e.g., 10 degrees, 20 degrees, etc. Further, any other symbols could be used to convey the wind direction.

In Step G, any time the image is redrawn on the screen due to a change in the golfers position, the wind direction indicator is preferably redrawn as described in Step F.

Figure 30A:
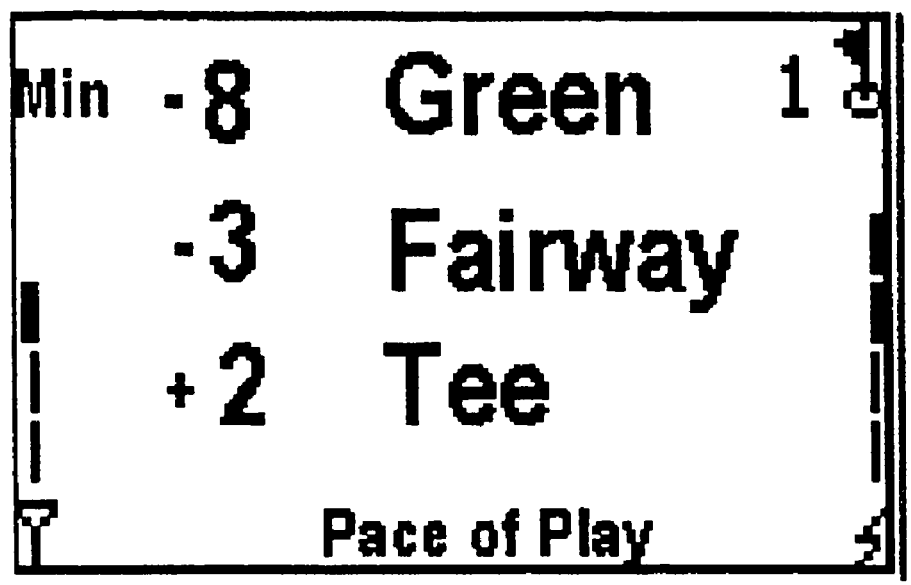
FIG. 30A shows a text display of a pace of play timer to inform the golfer of the golfer's pace relative to a normal pace of play for a particular golf hole in accordance with an embodiment of the present invention.
Figure 30B:
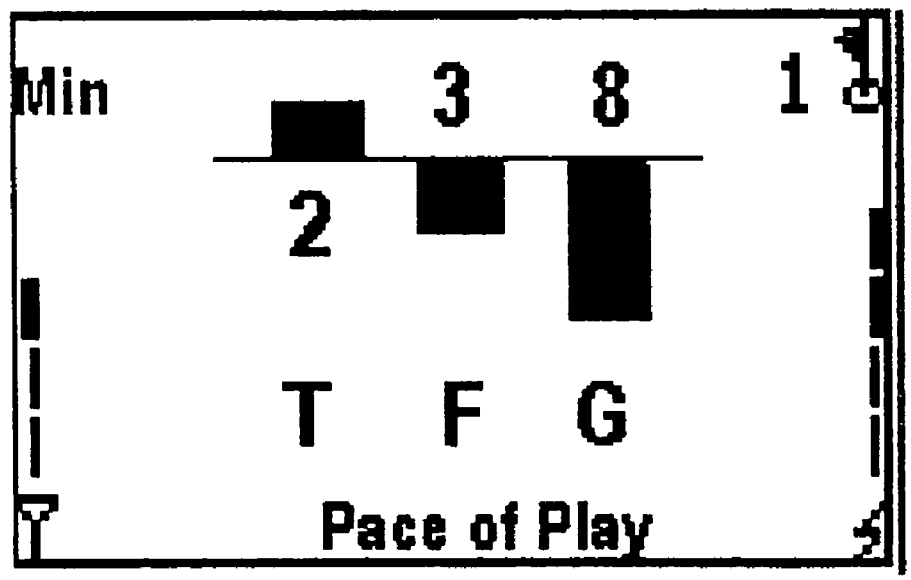
FIG. 30B shows a graphical representation of the pace of play timer of FIG. 30A.

FIG. 30A shows an embodiment of a text display of a pace of play timer to inform the golfer of the golfer's pace relative to a normal pace of play for a particular golf hole. FIG. 30B shows an embodiment of a graphical display of a pace of play timer to inform the golfer of the golfer's pace relative to a normal pace of play for a particular golf hole. The displayed pace of play informs the golfer of the amount of time ahead or behind a normal pace of play. FIGS. 30A and 30B illustrate two preferred methods of displaying the pace of play that the golfer can easily use to determine if he is ahead or behind the normal, average, or course designated pace based on his general current position on the hole. For example, FIGS. 30A and 30B indicate that if the golfer is at the TEE, he is over the normal pace of play by 2 minutes. If he is in the Fairway, he is under by 3 minutes, and if he is at the green, he is under by 8 minutes.

This display feature and method is advantageous since one significant and recurring problem on golf courses is the pace of play of persons or groups. The text and/or graphic pace of play timer function/display of FIGS. 30A and 30B allow the user to quickly and easily see if he is ahead of or behind the statistical time allocated for play on a particular hole and also cumulatively on the set of holes that he has already played. The pace of play statistics can be downloaded from a course database to the PDA/GPS device. Once the unit is started, the timing information is preferably derived either from an onboard device clock or the GPS signal. The user may start the timer when he tees off from the first hole played or the system can start the timer automatically when the user passes a pre-determined radius to the green of the first hole played. Once the timer is started it can display a text and/or graphical representation of the elapsed time compared to the allocated time for the respective hole. This information is accumulated to show how far ahead or behind the allocated time the user is for the total holes already played. Both the individual hole timer information and the cumulative timer information can be displayed as text and/or a variable size graphical bar that the user may glance at and intuitively know his status as to his pace of play, as shown in FIGS. 30A and 30B. To further assist the golfer, three times can be displayed indicating the time at the tee, in the middle of the fairway and at the green. The golfer can thus easily determine which time is applicable to his current situation and have a feel of how long it should take to finish out the hole.

FIGS. 30A and 30B show a preferred screen display showing the pace of play that the golfer can easily determine if he is ahead or behind the normal pace based on his general current location on the hole. The negative values indicate the golfer is under the normal pace of play and positive values indicate the golfer is over of the normal pace of play.

Figure 30C:
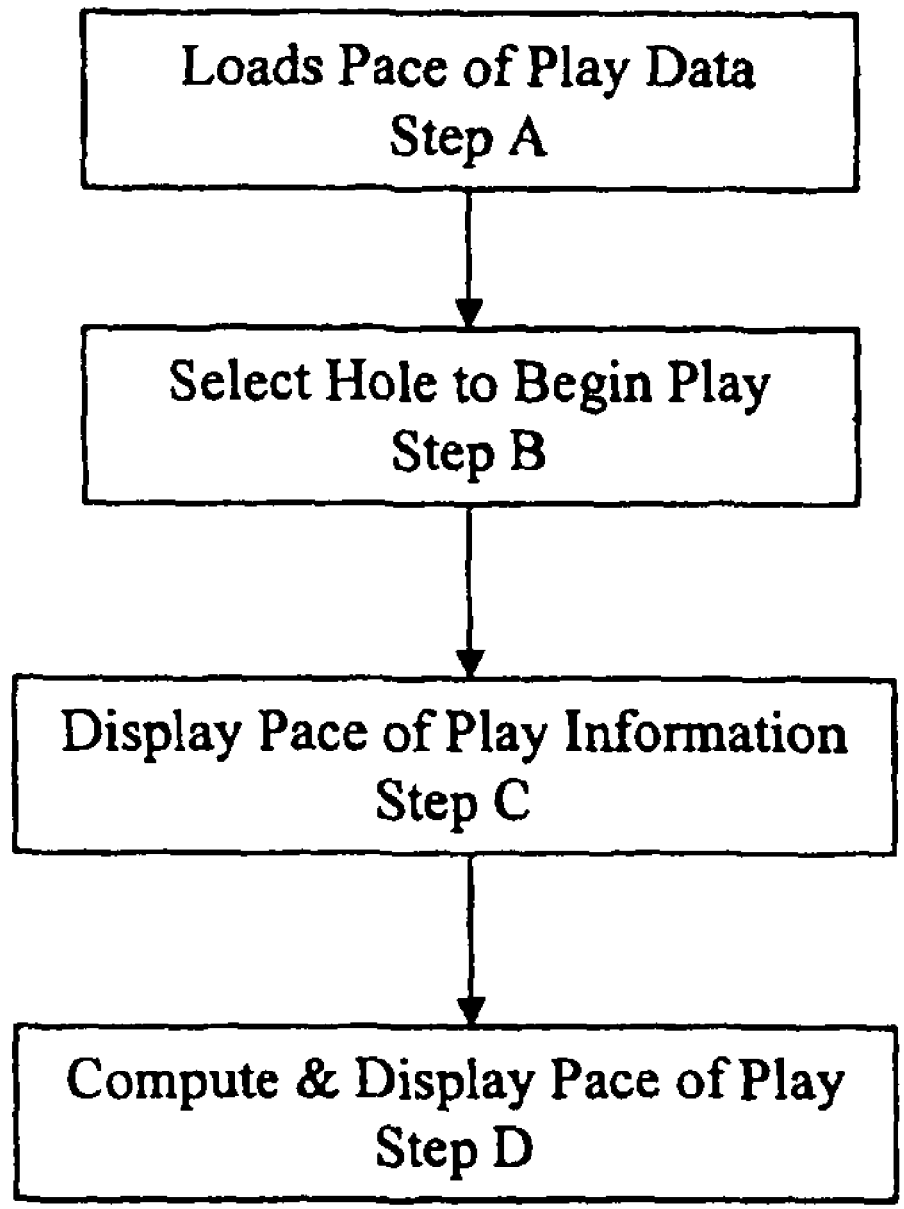
FIG. 30C shows an embodiment of a preferred method to the display pace of play information of FIGS. 30A and 30B.

FIG. 30C illustrates an embodiment of a preferred method or process to display pace of play information as shown in FIGS. 30A and 30B. In Step A, the golfer loads the handheld unit's memory with pre-defined pace of play data, e.g., golf course pace of play data. This information could include, but is not limited to, the expected normal time spent on the tee, fairway and green of each hole, as well as, the normal time spent between each hole. In Step B, the golfer takes the unit to a golf course, turns it on and selects a hole to begin play. In Step C, the golfer elects to display the pace of play information by pressing the appropriate keys or button on the unit in the appropriate menus.

In Step D, the pace of play display values are computed and displayed as follows:

$TP = (T\text{current} - T\text{start}) - \text{TeePace} - \text{Sum[all prior holes HolePace]}$ $FP = (T\text{current} - T\text{start}) - \text{FairwayPace} - \text{TeePace} - \text{Sum(all prior holes HolePace)}$ $GP = (T\text{current} - T\text{start}) - \text{GreenPace} - \text{FairwayPace} - \text{TeePace} - \text{Sum[all prior holes HolePace]}$ Where
TP=time under or over normal pace of play at the Tee
FP=time under or over normal pace of play in the Fairway
GP=time under or over normal pace of play at the Green
Tcurrent=current time
Tstart=time golfer started at first tee
TeePace=pre-defined normal time on Tee for current hole
FairwayPace=pre-defined normal time on Fairway for current hole
GreenPace=pre-defined normal time on Green for current hole
MovePace=pre-defined normal time to move from current hole to next hole
HolePace=pre-defined normal time on current hole (HolePace=TeePace+FairwayPace+GreenPace+MovePace).

The golfer can then look at the numbers displayed and observe the time that is applicable to his current situation, i.e., if on the TEE the golfer references the TEE, TP or T number, if on the fairway he references the FAIRWAY, FP or F number, and if on the green he references the GREEN, GP or G number, shown in FIGS. 30A and 30B. In Step F, if the golfer presses the appropriate button, key or selects a menu item to view the pace of play feature for just the current hole, the same calculations and steps in Step D above would be used with "Sum[all prior holes HolePace]" left out of the calculations in the GP equation/calculation and Tstart is the time at which he began play on the current hole (e.g., advanced the display to the next hole).

Further, in another embodiment, the positive and negative values shown in FIGS. 30A and 30B can be reversed if positive values are to indicate the amount of time the golfer is ahead of the normal pace of play and negative values the amount of time behind pace of play. Moreover, due to typical delays in starting the first hole on a golf course, an alternate method for setting the start time could be to adjust the start time after finishing the first hole to the normal time to play the first hole. In this manner, unavoidable initial delays in teeing off at the first hole are ignored.

Figure 31A:
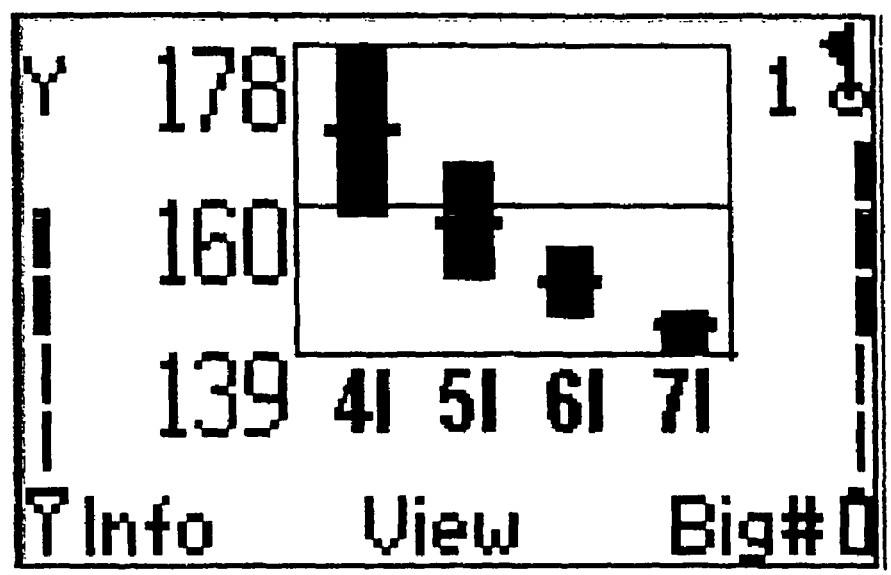
FIG. 31A shows a graphical representation of statistical club distance ranges for a golfer relative to the distance to a selected target in accordance with an embodiment of the present invention.
Figure 31B:
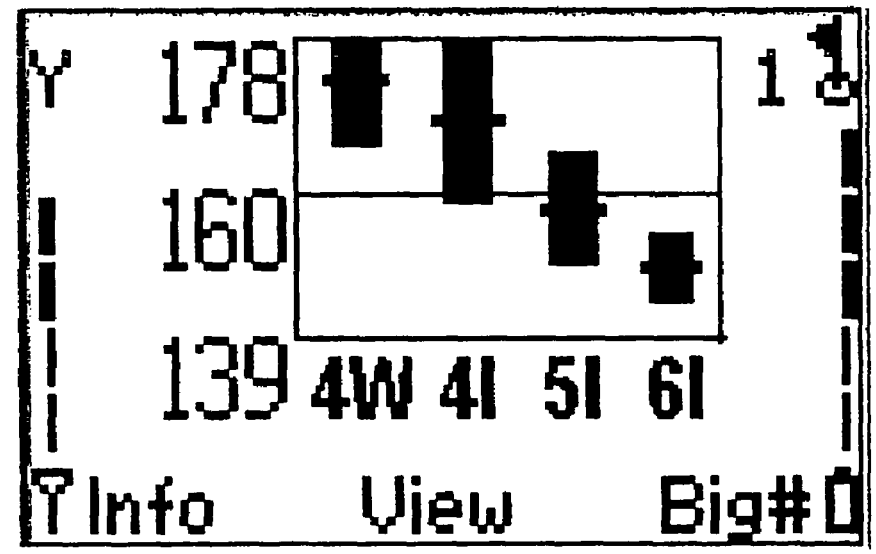
FIG. 31B shows an alternate scrolled graphical representation of other statistical club distance ranges for a golfer relative to the distance to a selected target.

FIGS. 31A and 31B illustrate another embodiment of the screen displays of the present invention. In this embodiment, the user can enter or the system can calculate an average or statistical range of distances that the user hits a ball with a club. This statistical club range information can show the minimum, mean and maximum distance the user hits a ball with a particular club. Data for each club in the golfer's bag can be entered directly into the unit, or obtained from an outside source and loaded into the unit. The data should preferably include the minimum, maximum and mean distances for each club. This information may be displayed graphically on the screen as a series of club distance ranges with an intersecting line showing the distance to the target relative to the statistical club ranges, as shown in FIGS. 31A and 31B.

FIGS. 31A and 31B show the results of a preferred method of displaying club statistical information in such a manner to allow the individual golfer to judgmentally select the best club, taking into account playing conditions such as wind and ball lie, in contrast to attempting to recommend a specific club that the golfer should use. The unit preferably does not suggest any one particular club for use by the user, but presents to the user graphical distance range statistics for certain clubs relative to the target or object distance. If the golfer is on an uphill lie or hitting into the wind, the golfer may choose the club with a distance slightly longer than the target distance. Likewise, if the golfer is on a downhill lie or the wind is behind him, the golfer may choose the club with a distance slightly shorter than the target distance.

FIG. 31A illustrates a preferred graphical method of displaying club ranges compared to the distance to a selected target. The three numbers on the left of the screen represent the upper and lower yardage distance of the displayed chart. The middle number is the distance to the selected target or object. The vertical bars represent the range from minimum to maximum distance the golfer statistically hits each of the clubs shown. The dash in the middle of each vertical bar indicates the mean distance hit with that club by the golfer. In a preferred embodiment, to view other club possibilities the chart can be scrolled left or right. This feature is shown in FIG. 31B, where the screen has been scrolled and the display shows information for a number 4 wood (4W) club, and the information for the seven iron (7I) has scrolled out of view.

Once the golfer selects a target of interest, the unit or device can scan the internal database for the club ranges that are closest to the target distance. These clubs would then be displayed on the screen with a bar drawn between the minimum and maximum distance for each club. A short line would be drawn through the bar to indicate the mean distance for that club as shown in FIGS. 31A and 31B. The number of clubs shown on the screen depends upon the screen size and resolution. Scrolling to the right or left could display additional club ranges as shown in FIG. 31B. The maximum and minimum distance of the chart could be automatically adjusted to include the maximum and minimum distance of all the clubs currently being displayed. Alternately, the maximum and minimum distance of the chart could be a fixed range from the target distance and the bars clipped if they are outside the range of the chart. The scale could also be automatically expanded or reduced depending upon the target distance, i.e., a longer target distance would result in a wider distance range for the minimum and maximum values of the chart.

Figure 31C:
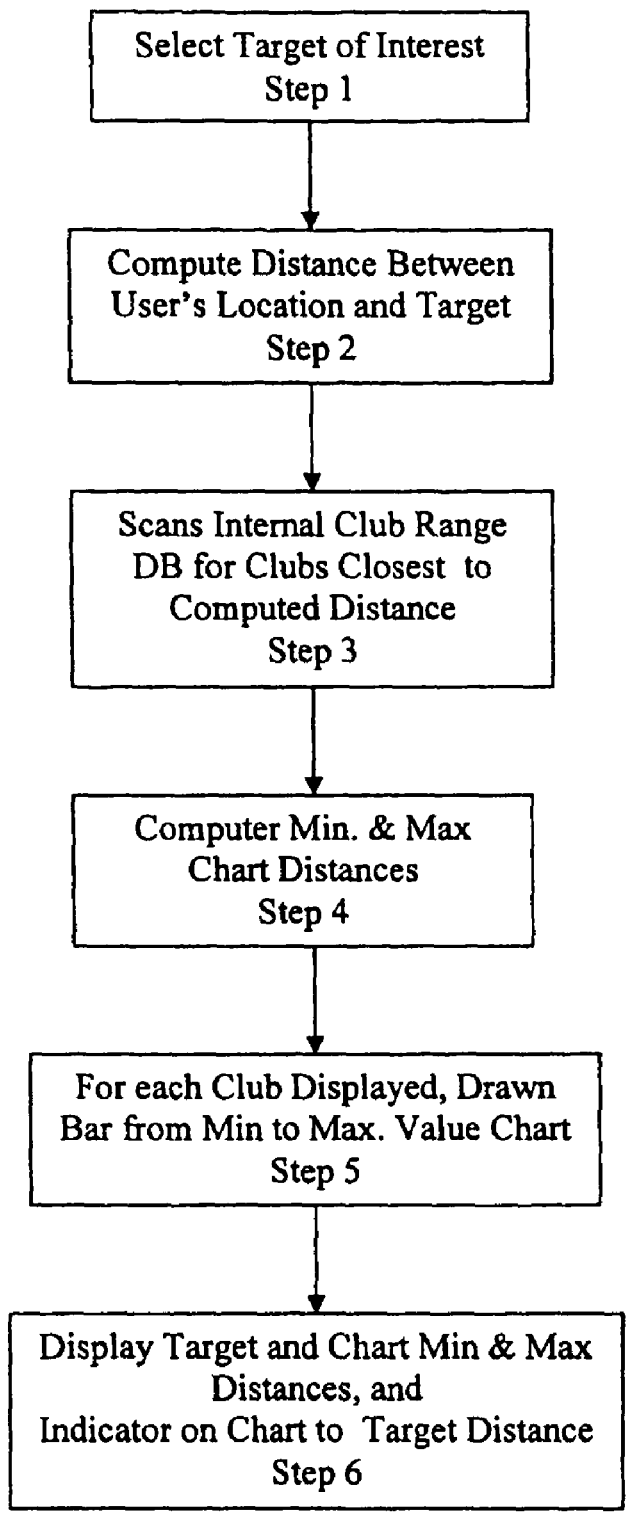
FIG. 31C shows an embodiment of a preferred method or process to display club ranges compared to the distance to a selected target as shown in FIGS. 31A and 31B.

FIG. 31C illustrates an embodiment of a preferred method or process to display club ranges compared to the distance to a selected target as shown in FIGS. 31A and 31B. In Step 1, the golfer selects the target of interest. In Step 2, the device computes the distance from the golfer's current location to the target. In Step 3, the device scans the internal club range database for clubs that are closest to this distance. Options for this selection process include, but are not limited to, selecting clubs based on minimum values, selecting clubs based on maximum values, selecting clubs based on mean values, etc.

In Step 4, minimum and maximum chart distances are then computed. Again, options for selecting the minimum and maximum chart distances include, but are not limited to, using the minimum and maximum values of the selected clubs, using the mean values of the selected clubs, using a factor to compute the range based on the target distance, etc.

In Step 5, for each club to be displayed, a bar is drawn from its minimum value to its maximum value on the chart, clipping any values that extend beyond the range of the chart. Also a short line is drawn through the bar at its mean value and a club identifier is preferably displayed below the chart underneath its bar. The club identifier could be located at other positions on the screen display.

In Step 6, the chart maximum and minimum distances and the target distance are preferably displayed to the side of the chart and a line is drawn through the middle of the chart to indicate the target distance. Again, those skilled in the art will readily see that other locations and indicators could be used.

Alternatively, the chart could also be drawn with horizontal bars rather than vertical bars, as shown in FIGS. 31A and 31B, with distances shown across the bottom instead of the side. The same technique could be used with other statistical summarization methods other than minimum, maximum and mean values as well, e.g., entering a single distance for a club and using two standard deviations to compute the minimum and maximum values instead of using actual min/max values.

Further, the personal golfing assistant system is not required to collect club statistics in order to make use of the club range function. However, an alternate way of obtaining this data would be to go to a driving range and hit a number of balls with each club to determine the minimum, maximum and mean distances hit within a specified standard deviation, e.g., two standard deviations. After hitting a set of balls with a club, the golfer could enter the club into the unit or device and mark the point at which all the balls were hit. With permission from the driving range, he could then go and mark where each ball landed.

The distance of each ball could then be computed and saved. When all balls for that club were marked, the device could compute the mean, minimum and maximum values, discarding any values outside of two standard deviations, and save the results for that club. The saved results could then be used to generate graphical representations of statistical club distance ranges for a golfer similar to those of FIGS. 31A and 31B.

Figure 32A:
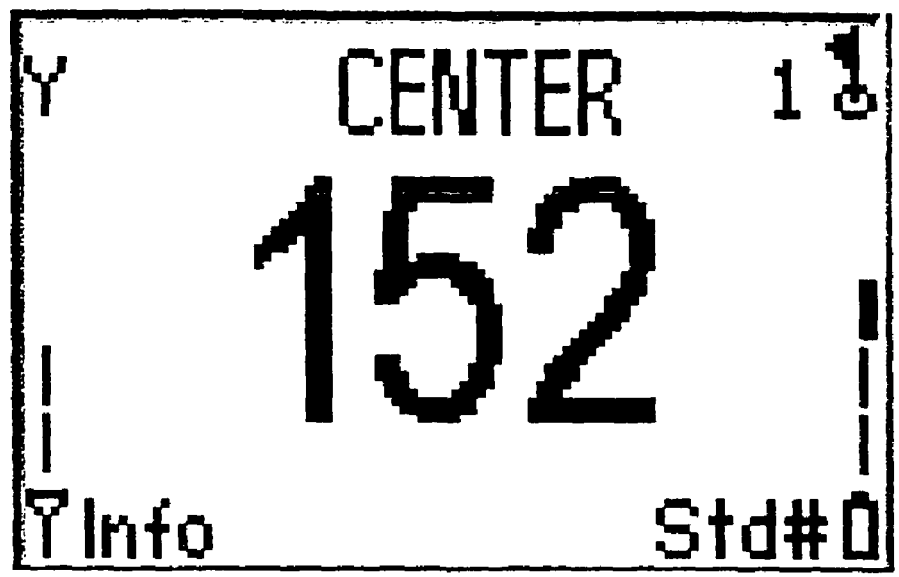
FIG. 32A shows a screen display of the distance to a target or object using large graphic numbers for easy viewing in accordance with an embodiment of the present invention.
Figure 32B:
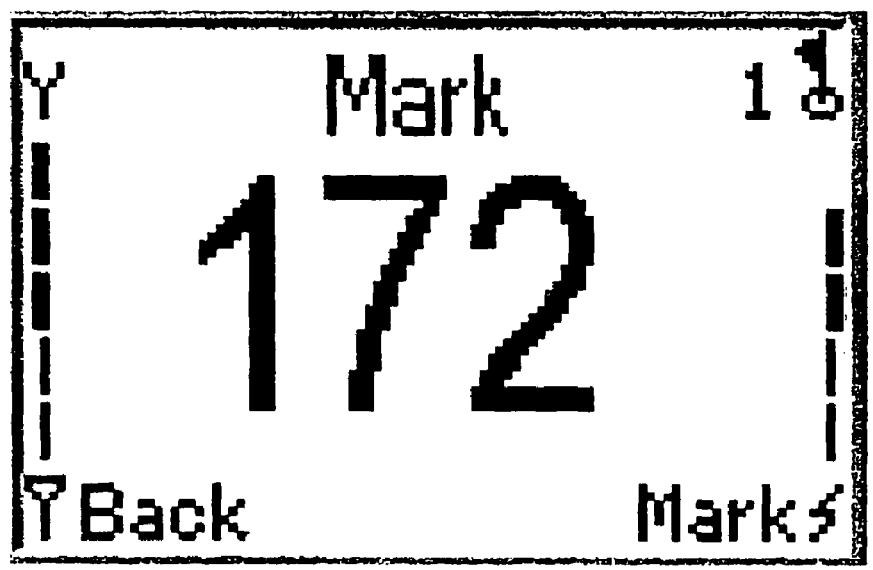
FIG. 32B shows a screen display of the distance a ball was hit using large graphic numbers for easy viewing in accordance with an embodiment of the present invention.

FIG. 32A shows a screen display of the distance to a target or object using large graphic numbers for easy viewing. Additionally, FIG. 32B shows a screen display of the distance a ball was hit using large graphic numbers for easy viewing. This is an advantageous feature, as often a golfer may only be interested in the distance to a certain standard target such as the center of the green or a pre-defined zone on the green. In this case the distance to that target may be graphically represented as a large number that is easily read and fills the screen area. This number is updated as the user's distance to the referenced target changes so that the user will always be able to glance at the screen and have that data easily available. This would be applicable to selected target distances, as well as the distance the user has hit his ball. The unit determines the desired information and presents it to the golfer on the screen display in an easy to view manner of large characters.

Figure 33A:
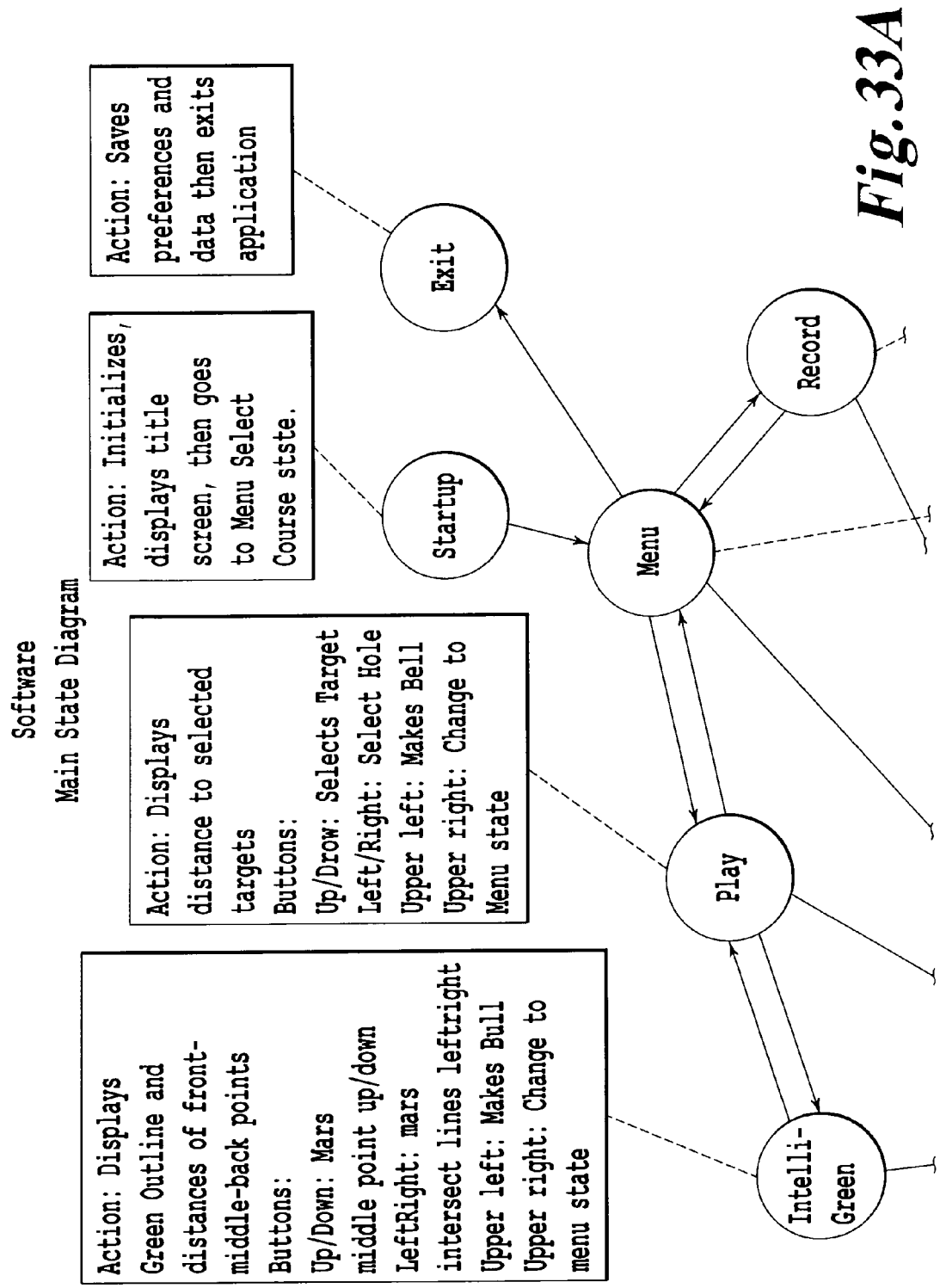
FIG. 33 shows an embodiment of a software state diagram for an application that can be used to carry out the method for graphically displaying distance, elapsed time, statistics and other golf related information in accordance with the present invention.
Figure 33B:
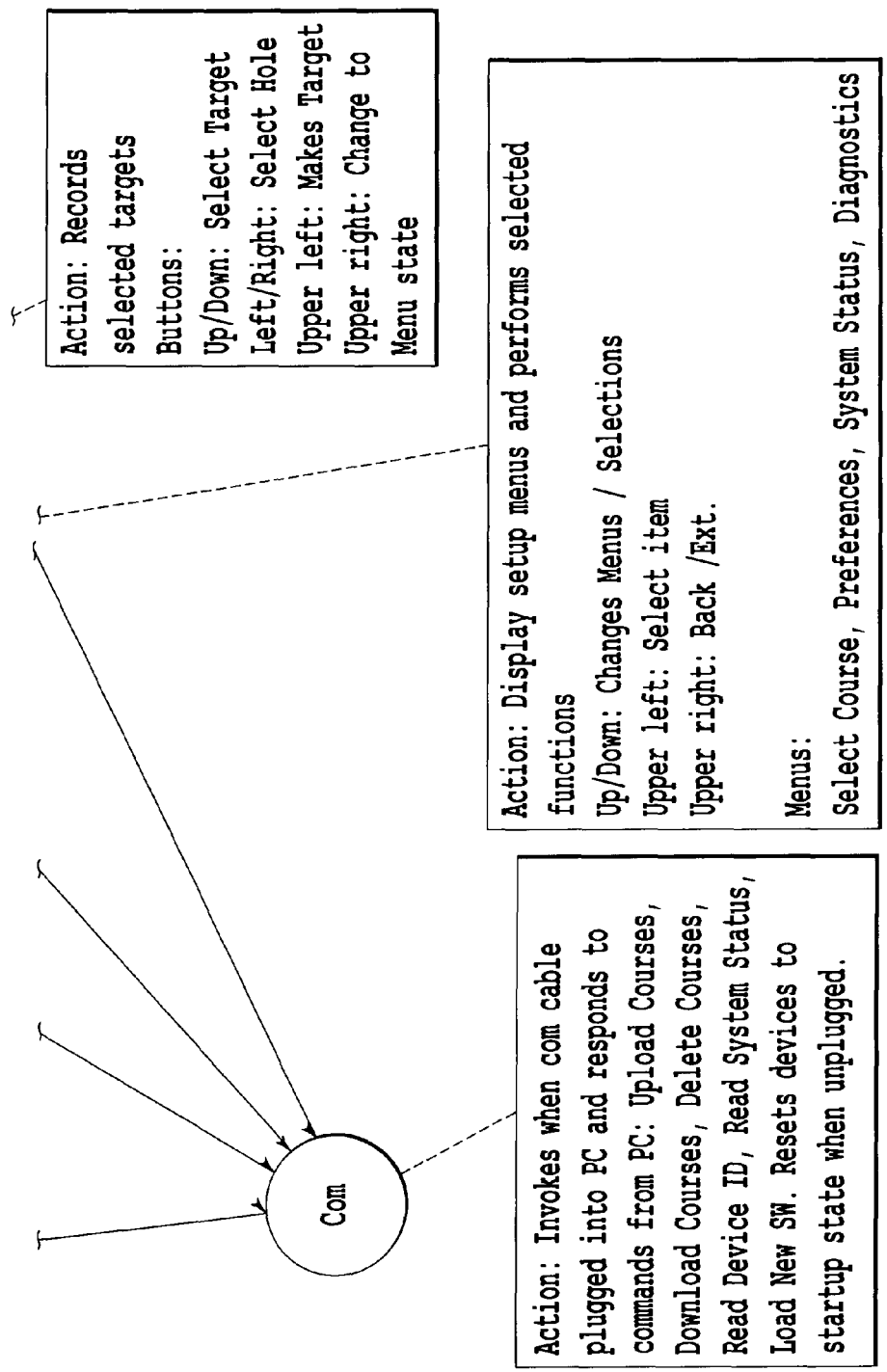

FIG. 33 shows an embodiment of a software state diagram that can be implemented in application software to accomplish the various display functions depicted in FIGS. 25-32B. In this manner, graphic display of distance, elapsed time, statistics and other golf related information can be carried out on an electronic or computerized device connected to a global positioning system device. The electronic or computerized device can be a handheld PDA with a GPS device, a wireless enabled PDA, cellular telephone or similar device.

Collection, Processing and Distribution of Golf Related Data

The present invention is further directed to a method for the collecting, uploading, processing, distributing and downloading of golf course data and information, such as geographic information services (GIS) data. In one aspect, the data is uploaded to a server computer with an associated storage medium, e.g., a database, accessible via the Internet or other user accessible network. The method for collecting and distributing golf-course map data can involve generating golf course map or survey data, for example, by manual surveying and storage of data by a golfer using a handheld PDA with an associated GPS unit. The surveyed golf course data can golf play data such as the layout of each hole, the distance to each cup, the layout of each green, the position and outline of each bunker, the position of each water hazards, etc. Alternatively, a golfer may also create golf course data or maps by modifying exiting golf course data to coincide with present golf course conditions that may differ from the original recording of previous golf course data.

The golf course data can then be uploaded and stored at a central location such as a server with associated data or database storage. The uploaded information may be sent via packet communication or any known communications format or protocol, e.g., TCP/IP. The server is preferably accessible via an Internet webpage for subsequent downloading by authorized users. The uploaded data can be processed such that the information is later available to authorized users in a predetermined format. The stored golf course data can be indexed, processed and/or arranged by a designated server, such as a database server.

Authorized users can subsequently access the network of a golf course data provider. This can be accomplished though a personal computer, or via a PDA having a GPS functionality via an Internet webpage/homepage or other public network access point to access desired golf course data. Golf course data uploaded and stored on servers of golf course data providers can then be downloaded via the Internet. Authorized users typically must log-on to the provider's website and provide appropriate log-on and identification information to authenticate them as users authorized to retrieve stored golf course data. This process enables the information providers to control access to authorized users and provides one way of properly charging customers for services or data provided for downloading. Once logged on, a user can request information related to a particular golf course including golf course data and GPS map data, among other information. The user's request is executed by retrieving the desired information from the server or database server where the information is stored.

The retrieved information is then downloaded to the user's apparatus, e.g., a handheld PDA or integrated unit with a GPS device. The downloaded information can include GPS map data for a desired golf course as well as other relevant golf course related data desired by a user. The downloaded information can be immediately used or displayed on the user's apparatus display or can be stored on the apparatus or associated data storage for subsequent retrieval, use and display by the user. The user may use the data to prepare himself/herself for a round of golf.

Figure 34A:
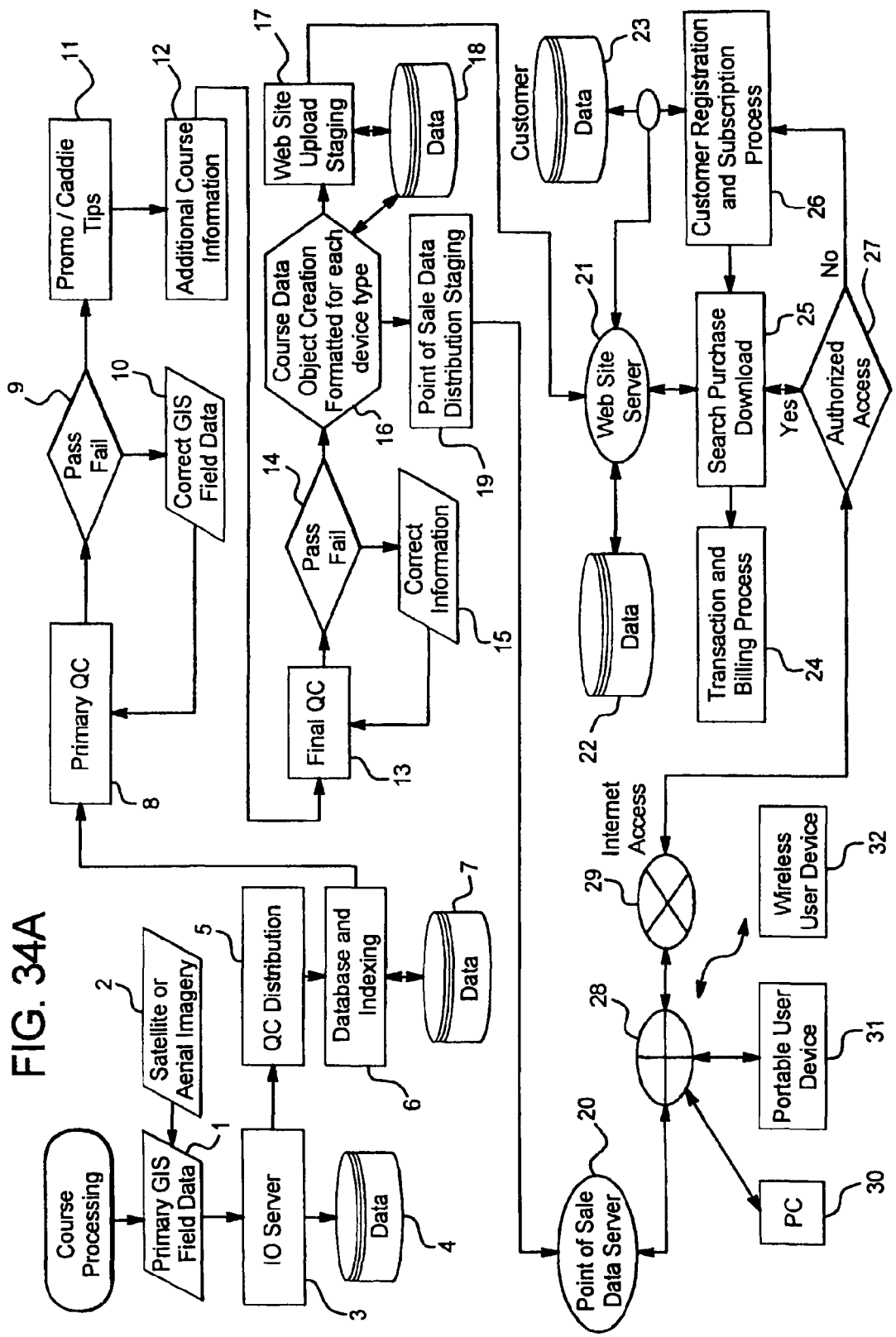
FIG. 34A shows a flowchart for a method for collecting, processing and distributing golf course related GIS data according to an embodiment of the present invention.
Figure 34B:
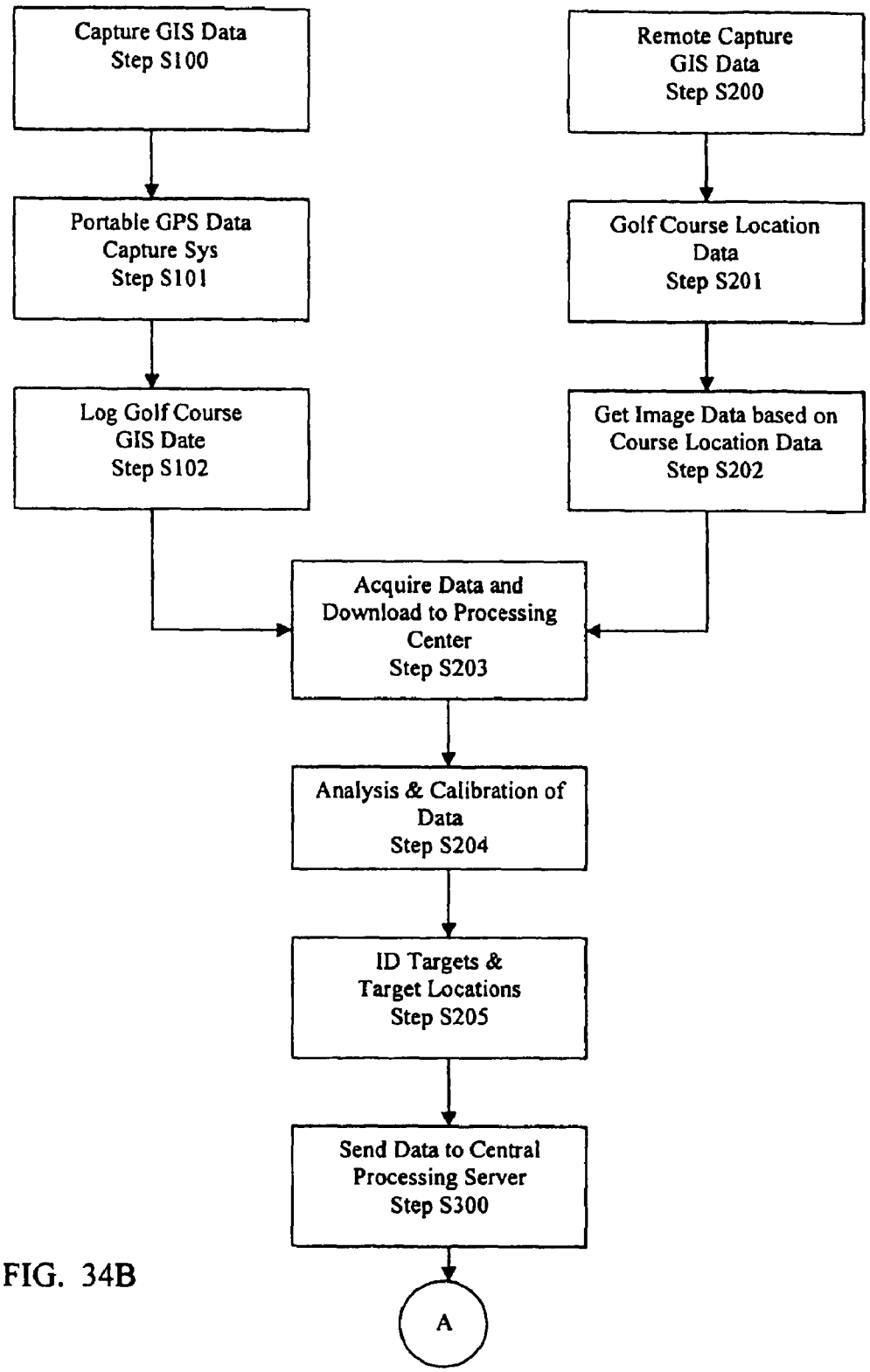
FIGS. 34B-34G show an embodiment of carrying out a preferred method for collecting, processing and distributing golf course related GIS data.
Figure 34C:
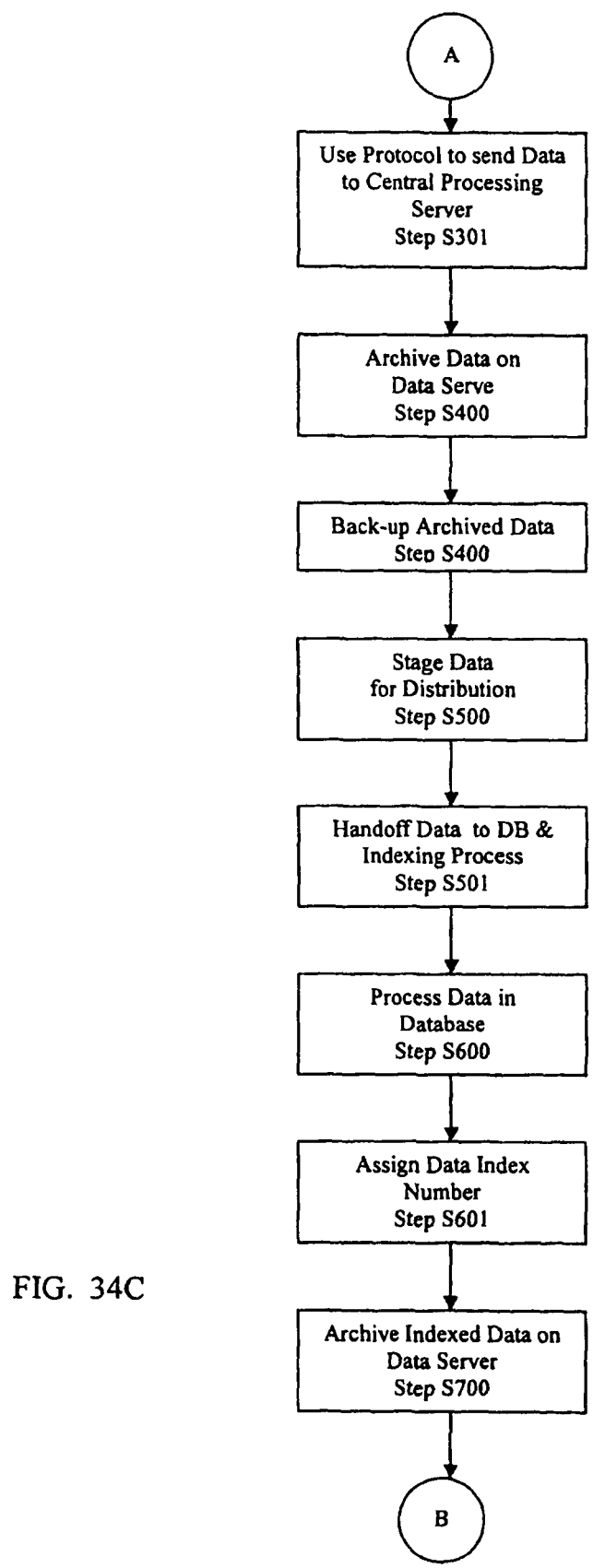
Figure 34D:
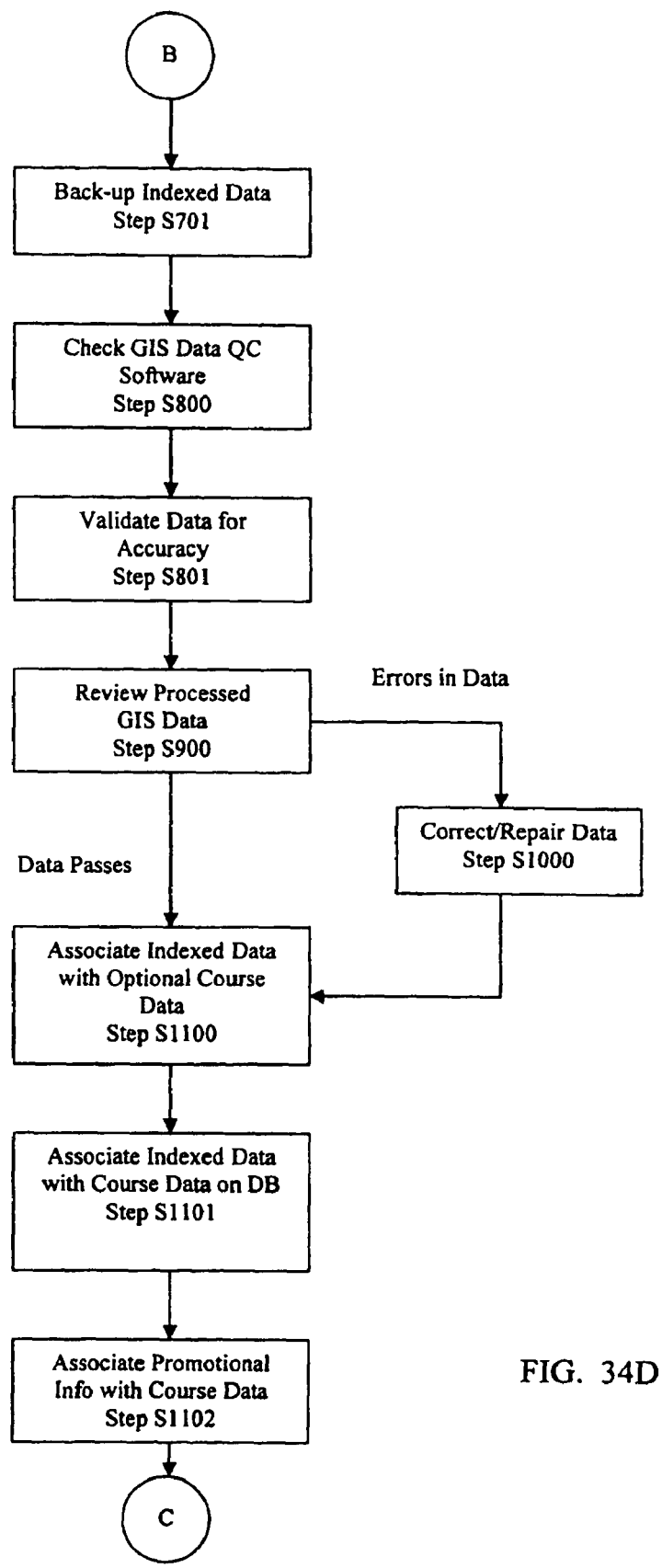
Figure 34E:
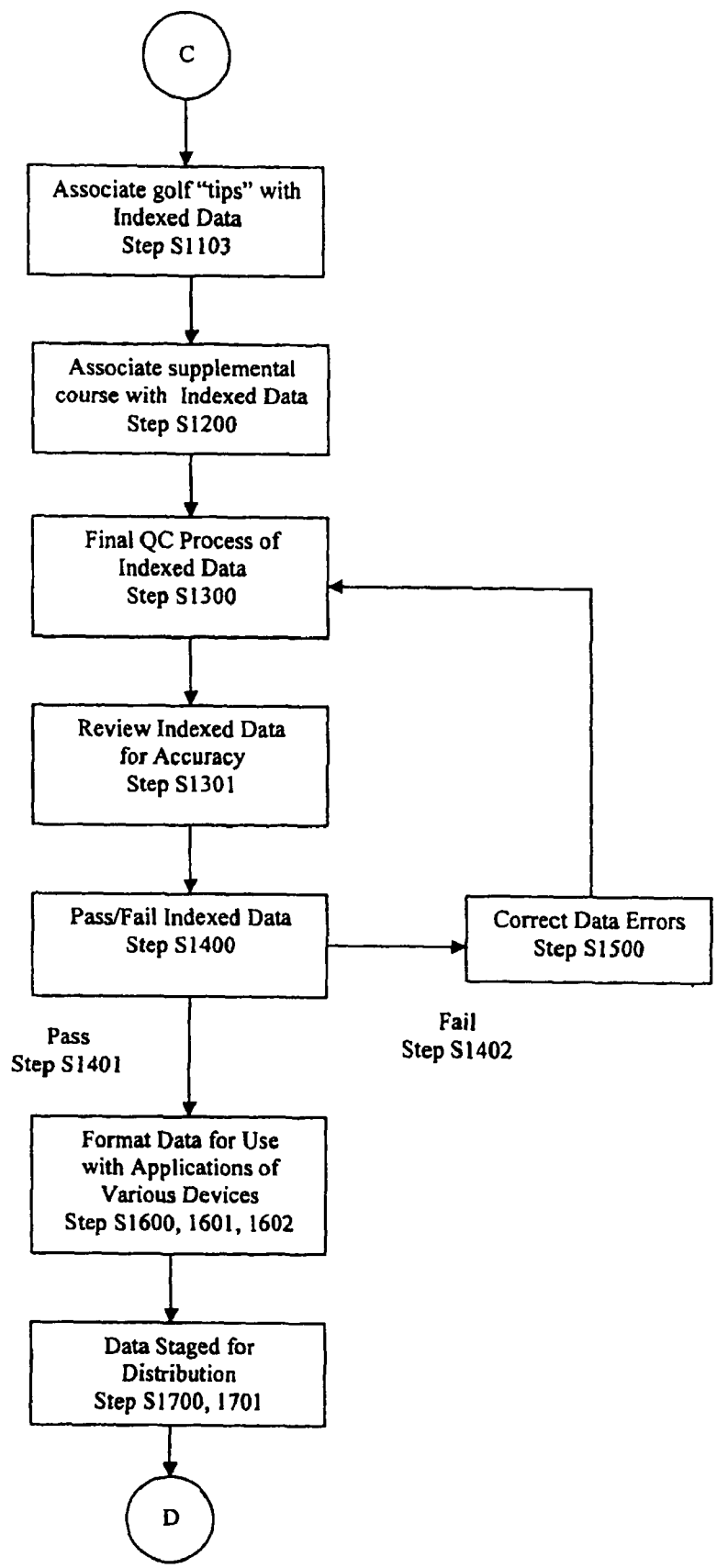
Figure 34F:
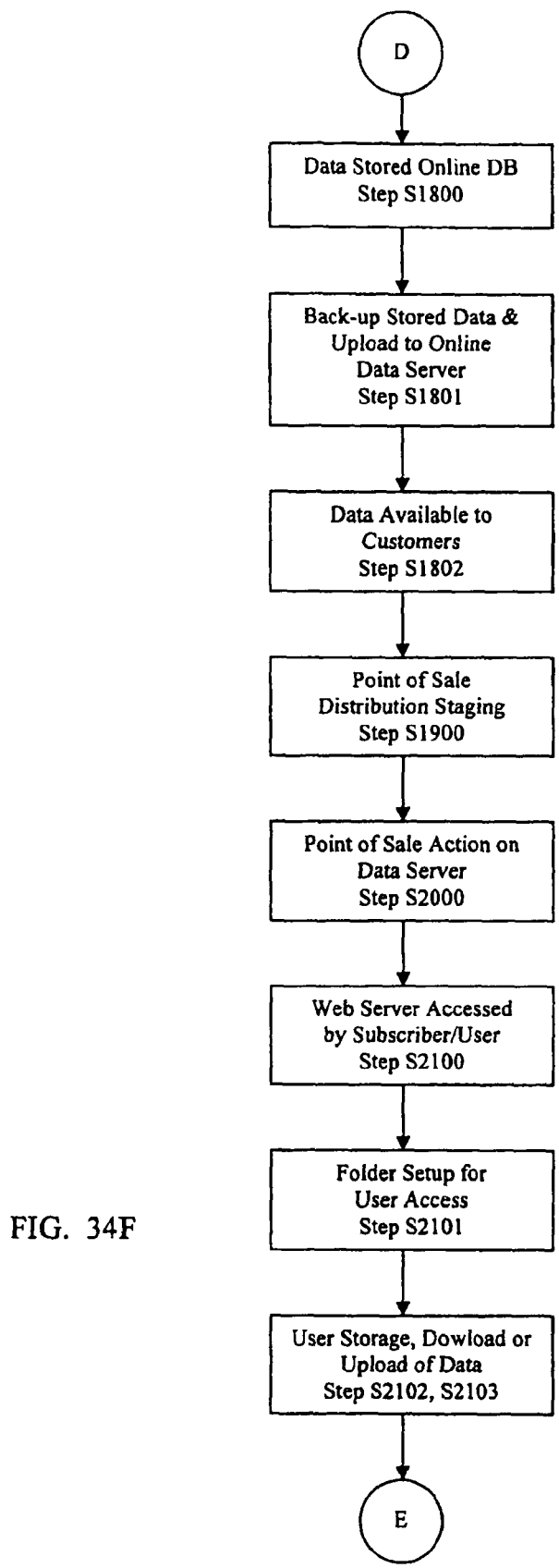
Figure 34G:
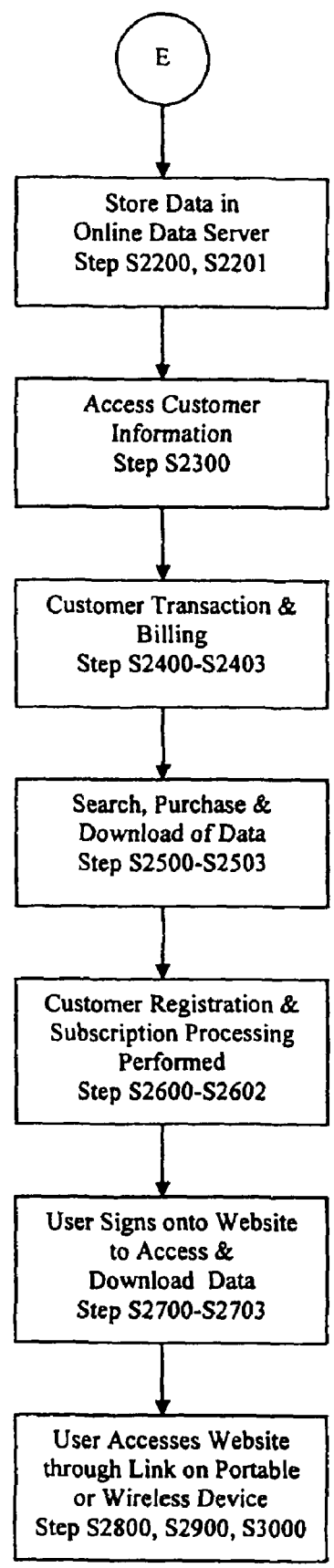

FIG. 34A illustrates a flow diagram for one embodiment of a system and method for collecting, processing, storing, distributing and downloading golf course related data, such as GIS data. In another embodiment, the method of collecting, processing, and distributing golf course GIS data comprises the steps of collecting and uploading the golf course GIS data to a server computer accessible via the Internet. The uploaded information is then processed, for example, by cataloging and storing the uploaded golf course data, in preparation for expected user requests for the stored golf course GIS data. Upon receipt of an approved and authorized request for the stored GIS data, the golf course GIS data is distributed to the authorized requestor. The requestor can then download the GIS data in any manner he chooses to any storage device for later use. For example, a user may download the requested GIS data to an electronic or computerized device operating in conjunction with GIS data for using and displaying the golf related information on the user's electronic or computerized device.

FIGS. 34B-34G illustrate a flow chart of a preferred method for collecting, processing and distributing golf course related GIS data. At Step S100 golf course GIS data can be captured directly in the field using portable survey grade GPS receiver systems using Space Based Augmentation Systems (SBAS) such as WAAS, EGNOS, Omnstar or other correction systems. In Step S101, an operator or technician can be outfitted with a portable GPS data collection system comprised of the survey grade GPS receiver, antenna, battery and data collection terminal and software. This equipment is usually mounted in a backpack for convenience with the portable data terminal being a handheld device such as Palm Pilot PDA or Windows CE device running software to log GPS data with golf course attribute data such as bunkers, water hazards, green targets, etc. In Step S102, the technician goes to a desired course and, after allowing the GPS equipment to stabilize on the GPS and correction signals, commences logging the GIS data associated with the golf related targets of interest to a golfer.

In Step S200, the data may optionally be derived via remote geo-referenced satellite or aerial imagery. In this mode, in Step S201, the latitude and longitude of the golf course of interest is determined by a geo-location address service such as Mapquest or from existing survey data. In Step S202, the latitude and longitude information of the golf course of interest is used to search for geo-referenced satellite or aerial imagery from a number of sources such as the United States Geophysical Survey (USGS), SPOT Imagery, IKONOS Imagery, Kodak Imagery systems or other aerial or satellite imagery. Optimally, imagery with fifteen (15) centimeter to one (1) meter resolution is required in order to adequately determine the details of the targets of interest. At Step S203, the geo-referenced imagery is acquired or purchased and downloaded to a processing center.

In Step S204, the geo-referenced imagery is inputted into analysis software such as ArcView, OziExplorer or other GIS processing software. An operator then calibrates viewable features on the imagery with ground truth GPS data such as High Accuracy Reference Network (HARN) survey control points that may be located in the imagery. Ground truth calibration data may also be acquired by a portable GPS system as noted above in Step S100 on features that are identifiable in the imagery. Optionally, if the geo-referencing of the imagery is determined to be of suitable accuracy then ground truth calibration of the imagery may not be required. In Step S205, after the imagery is calibrated, the operator identifies targets such as greens, bunkers and water hazards. Then using GIS analysis software the operator derives the latitude/longitude points of the targets of interest and associates them with attribute names such as Center of Green, Bunker Front, Water Carry, etc.

In Step S300, the data of Step S205 is transmitted to a central processing server via an internal network, the Internet or other external connected network. In Step S301, various known communication protocols may be used to transmit the data. For example, File Transfer Protocol (FTP) is a common protocol used when transmitting data over networks.

In Step S400, the incoming data is archived on a data server. In Step S401, the data is archived on a server that is backed up to a tape, magnetic, optical media and/or other storage medium.

In Step S500, the incoming data is staged for distribution to the Quality Control process. In Step S501, the data is handed off to a Database and Indexing process.

In Step S600, the data is processed into a database. In Step S601, the data is assigned a unique index number in order to track it through the processing and distribution system.

In Step S700, the indexed data is archived on a data server. In Step S701, the data is archived on a server that is backed up to a tape, magnetic, optical media and/or other storage medium.

In Step S800, the indexed GIS data is checked by quality control software in a primary Quality Control (QC) process. In Step S801, the GIS data for the golf course is formatted and displayed on a PC monitor using ArcView, AutoCad, Open GL or other appropriate software such as SkyGolf GPS Personal Digital Caddie System, version SkyGolf GPS2 available on products from SkyHawke Technologies, LLC. The user validates the collected or derived data points associated with the targets for accuracy between the points and also with other data in the database such as the published yardages for each of the holes.

In Step S900, the processed GIS course data is reviewed and if it passes, it is "handed off" to process Step S1100. If the data is determined to have problems it is "handed off" to process Step S1000 to correct the problems with the data. In Step S1000, data problems encountered in the primary QC process are analyzed and repaired if possible.

In Step S1100, the indexed data is associated with other optional information about the course. In Step S1101, the indexed GIS data is associated with informational data on the course in a relational database such as Microsoft (MS) SQL. Other types of databases may be used as are well known in the art. In Step S1102, promotional information may be associated with the course data. In Step S1103, golf "tips" for playing the particular course or hole are produced from input by caddies or other course professionals and associated with the indexed data.

In Step S1200, other additional or supplemental course information such as that derived from 3rd party sources may be associated with the data at this time.

In Step S1300, the indexed data is reviewed at a final QC process. In Step S1301, the indexed data is reviewed for accuracy along with the additional data associated with it in Step S1200.

In Step S1400, the data is "passed" or "failed". In Step S1401, if the data is "passed" it is sent to process Step S1600. In Step S1402, if the data is "failed" it is sent to process Step S1500 for correction.

In Step S1500, the data is corrected for inaccuracies and returned to process Step S1300.

In Step S1600, the data is then formatted for use with various applications for multiple user devices. These devices may include, but are not limited to, GPS enabled PDA's, GPS devices or GPS enabled cell phones. In Step S1601, the quality controlled GIS data that is now associated with target or feature attribute data is processed by formatting the data into the particular data formats required by the application software running on the respective devices. In Step S1602, the data formatting process may use appropriate software provided by an application software vendor or other appropriate software such as SkyGolf GPS Personal Digital Caddie System, version SkyGolf GPS2 available on products from SkyHawke Technologies, LLC.

In Step S1700, the data is staged for distribution. In Step S1701, the data is staged for distribution to the internet or other network servers. The data may also be staged at process Step S1900 for distribution to "point of sale" servers that are located in retail locations.

In Step S1800, the data is stored in an online database with associated indexing and description tags. In one embodiment, the online database is accessible via the Internet or other network available to authorized users. In Step S1801, the formatted GIS data with its associated attribute information is archived on a data backup server and then uploaded to an online data server. In Step S1802, once the formatted GIS data is loaded on the online data server, the GIS data is available for search and download by customers.

In Step S1900, Point of Sale distribution staging occurs.

In Step S2000, a Point of Sale action is carried out preferably on a Data Server.

In Step S2100, a web site server is accessed for transactions by users having a service subscription. A user's subscription gives the user an area on an online web-server that is accessible directly by the device, such as network enabled cell phones and other wireless device protocols. The user's subscription also gives the user an area on an online web-server that is accessible indirectly via a connection to a PC. This area allows the user to store and organize his GIS data for download to his device. In Step S2101, based on the user's subscription level, single or multiple folders may be set up for the user to access an online web-server. In Step S2102, the user may store and organize the data he has purchased or downloaded from the online database for later retrieval.

Additionally, the user could also upload GIS data that the user has recorded with his device via this process to the online data servers for processing and re-distribution via the database. In this case, in Step S2103, the user records GPS information and associates it with target attribute information by using appropriate software applications for this purpose such as SkyGolf GPS Personal Digital Caddie System, version SkyGolf GPS2 available on products from SkyHawke Technologies, LLC. And in Step S2104, this information is automatically retrieved from the device when the user logs on to the online website. The data is stored in the user's online data area for later use or for insertion into the distributed data.

In Step S2200, a designated web site golf course GIS data server is used to store data. In Step S2201, the indexed golf course GIS data formatted for use on particular devices is stored on the online data server.

In Step S230, customer data is accessed. This information is used in process Step S2500 to allow downloads based on the subscription and access level of the user. New or updated customer data will be collected during the registration process (Step S2600).

In step S2400, transaction and billing processing take place. In Step S2401, customer data transactions are metered based on the number of datasets downloaded. In Step S2402, the data can optionally be metered based on the size of the files downloaded. In Step S2403, the customer information is associated with the subscription level and billed or debited against the subscription level according to the data sets downloaded.

In Step S2500, search, purchase and download is accomplished. In Step S2501, the course data is time stamped so that based on the user's subscription level the data may be used for that day, week, month, year or unlimited usage. In Step S2502, the application reads the time stamp on the data and if it is within the parameters of the user's subscription use of the data is allowed. In Step S2503, the data can be optionally associated with a usage flag that counts the number of permitted uses of the data and compares it to the subscription level of the user. Further, based on the subscription level of the user, the data may be set to expire on the associated device at different rates based on time, such as hours, days or weeks, etc., or it may be set to expire on a per use basis such as 1, 2, 3, etc. uses of the data.

In Step S2600, customer registration and subscription processing are performed. In Step S2601, if the customer enters the authorization process and is not registered he is guided through an online registration and subscription purchase process. Customer name, address and billing information is collected along with the subscription level desired. Other demographic information may be collected at this time. In Step S2602, once customer demographic information is completed, it is saved to the customer database for reference in process Steps S2100, S1400, S1500, S1600, and S2700.

In Step S2700, in the website authorization process, a user signs on to a website to initiate a subscription giving him access to download the golf course or other GIS data. In Step S2701, the user initiates a subscription to use the GIS data via a website registration process. Credit card and financial information is received via a "shopping cart" process or other known online shopping process that allows such a transaction. There can be multiple levels of subscriptions that give the user different levels of access to the GIS data. In Step S2702, the user information is captured into a database for lookup when the user logs on to the website. A unique identification number, such as a an Electronic Serial Number (ESN) or identification (ID), of the device is associated with this information in order to help automate future log on processes. In Step S2703, the online database may then be searched for course data that the user is interested in. Once the course data is selected, it is staged for insertion to the user's online folder(s) for subsequent download. Optionally, the data may be downloaded directly to the user at that time.

In Step S2800, a user may initiate communications with the website server through the internet or other network link. In Step S2900, a personal computer or other appropriate computing machine may be used by the user to access the website server. In Step S3000, a portable user device such as a PDA may be used to access the system. Alternatively, in Step S3100, a wireless user device such as a wireless enabled PDA, cell phone or other wireless device may be used to access the system.

Collection, Processing and/or Distribution of Golf Related Data and Direct Connect Aspect In one aspect a unit or device, e.g., a portable device such as a PDA or cell phone, with a unique identification number, such as an Electronic Serial Number (ESN), is used in the collection, processing or distribution of golf related data. In one embodiment, a unique identification number is embedded in each unit or device. The unit or device unique identification number would be available in a memory area on the device that could be queried by the remote website server application. This can be accomplished by the website server application sending a polling command to the connected device requesting the device to output and send it's internal unique identification number. When the unique identification number is successfully returned to the website server application by the device, the unique identification number is automatically associated with the user's subscription and account information and automatically logs the user into their user's respective course data storage and course data management area of the website or other networked data repository by means of a database server lookup table.

Figure 36:
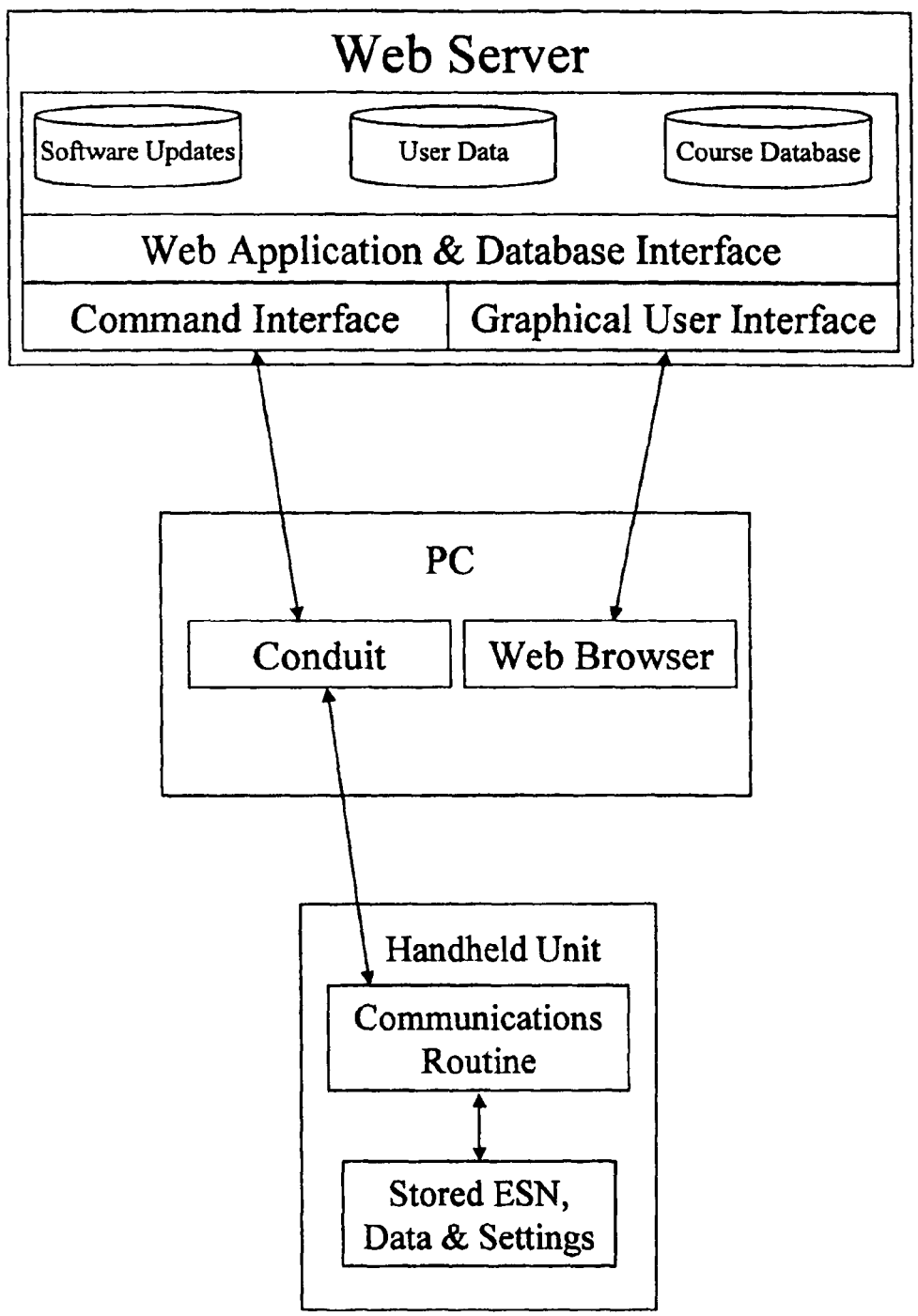
FIG. 36 shows functional layers for personal computer internet or web access via a unique identification number of a handheld device in accordance with an embodiment of the present invention.

FIG. 36 illustrates the functional layers of one embodiment of the web-centric access control based on the unique identification number. FIG. 36 shows the functional layers for accessing the web via the unique identification number stored in the handheld device using a PC. The handheld device can be connected to the PC via serial port, USB, infrared, or other communication means known to those of ordinary skill in the art. The PC in turn is connected to the Internet. All actions are preferably controlled from the web site, and therefore the PC becomes a pass through device, like a conduit, to send and receive data to and from the connected handheld unit or device. No actions are initiated from the handheld device or PC based applications even though the handheld device is connected to the PC. Based on actions taken within the browser window on the PC, commands are preferably issued from the web site to a conduit program that runs on the PC, which in turn communicates with the connected handheld device to transfer data to and from the unit or device.

Figure 37:
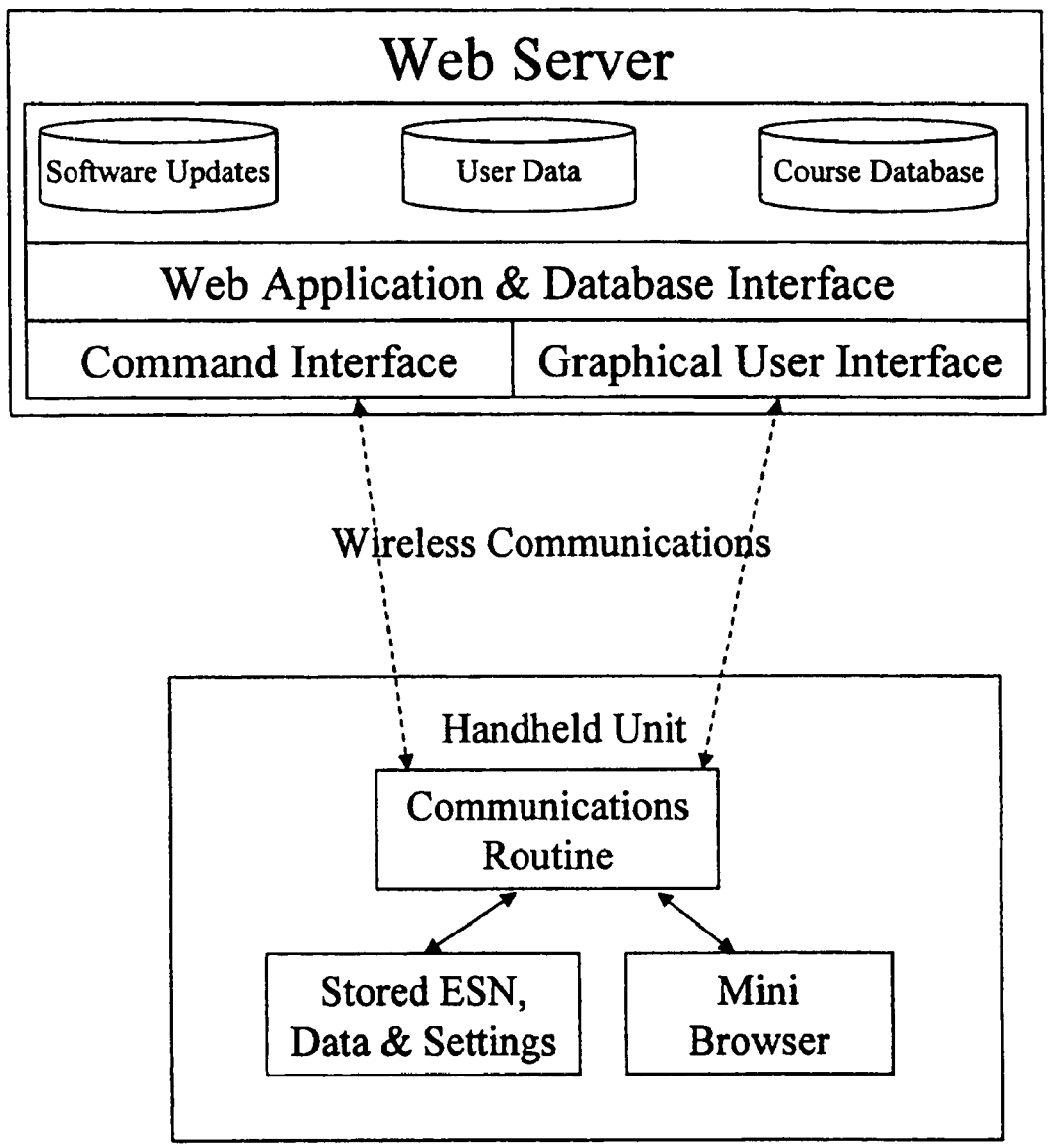
FIG. 37 shows functional layers for wireless access to the interne or web via an unique identification number of a handheld device using wireless communications in accordance with an embodiment of the present invention.
Figure 38A:
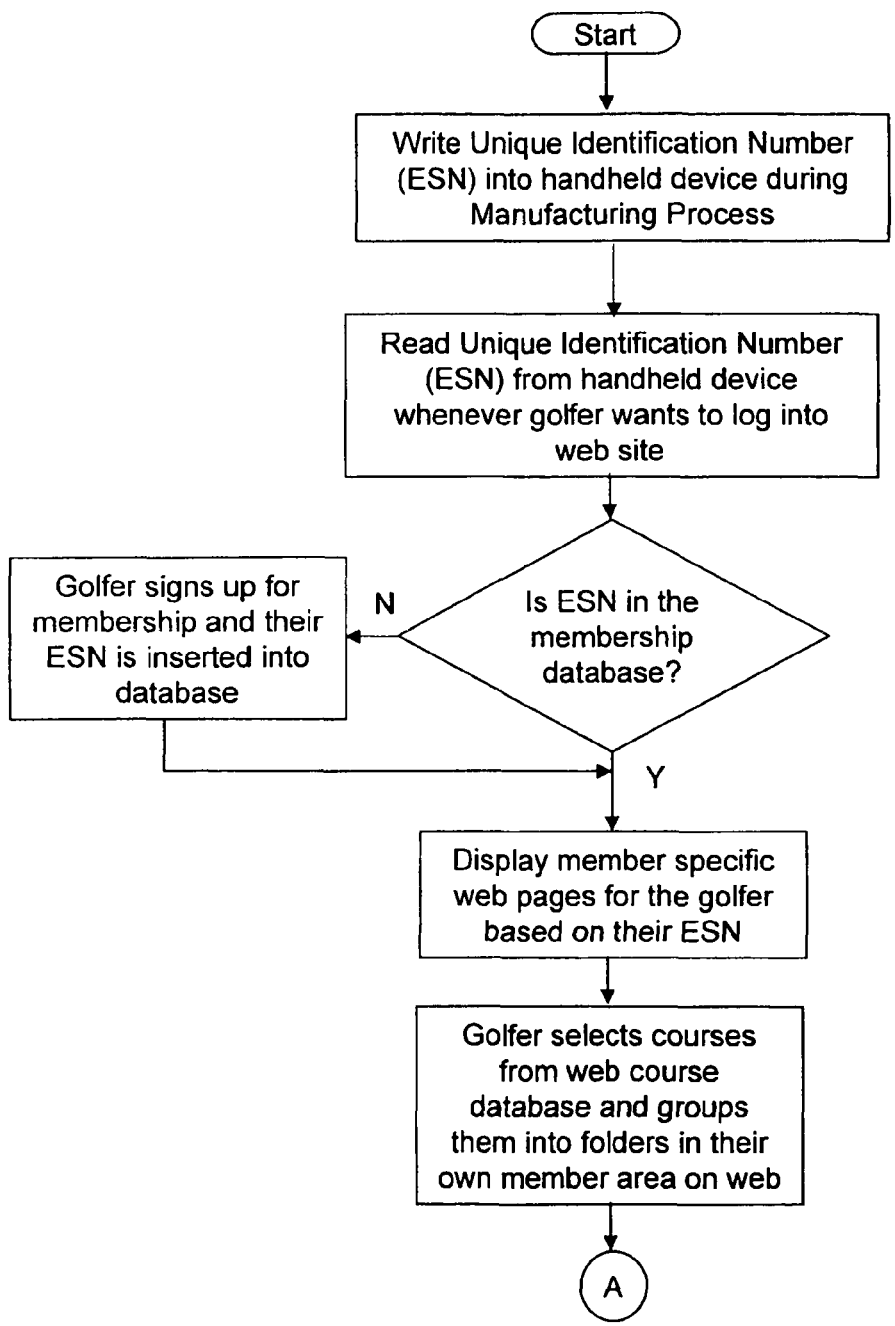
FIGS. 38A-38F show a flowchart illustrating an embodiment of one aspect of the present invention for automatically identifying a handheld device using a unique identification number.
Figure 38B:
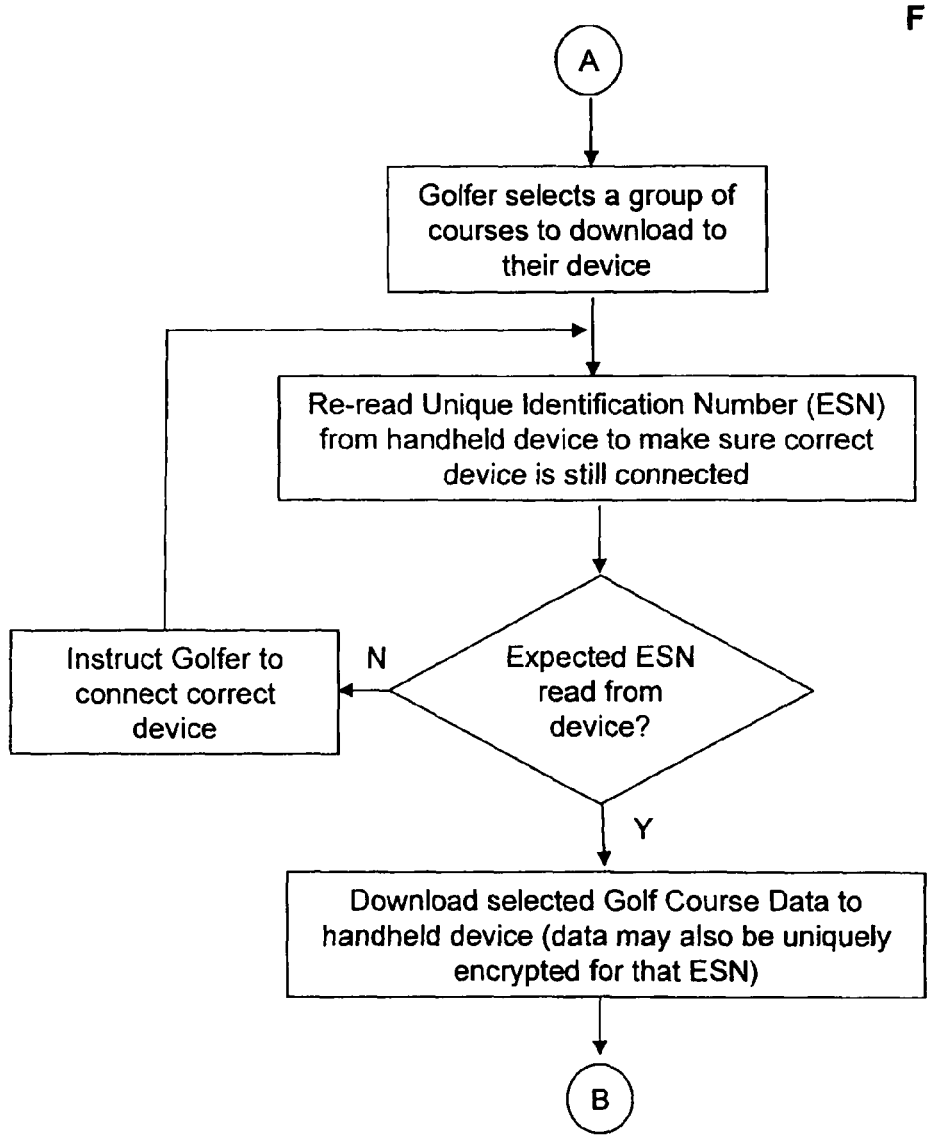
Figure 38C:
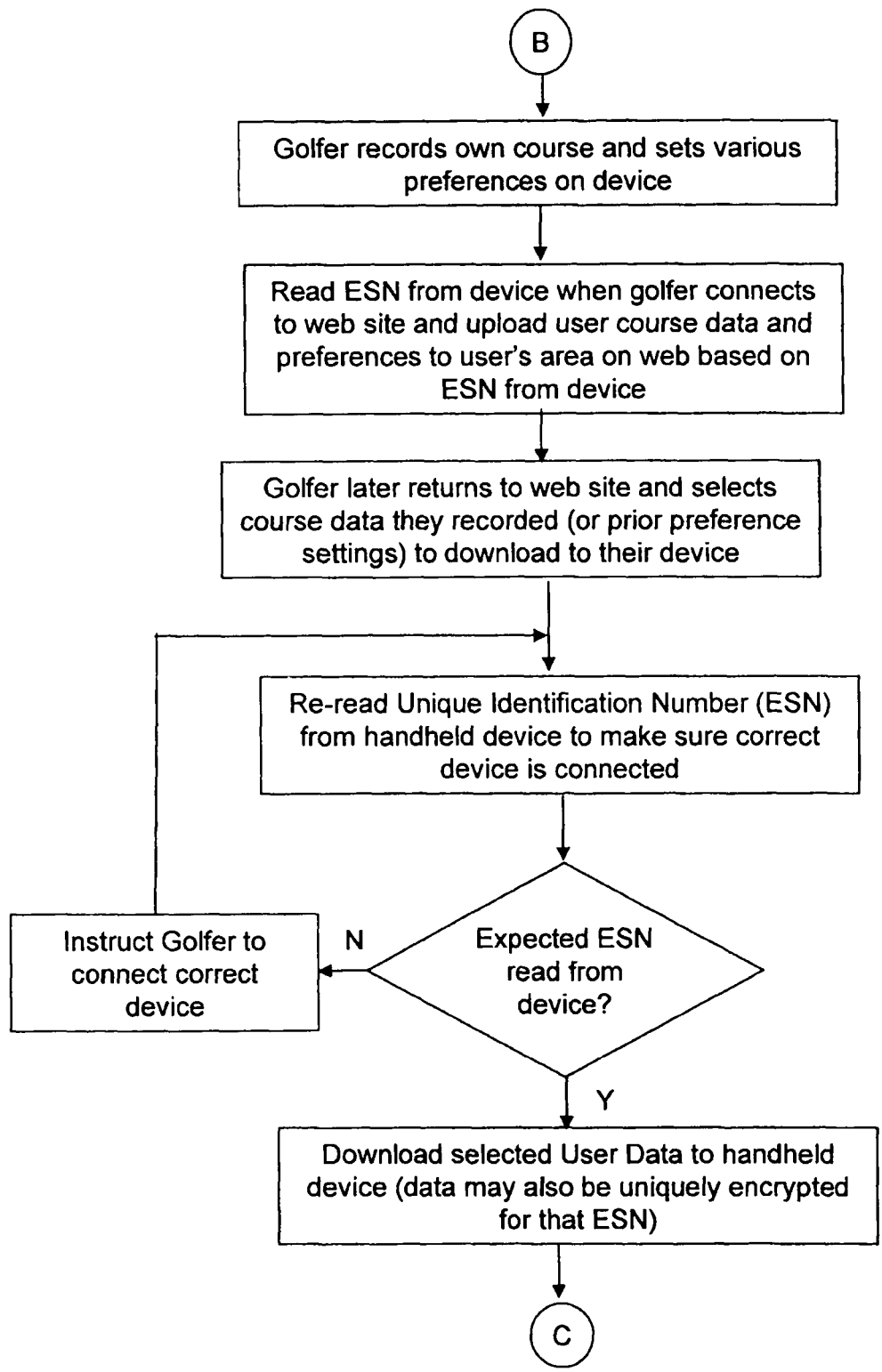
Figure 38D:
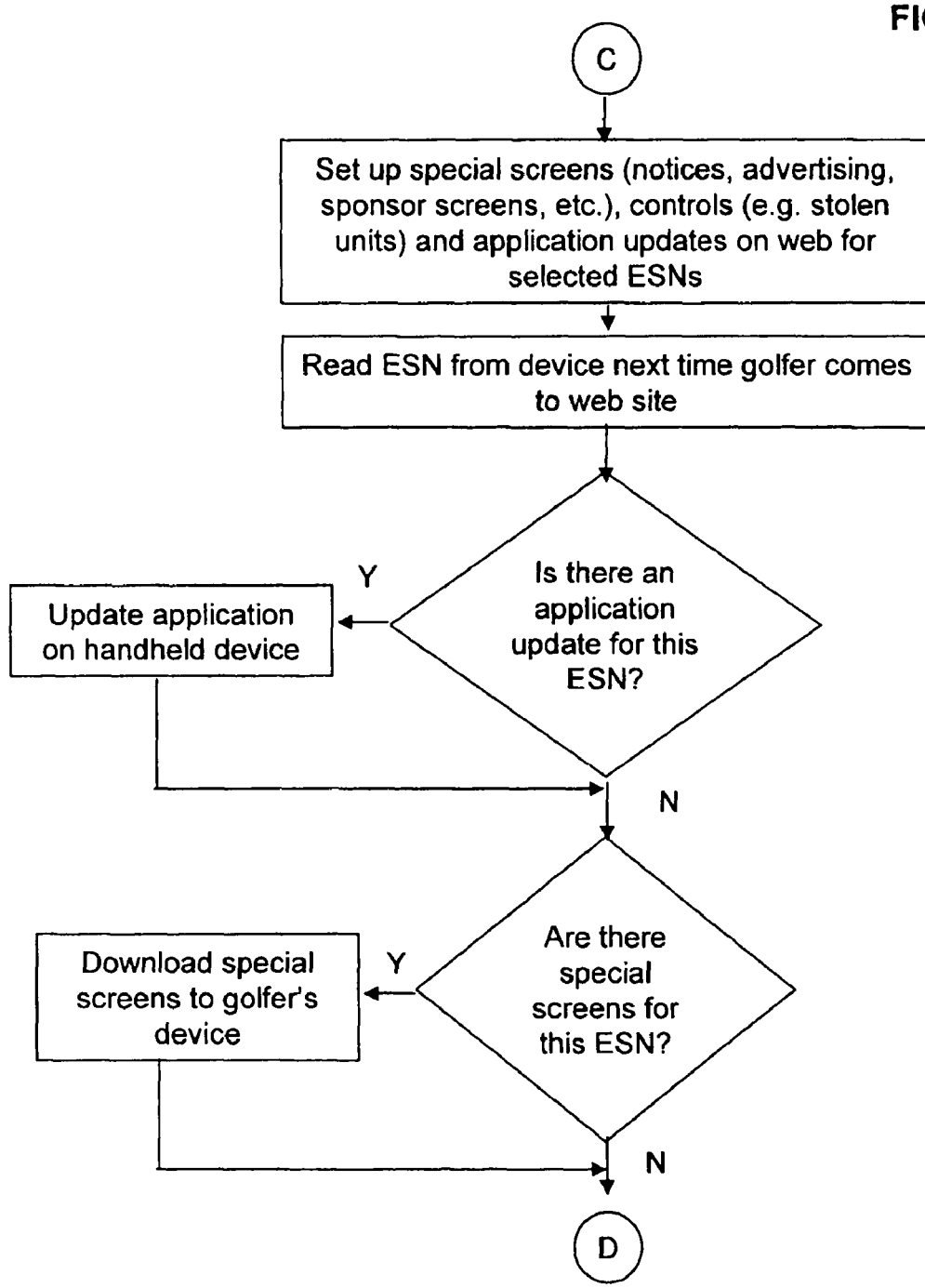
Figure 38E:
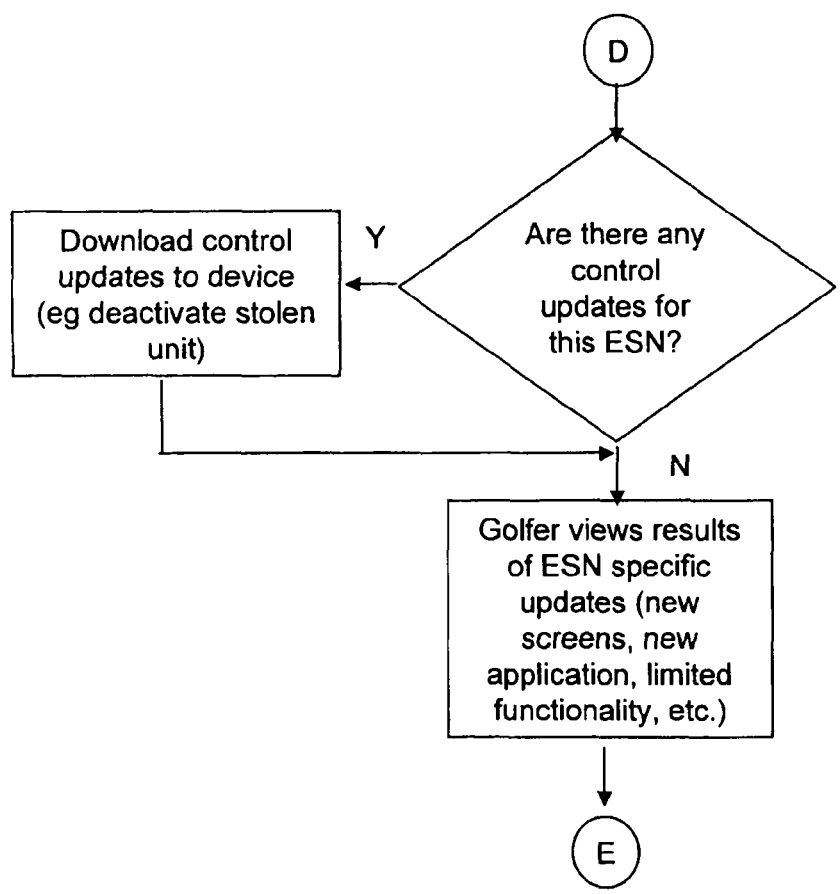
Figure 38F:
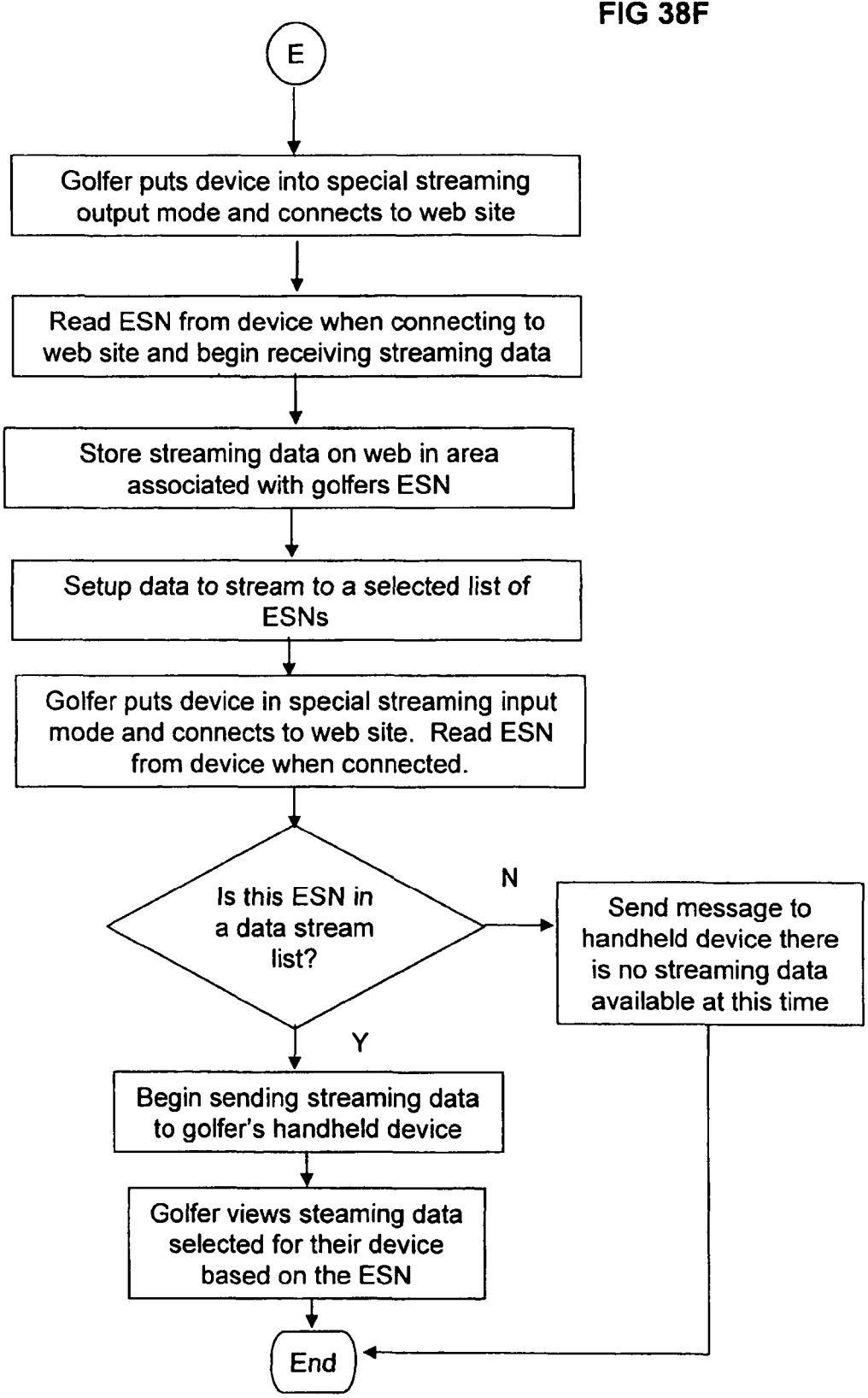

FIG. 37 illustrates an alternate aspect or implementation of a web-centric access control based on the unique identification number of a device or unit. FIG. 37 shows the functional layers of an embodiment for accessing the web via the unique identification number stored in the handheld device using wireless communications. In this embodiment, the PC is not used or is eliminated entirely. In this embodiment, wireless Internet connectivity is built into the handheld device or unit. The user can access his data area on the web site by coming into range of a wireless access point. In this embodiment, a mini-browser or other browser application on the handheld unit allows access and user selection of data to be downloaded or uploaded to and from an Internet or web location based on or using the unique identification number of the unit or device.

Once the user is logged on to his specific area of the website or other networked data repository, the user has a variety of capabilities and can carry out a variety of functions. The user is able to, among others capabilities: View lists of courses that are available to that golfer for downloading based on purchases or subscription levels associated with the unique identification number; Retrieve, store and organize course data sets in folder areas containing collections of specific courses to be downloaded to the handheld device. The folders are user customizeable as to their description (e.g. "MyHome-Courses", "MyVacationCourses", etc); Initiate the download of the folder "package" to the handheld device; Retrieve, store and organize course target data that the user has recorded himself; Place user recorded target data in downloadable folders; and Retrieve and/or set preference settings via a data input page on the website for that specific handheld device, including display settings, operational settings, and GPS parameter settings, etc. These preference settings then would be downloaded to and initiated on the respective device.

These tasks can be accomplished or carried by the website server application presenting custom user input pages to the user associated with the user's device or unit unique identification number that is logged into the server. The user can review, modify or act upon the data in his folder area prior to initiating a download of the data to the user's device by selecting one or more menu buttons on the web page such as one labeled "Download to Unit" or similar labeling.

A similar method or process can be employed in managing the user's device preference settings. The web server application presents a custom user input page on the website that contains the preference settings retrieved from the user's unit via a command and polling sequence. The preference settings are stored in the users data area on the web server or other accessible storage location. The user can modify the preference settings and, upon initiating a subsequent download to the unit via a menu button located on the user's web page, update the settings stored in the device's onboard memory chip or storage.

One other utilization aspect of the unique identification number is to provide a means whereby data to be downloaded is automatically encrypted specifically for that unit by using a specific key for that unique identification number that is either a static key or a rotating key. This can be accomplished by the web server application staging the user selected courses for download to the device and applying a software encryption algorithm to the data that is encoded by using a static key already embedded or previously transmitted to the unit or by a rotating key that is derived by the receiving unit from a common set of events. The encryption means used can be any one or those known to those of ordinary skill in the art, e.g., software encryption algorithms RSA, Blowfish, PGP, etc., as well as custom encryption algorithms.

One operational aspect or method of identifying the apparatus, unit or handheld device uses a unique identification number, such as an Electronic Serial Number (ESN). During production, a unique identification number is stored into the handheld device. When logging into the web site containing golf course data for downloading, the unique identification number can be retrieved from the handheld device and used in place of a user ID and password. Based on the unique identification number retrieved from the handheld device, a specific area of the web site is made available to that user after they have been logged in. The area available to the user, based on the unique identification number, can include the following user specific items, among others: Lists of courses that are available to that golfer for downloading based on purchases or subscription associated with that unique identification number; Courses the golfer has recorded himself; Folder areas containing collections of specific courses to be downloaded to the handheld device (e.g. MyHomeCourses, MyNextVacation, etc); and Preference settings for that specific handheld device, including display setting, operational setting, and GPS settings.

The data to be downloaded can be encrypted using a specific key for that unique identification number based on a static key. The data to be downloaded can also be encrypted using a specific key for that unique identification number that is based on rotating key, e.g., each day, each week, each month, each year, etc.

Based on the unique identification number retrieved from the handheld device or unit, special screens can be displayed, including among others: Special advertising screens for groups of specific unique identification numbers; Special sponsor screens for groups of specific unique identification numbers; and Personal startup screens for a specific unique identification number. Also, security protocols may be invoked based on the unique identification number for disabling of lost or stolen unit and disabling or reduced functionality of unit beyond subscription time period.

Further, another aspect of the web-centric access control based on the unique identification number, the handheld's application software may be automatically updated based on the handheld device reporting, upon connection to the web server, what version of application software the handheld device is running. The web server can then automatically download an appropriate application software update from a file storage area associated with the handheld device's specific unique identification number or selected group of unique identification numbers.

Once the handheld device is connected to the web server, information or data may be downloaded or streamed to the handheld device or group of device based on unique identification number lookups associated to real-time data field updates in the server database. Information or data from the handheld device may be uploaded or streamed in real-time to the web server and associated with the unique identification number of the unit.

The unique identification number on the unit or device may also be used to identify the unit for the download of special or targeted advertising screens tailored for individuals or for groups of specific unique identification numbers. Special sponsor screens may be downloaded to the unit as well as custom personal startup screens for a specific unique identification number. This can be accomplished by staging pre-formatted text or bit-mapped image files in the web server database. These files are relationally associated with specific unique identification numbers or groups of unique identification numbers. When the web server application determines that a unit with a matching unique identification number is connected to the system it automatically initiates a lookup to the database and retrieves the associated text or bit-mapped images. A download to the unit is initiated and the files are inserted into the specified device memory location for retrieval and display by the embedded application on the units LCD or user interface display.

The unique identification number can also be used provide a security feature for the device. If a unit is lost or stolen and is reported by the user the database can flag the associated unique identification number as lost or stolen. This security feature is invoked upon a subsequent connection to the website when the unit is identified in the server database as a lost or stolen unit. Specifically, it may be disabled via a remote command that is processed by the embedded application software on the device. Optionally, a screen may be downloaded or programmatically invoked and displayed on the unit showing a phone number to call to report a lost or stolen unit while maintaining a disabled state on other application functions. The security feature may also be used as part of the business process to disable or provide reduced functionality on units that have expired subscriptions by downloading subscription status flags from a database lookup table associated to the unique identification number of the device by which the application running on the device would take the appropriate device limiting actions or download a separate limited function application replacement. The security feature or method can further be used to provide the user with updates on their subscription status and friendly reminders at pre-defined times prior to the subscription expiration date to renew their subscription.

Additionally, other data may similarly be presented to the user based on the unique identification number and associated data or information lookup in a database table. This data and information can be streamed into the database in real time by using Extensible Markup Language (XML) or similar methods. The data or information can then be distributed to the device based on unique identification number lookups associated to the particular data or information fields. The distribution can occur when the device is connected to the website or in real time if the device is connected via wireless protocols to the web server. Conversely, data and information may be uploaded from the device either upon connection to the website or in real-time if wireless protocols are used to connect to the web server. This is accomplished by associating the unique identification number to the appropriate relational data fields on the web server for any information or data that is uploaded to the web server from the device.

FIGS. 38A-38F illustrate the use of a unique identification number stored in a handheld device in connection with access to a web site.

The invention has been described and illustrated with respect to certain preferred embodiments by way of example only. Those skilled in the art will recognize that the preferred embodiments may be altered or amended without departing from the true spirit and scope of the invention. While the above description contains many specifics, these should not be construed as limitations on the scope of the invention, but rather as an example of one or more embodiments thereof. Therefore, the invention is not limited to the specific details, representative devices, and illustrated examples in this description. Many other variations of this invention are possible. Accordingly, the scope of the invention should be determined not by the embodiments illustrated, but by the following appended claims and their legal equivalents.

The invention claimed is:

1. A handheld apparatus for displaying a graphic representation of a golf course, comprising:
   a location measuring device configured to obtain location information corresponding to a location of the handheld apparatus;
   a memory configured to store location information corresponding to each of a plurality of features of the golf course;
   a processing device connected to the location measuring device and the memory, and configured to retrieve a subset of the plurality of features of the golf course based on the measured location information generated by the location measuring device; and
   a display connected to the computing device and configured to display a graphic representation of the retrieved subset of the plurality of features of the golf course, wherein
   the subset of the plurality of features includes a virtual shot path, and the display is configured to display the virtual shot path in the graphic representation of the hole as a line extending from a first point of the hole to at least a second point of the hole, and
   at least one of the subset of the plurality of features intersects the virtual shot path, and the display is configured to display a distance from a point on the virtual shot path to at least a first intersection point of the at least one of the subset of the plurality of features.

2. The handheld apparatus of claim 1, wherein the display is configured to display the subset of the plurality of features collectively as a graphic representation of at least a portion of single hole of the golf course.

3. The handheld apparatus of claim 2, wherein the subset of the plurality of features includes at least one of a green, tee box, fairway, rough, tree, bunker, water hazard, waste area and out-of-bounds area.

4. The handheld apparatus of claim 1, further comprising:
   an interface configured to receive an input to move a location of at least one of the first point and the second point of the virtual shot path on the graphic representation of the hole, and the processing device is configured to adjust the virtual shot path in response to the input.

5. The handheld apparatus of claim 1, wherein the subset of the plurality of features correspond to a green, and the display is configured to display the subset of the plurality of features collectively as a graphic representation of the green.

6. The handheld apparatus of claim 5, wherein the subset of the plurality of features include at least one of a sloped area of the green and an outline of the green, and the display is configured to display the sloped area so as to differentiate the sloped area from other portions of the green.

7. The handheld apparatus of claim 5, wherein the subset of the plurality of features include at least one of a sloped area of the green, and the display is configured to display a dark line indicating a high point of the slope and the sloped area is displayed so as to differentiate the sloped area from other portions of the green.

8. A method performed by a handheld device for displaying a graphic representation of a golf course, comprising:
   obtaining, by a location measuring device of the handheld device, location information corresponding to a location of the handheld apparatus;

storing, by a memory of the handheld device, location information corresponding to each of a plurality of features of the golf course;

retrieving, by a processing device of the handheld device, a subset of the plurality of features of the golf course based on the measured location information generated by the location measuring device; and displaying, by a display of the handheld device, a graphic representation of the retrieved subset of the plurality of features of the golf course, wherein the subset of the plurality of features includes a virtual shot path, and the displaying includes displaying the virtual shot path in the graphic representation of the hole as a line extending from a first point of the hole to at least a second point of the hole, and at least one of the subset of the plurality of features intersects the virtual shot path and the displaying includes displaying a distance from a point on the virtual shot path to at least a first intersection point of the at least one of the subset of the plurality of features.

9. The method of claim 8, further comprising:

displaying the subset of the plurality of features collectively as a graphic representation of at least a portion of a single hole of the golf course.

10. The method of claim 9, wherein the subset of the plurality of features includes at least one of a green, tee box, fairway, rough, tree, bunker, water hazard, waste area and out-of-bounds area.

11. The method of claim 8, further comprising:

receiving, at an interface of the handheld device, input requesting to move a location of at least one of the first point and the second point of the virtual shot path on the graphic representation of the hole; and adjusting the virtual shot path in response to the input.

12. The method of claim 8, wherein the subset of the plurality of features correspond to a green, and the displaying includes displaying the subset of the plurality of features collectively as a graphic representation of the green.

13. The method of claim 12, wherein the subset of the plurality of features include at least one of a sloped area of the green and an outline of the green, and the displaying includes displaying the sloped area so as to differentiate the sloped area from other portions of the green.

14. The method of claim 12, wherein the subset of the plurality of features include at least one of a sloped area of the green, and the displaying includes displaying a dark line indicating a high point of the slope and displaying the sloped area so as to differentiate the sloped area other portions of the green.

15. A non-transitory computer-readable medium including computer program instructions, which when executed by a processor of a handheld device, causes the handheld device to perform a method of displaying a graphic representation of a golf course, the method comprising:

obtaining location information corresponding to a location of the handheld apparatus;

storing location information corresponding to each of a plurality of features of the golf course;

retrieving a subset of the plurality of features of the golf course based on the measured location information generated by the location measuring device; and displaying a graphic representation of the retrieved subset of the plurality of features of the golf course, wherein the subset of the plurality of features includes a virtual shot path, and the displaying includes displaying the virtual shot path in the graphic representation of the hole as a line extending from a first point of the hole to at least a second point of the hole, and at least one of the subset of the plurality of features intersects the virtual shot path, and the displaying includes displaying a distance from a point on the virtual shot path to at least a first intersection point of the at least one of the subset of the plurality of features.

* * * * *

UNITED STATES PATENT AND TRADEMARK OFFICE
CERTIFICATE OF CORRECTION

PATENT NO.       : 8,172,702 B2  
APPLICATION NO.  : 12/573752  
DATED            : May 8, 2012  
INVENTOR(S)      : James W. Meadows et al.

Page 1 of 1

It is certified that error appears in the above-identified patent and that said Letters Patent is hereby corrected as shown below:

Column 44, line 20, change "the computing device" to --the processing device--

Signed and Sealed this
Thirty-first Day of July, 2012

David J. Kappos
*Director of the United States Patent and Trademark Office*